(12) United States Patent
Lindee et al.

(10) Patent No.: US 8,850,938 B2
(45) Date of Patent: Oct. 7, 2014

(54) MAINTENANCE AND SAFETY SYSTEM FOR A FOOD ARTICLE SLICING MACHINE

(75) Inventors: Scott A. Lindee, Mokena, IL (US);
Glenn Sandberg, New Lenox, IL (US);
David Hansen, Orland Park, IL (US);
James E. Pasek, Tinley Park, IL (US);
David Hancock, Morris, IL (US)

(73) Assignee: Formax, Inc., Mokena, IL (US)

( * ) Notice: Subject to any disclaimer, the term of this patent is extended or adjusted under 35 U.S.C. 154(b) by 1118 days.

(21) Appl. No.: 12/255,661

(22) Filed: Oct. 21, 2008

(65) Prior Publication Data

US 2009/0173196 A1 Jul. 9, 2009

Related U.S. Application Data

(60) Provisional application No. 60/999,961, filed on Oct. 22, 2007, provisional application No. 61/000,202, filed on Oct. 23, 2007.

(51) Int. Cl.
| | |
|---|---|
| *B26D 5/00* | (2006.01) |
| *B26D 7/06* | (2006.01) |
| *B26D 1/14* | (2006.01) |
| *B23D 19/00* | (2006.01) |
| *F16D 3/06* | (2006.01) |
| *F16D 7/00* | (2006.01) |
| *B23Q 11/08* | (2006.01) |

(52) U.S. Cl.
USPC .................... 83/130; 83/57; 83/58; 83/508.1; 192/129 A; 409/134

(58) Field of Classification Search
USPC .......... 83/130, 57–68, DIG. 1, 702–705, 469, 83/477, 494, 508.1, 508.2, 449, 396, 373, 83/374; 192/129 A–129 B; 409/134
See application file for complete search history.

(56) References Cited

U.S. PATENT DOCUMENTS

| 1,428,291 A | 9/1922 | Lucey |
| 1,679,508 A | 8/1928 | Stukart |
| 1,941,519 A | 1/1934 | Berkel |

(Continued)

FOREIGN PATENT DOCUMENTS

| AT | 386792 | 3/2008 |
| CA | 997248 | 10/1973 |

(Continued)

OTHER PUBLICATIONS

Safety Laser Scanner S300 catalog, Printed in Germany Mar. 2006, pp. 1-10.

(Continued)

*Primary Examiner* — Ghassem Alie
*Assistant Examiner* — Bharat C Patel
(74) *Attorney, Agent, or Firm* — Klintworth & Rozenblat IP LLC

(57) ABSTRACT

A slicing apparatus and a weighing and classifying conveyor combination with cleanup position wherein, the elevated food article feed mechanism can be collapsed to a maintenance position, the weighing and classifying conveyor is oriented at a distance from the slicing apparatus and the slicing head cover is automatically lifted to an open cleanup position. The machine has laser intrusion detectors that are used to shut down systems when an unwanted intrusion by a person or object is detected.

16 Claims, 85 Drawing Sheets

(56) References Cited

U.S. PATENT DOCUMENTS

| | | | |
|---|---|---|---|
| 2,047,399 A | 7/1936 | Walter | |
| 2,126,458 A | 8/1938 | Englen | |
| 2,288,010 A | 6/1942 | Meland | |
| 2,619,142 A | 11/1952 | Ditting | |
| 2,796,969 A | 6/1957 | Russell | |
| 2,840,131 A | 6/1958 | Gilbert | |
| 2,970,622 A | 2/1961 | Lundell | |
| 3,099,304 A | 7/1963 | Monsees et al. | |
| 3,191,357 A | 6/1965 | Hawley et al. | |
| 3,195,710 A | 7/1965 | Robinson | |
| 3,475,878 A | 11/1969 | West, Jr. | |
| 3,670,793 A * | 6/1972 | Flesch | 83/88 |
| 3,785,230 A | 1/1974 | Lokey | |
| 3,898,445 A * | 8/1975 | MacLeod et al. | 708/141 |
| 4,026,177 A | 5/1977 | Lokey | |
| 4,031,791 A | 6/1977 | Lecrone | |
| 4,120,389 A * | 10/1978 | Erickson | 192/129 A |
| 4,124,128 A | 11/1978 | Adams et al. | |
| 4,145,940 A | 3/1979 | Woloveke et al. | |
| 4,147,081 A | 4/1979 | Pellaton | |
| 4,208,933 A | 6/1980 | Skidmore | |
| 4,309,927 A | 1/1982 | Dennis et al. | |
| 4,379,417 A | 4/1983 | Pieper et al. | |
| 4,428,263 A | 1/1984 | Lindee et al. | |
| 4,512,228 A | 4/1985 | Tarcisio | |
| 4,523,501 A | 6/1985 | Mengel | |
| 4,532,840 A * | 8/1985 | Antonissen | 83/76.8 |
| 4,537,302 A | 8/1985 | Gsponer et al. | |
| 4,567,596 A * | 1/1986 | Buckingham et al. | 372/22 |
| 4,574,672 A | 3/1986 | Ehm et al. | |
| 4,583,435 A * | 4/1986 | Fessler | 83/90 |
| 4,644,729 A * | 2/1987 | Fessler | 53/157 |
| 4,660,703 A * | 4/1987 | Filcich et al. | 192/130 |
| 4,685,364 A | 8/1987 | Scheflow et al. | |
| 4,843,932 A | 7/1989 | Weber et al. | |
| 4,934,232 A | 6/1990 | Weber et al. | |
| 4,976,093 A | 12/1990 | Everts | |
| 5,079,982 A | 1/1992 | Antonissen | |
| 5,101,702 A | 4/1992 | Kuchler | |
| 5,125,303 A | 6/1992 | Hoyland | |
| 5,191,820 A | 3/1993 | Hartmann | |
| 5,224,407 A | 7/1993 | Koch et al. | |
| 5,241,887 A | 9/1993 | Wolff et al. | |
| 5,280,622 A * | 1/1994 | Tino | 700/255 |
| 5,282,406 A | 2/1994 | Ng | |
| 5,447,086 A | 9/1995 | Wittmaier et al. | |
| 5,455,669 A | 10/1995 | Wetteborn | |
| 5,481,466 A | 1/1996 | Carey | |
| 5,482,166 A | 1/1996 | Brown | |
| 5,486,691 A | 1/1996 | Dieterle | |
| 5,579,884 A * | 12/1996 | Appleyard et al. | 192/130 |
| 5,628,237 A | 5/1997 | Lindee et al. | |
| 5,649,463 A * | 7/1997 | Lindee et al. | 83/174 |
| 5,667,152 A * | 9/1997 | Mooring | 241/37.5 |
| 5,728,411 A * | 3/1998 | Fowler | 425/142 |
| 5,810,149 A | 9/1998 | Sandberg et al. | |
| 5,931,073 A | 8/1999 | Hoyer-Ellefsen | |
| 5,974,925 A * | 11/1999 | Lindee et al. | 83/412 |
| 5,989,116 A | 11/1999 | Johnson et al. | |
| 6,098,510 A * | 8/2000 | Hada et al. | 83/13 |
| 6,152,284 A | 11/2000 | Sandberg et al. | |
| 6,196,097 B1 | 3/2001 | Handel | |
| 6,243,011 B1 * | 6/2001 | Rostroem | 340/556 |
| 6,267,033 B1 | 7/2001 | Gundlach et al. | |
| 6,296,105 B1 | 10/2001 | Carnes | |
| 6,297,498 B1 * | 10/2001 | Shteynberg et al. | 250/221 |
| 6,318,224 B1 | 11/2001 | Hoyland | |
| 6,454,518 B1 | 9/2002 | Garcia-Balleza et al. | |
| 6,484,615 B2 | 11/2002 | Lindee | |
| 6,561,069 B2 | 5/2003 | Krauss et al. | |
| 6,640,681 B1 | 11/2003 | Weber | |
| 6,692,424 B2 | 2/2004 | Pasman et al. | |
| 6,763,748 B2 | 7/2004 | Wolcott et al. | |
| 6,769,337 B2 | 8/2004 | Sandberg et al. | |
| 6,837,361 B2 * | 1/2005 | Singleton et al. | 198/436 |
| 6,845,860 B1 | 1/2005 | Walker | |
| 6,856,862 B1 * | 2/2005 | Feltner | 700/245 |
| 6,935,215 B2 | 8/2005 | Lindee et al. | |
| 6,979,813 B2 * | 12/2005 | Avril | 250/221 |
| 6,979,814 B2 * | 12/2005 | Kudo et al. | 250/221 |
| 6,997,089 B2 * | 2/2006 | Lindee et al. | 83/29 |
| 7,069,845 B2 | 7/2006 | Righele | |
| 7,113,705 B2 * | 9/2006 | Carrick et al. | 398/95 |
| 7,192,791 B2 * | 3/2007 | Hofmeister | 438/14 |
| 7,270,039 B2 | 9/2007 | Lindee et al. | |
| 7,299,728 B2 | 11/2007 | Ferrin et al. | |
| 7,310,109 B2 * | 12/2007 | Dottling et al. | 348/82 |
| 7,373,217 B2 | 5/2008 | Young | |
| 7,404,481 B2 | 7/2008 | Sandberg et al. | |
| 7,411,137 B2 | 8/2008 | Sandberg et al. | |
| 7,480,031 B2 | 1/2009 | Mack | |
| 7,584,840 B2 | 9/2009 | Mishmash et al. | |
| 7,589,826 B2 | 9/2009 | Mack et al. | |
| 7,603,936 B2 | 10/2009 | Pryor et al. | |
| 7,651,388 B2 | 1/2010 | Faires et al. | |
| 7,866,130 B2 | 1/2011 | Drebing et al. | |
| 2002/0027346 A1 | 3/2002 | Breed et al. | |
| 2002/0083816 A1 | 7/2002 | Krauss | |
| 2002/0163735 A1 * | 11/2002 | Detlef et al. | 359/641 |
| 2002/0180988 A1 * | 12/2002 | Johnston et al. | 356/602 |
| 2003/0102609 A1 * | 6/2003 | Swift | 266/78 |
| 2003/0205120 A1 | 11/2003 | Thiedig et al. | |
| 2003/0221528 A1 | 12/2003 | Sandberg et al. | |
| 2004/0031363 A1 | 2/2004 | Lindee et al. | |
| 2004/0139706 A1 | 7/2004 | Drebing et al. | |
| 2004/0185156 A1 | 9/2004 | Garwood | |
| 2004/0194605 A1 | 10/2004 | Weber | |
| 2004/0231476 A1 | 11/2004 | Weber | |
| 2005/0016235 A1 | 1/2005 | Zusi | |
| 2005/0039822 A1 | 2/2005 | Gass et al. | |
| 2005/0072322 A1 | 4/2005 | Weber | |
| 2005/0132855 A1 | 6/2005 | Weber | |
| 2005/0140955 A1 * | 6/2005 | Butler et al. | 355/69 |
| 2005/0207619 A1 * | 9/2005 | Lohmann | 382/103 |
| 2005/0265596 A1 * | 12/2005 | Lohmann | 382/153 |
| 2006/0107808 A1 | 5/2006 | Culling | |
| 2006/0108201 A1 | 5/2006 | Swinderman | |
| 2006/0184160 A1 | 8/2006 | Ozaki et al. | |
| 2006/0196328 A1 | 9/2006 | Pryor et al. | |
| 2006/0196336 A1 | 9/2006 | Ferrin et al. | |
| 2006/0197020 A1 * | 9/2006 | Trzecieski et al. | 250/342 |
| 2007/0028742 A1 | 2/2007 | Mueller et al. | |
| 2007/0048398 A1 * | 3/2007 | Tsuji et al. | 425/135 |
| 2007/0076189 A1 * | 4/2007 | Kumagai et al. | 356/5.01 |
| 2007/0089967 A1 | 4/2007 | Pryor et al. | |
| 2007/0142959 A1 | 6/2007 | Rummel et al. | |
| 2007/0213692 A1 | 9/2007 | Neubauer et al. | |
| 2007/0222981 A1 * | 9/2007 | Ponsardin et al. | 356/301 |
| 2007/0244470 A1 | 10/2007 | Barker, Jr. et al. | |

FOREIGN PATENT DOCUMENTS

| | | |
|---|---|---|
| DE | 154952 | 10/1904 |
| DE | 1027378 | 4/1958 |
| DE | 3010660 | 3/1980 |
| DE | 3130300 | 7/1981 |
| DE | 3140463 | 10/1981 |
| DE | 3232045 | 8/1982 |
| DE | 3434135 | 9/1984 |
| DE | 3912445 | 4/1989 |
| DE | 3912446 | 4/1989 |
| DE | 4108605 | 3/1991 |
| DE | 4113435 | 4/1991 |
| DE | 4211884 | 10/1993 |
| DE | 19506649 | 7/1994 |
| DE | 19514407 | 4/1995 |
| DE | 19518595 | 5/1995 |
| DE | 19518597 | 5/1995 |
| DE | 19626511 | 1/1998 |
| DE | 29720191 | 1/1998 |
| DE | 29913267 | 7/1999 |
| DE | 20011472 | 9/2000 |
| DE | 20015192 | 9/2000 |
| DE | 20203201 | 6/2002 |

(56) References Cited

FOREIGN PATENT DOCUMENTS

| | | |
|---|---|---|
| DE | 20309394 | 11/2003 |
| DE | 102006015346 | 4/2006 |
| DE | 202006006831 | 4/2006 |
| EP | 0377075 | 6/1989 |
| EP | 0412295 | 8/1989 |
| EP | 0377451 | 7/1990 |
| EP | 0398602 | 11/1990 |
| EP | 0433286 | 6/1991 |
| EP | 0672587 | 9/1995 |
| EP | 0690773 | 1/1996 |
| EP | 0713753 | 5/1996 |
| EP | 0733446 | 9/1996 |
| EP | 0733449 | 9/1996 |
| EP | 0595489 | 12/1996 |
| EP | 1027378 | 10/1997 |
| EP | 0826468 | 3/1998 |
| EP | 0867263 | 9/1998 |
| EP | 1010501 | 12/1998 |
| EP | 1046476 | 4/1999 |
| EP | 1552912 | 4/1999 |
| EP | 0931630 | 7/1999 |
| EP | 1243386 | 3/2001 |
| EP | 1147866 | 10/2001 |
| EP | 1378329 | 1/2004 |
| EP | 1600266 | 11/2005 |
| GB | 2071062 | 2/1980 |
| GB | 2386317 | 9/2003 |
| GB | 2392824 | 3/2004 |
| GB | 2435189 | 8/2007 |
| JP | 2000288983 | 3/1999 |
| WO | 0006349 | 2/2000 |
| WO | 03028963 | 4/2003 |
| WO | 03031126 | 4/2003 |
| WO | 2004011209 | 2/2004 |
| WO | 2004016389 | 2/2004 |

OTHER PUBLICATIONS

File History for U.S. Appl. No. 07/883,560.
European Patent Office, Partial European Search Report for EP Application No. 13004523.0-1702 mailed Nov. 28, 2013, 6 pages.

* cited by examiner

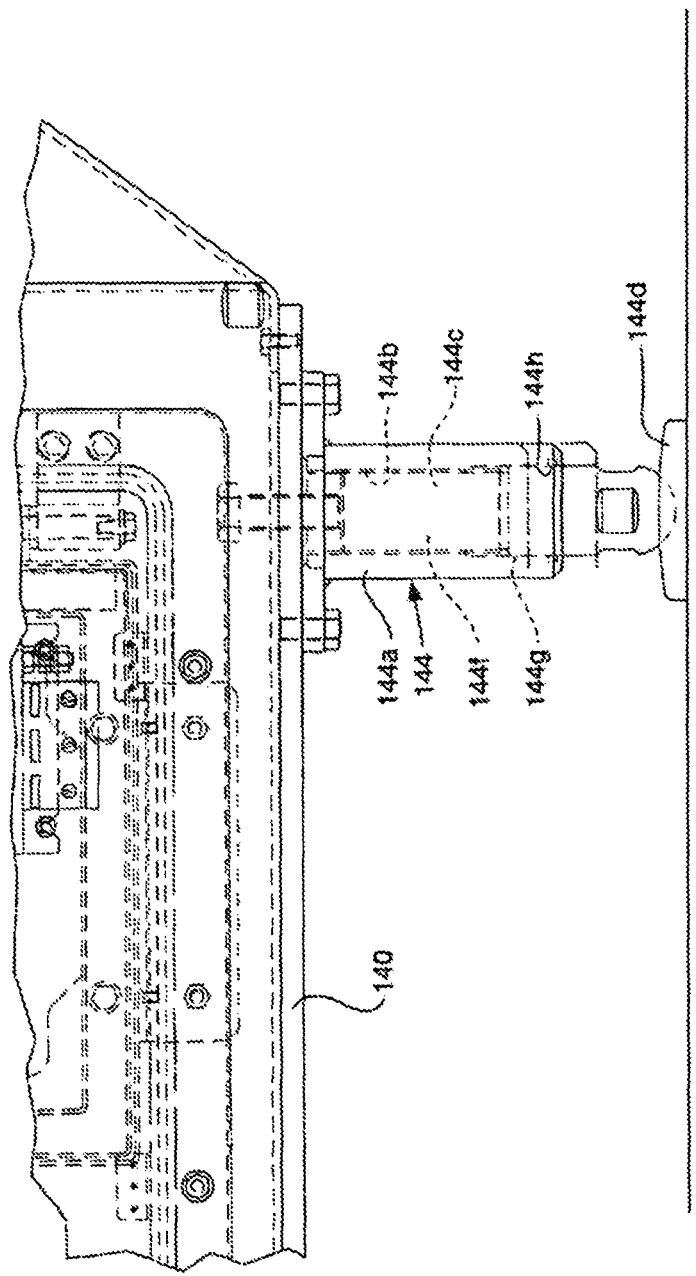

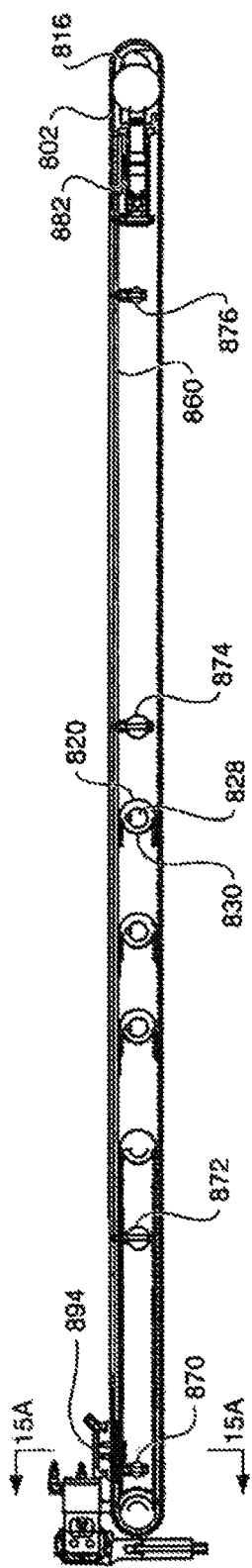

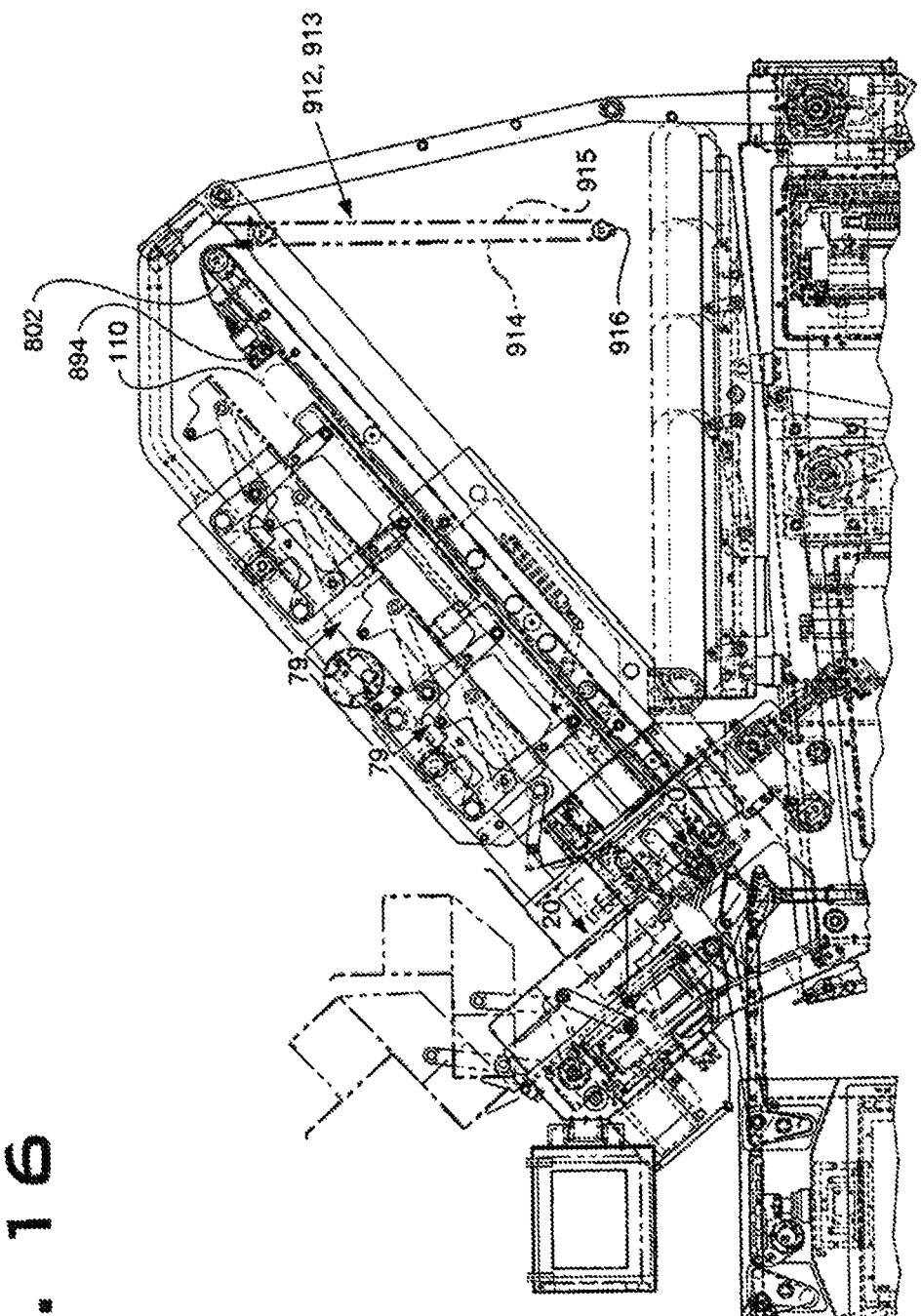

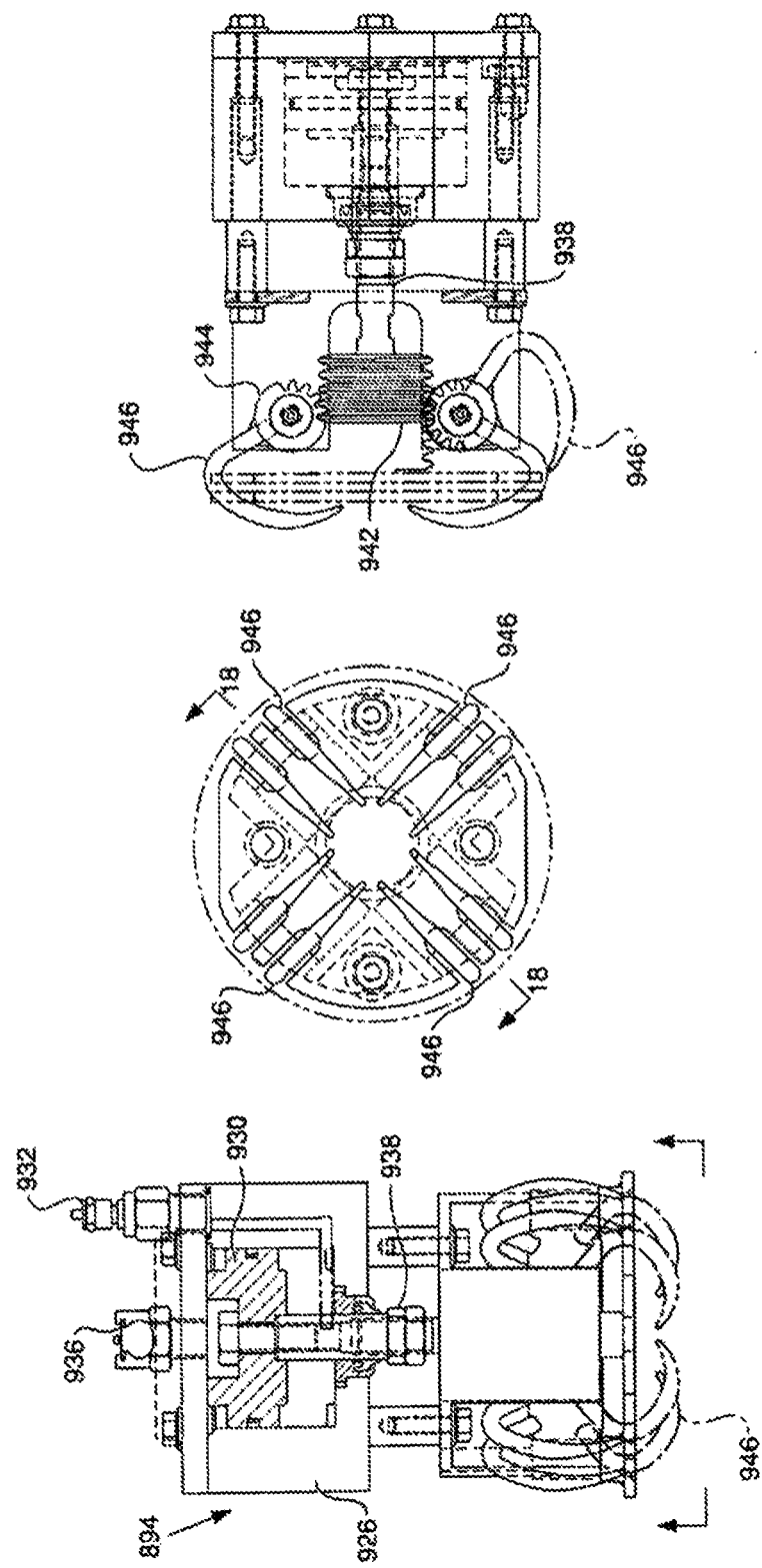

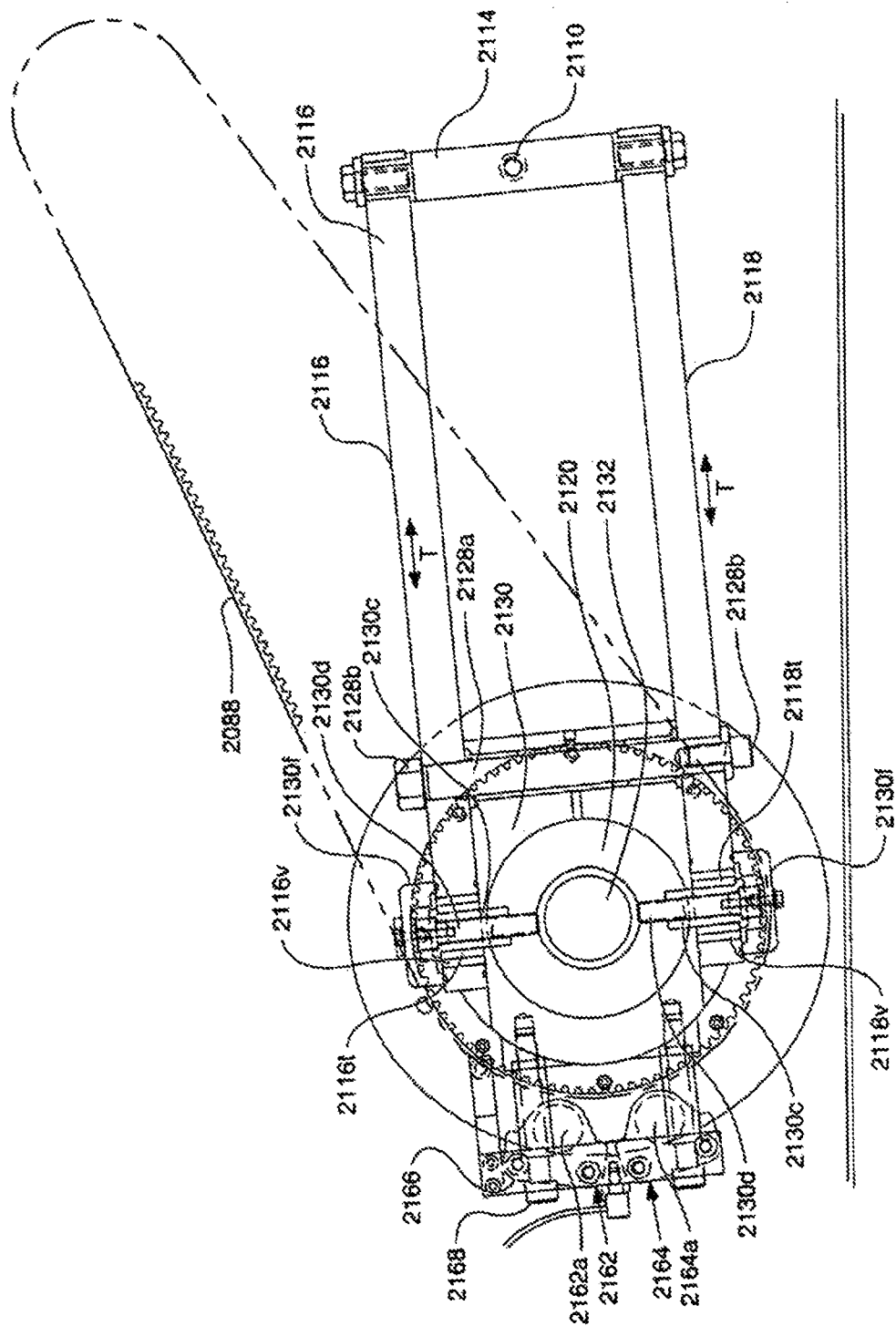

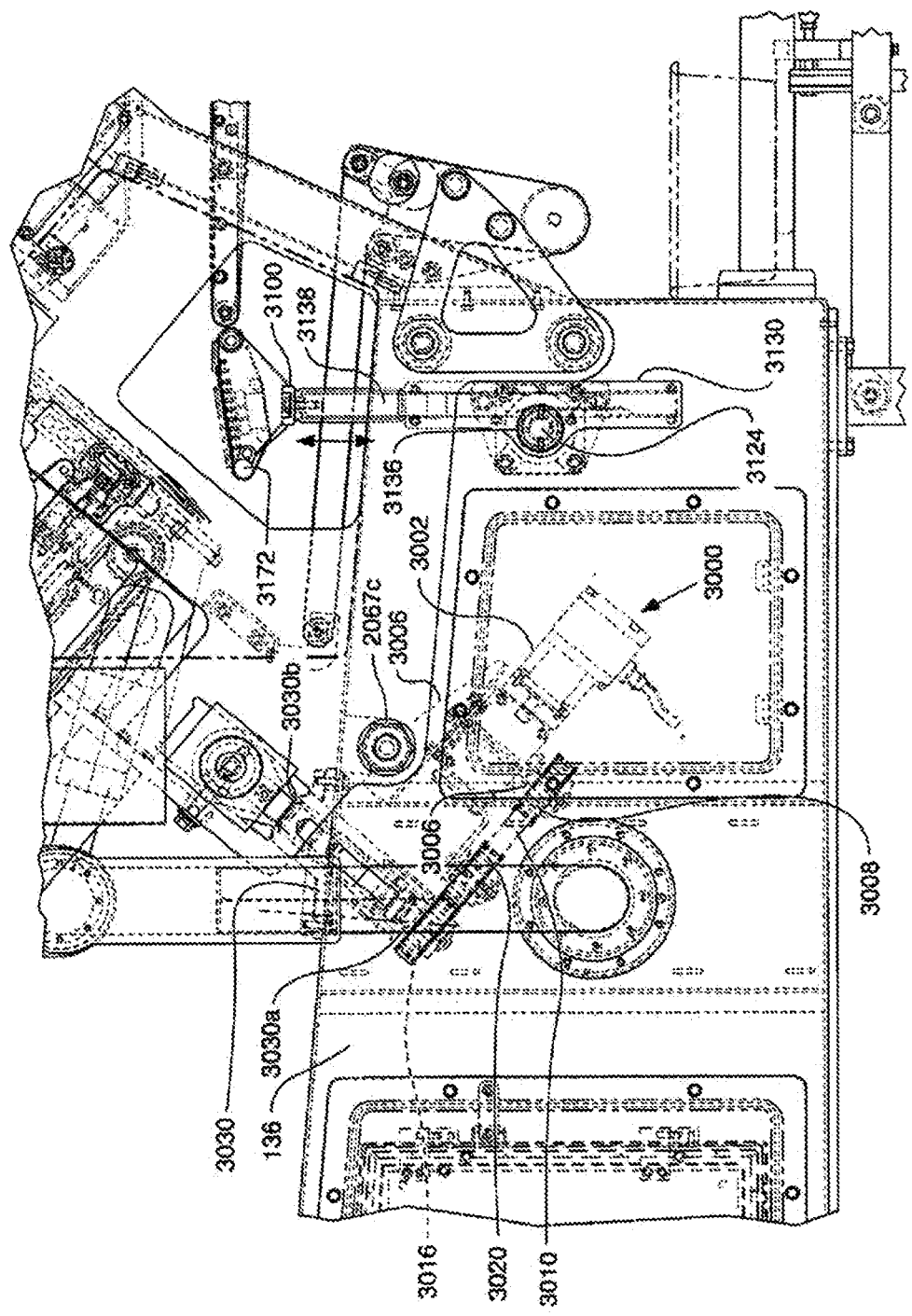

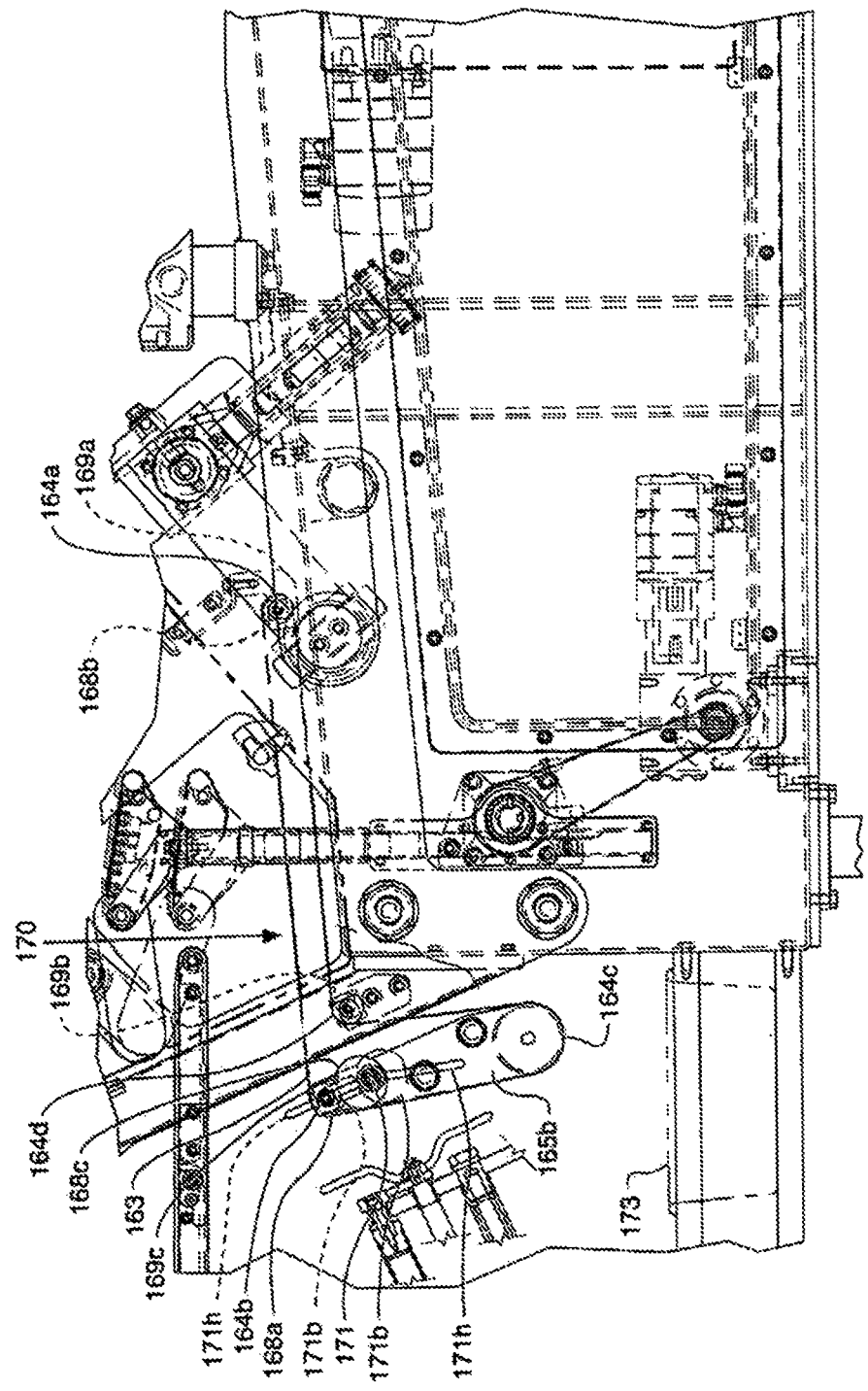

MAINTENANCE AND SAFETY SYSTEM FOR A FOOD ARTICLE SLICING MACHINE

This application claims the benefit of U.S. Patent Application No. 60/999,961 filed on Oct. 22, 2007 and U.S. Patent Application No. 61/000,202 filed on Oct. 23, 2007.

BACKGROUND OF THE INVENTION

Many different kinds of food articles or food products, such as food slabs, food bellies, or food loaves are produced in a wide variety of shapes and sizes. There are meat loaves made from various meats, including ham, pork, beef, lamb, turkey, and fish. The meat in the food loaf may be in large pieces or may be thoroughly comminuted. These meat loaves come in different shapes (round, square, rectangular, oval, etc.) and in different lengths up to six feet (183 cm) or even longer. The cross-sectional sizes of the loaves are quite different; the maximum transverse dimension may be as small as 1.5 inches (4 cm) or as large as ten inches (25.4 cm). Loaves of cheese or other foods come in the same great ranges as to composition, shape, length, and transverse size.

Typically the food loaves are sliced, the slices are grouped in accordance with a particular weight requirement, and the groups of slices are packaged and sold at retail. The number of slices in a group may vary, depending on the size and consistency of the food article and the desire of the producer, the wholesaler, or the retailer. For some products, neatly aligned stacked slice groups are preferred. For others, the slices are shingled or folded so that a purchaser can see a part of every slice through a transparent package.

Food article scan be sliced on high speed slicing machines such as disclosed in U.S. Pat. No. 5,628,237 or 5,974,925 or as commercially available as the FX180® slicer available from Formax, Inc. of Mokena, Ill., USA.

The FX180® machine can be configured as an automatically loaded, continuous feed machine, or an automatically loaded, back-clamp or gripper type machine.

For an automatically loaded, continuous feed machine, side-by-side upper and lower conveyor pairs drive food articles into the cutting plane. A gate is located in front of the conveyors. The initial food articles are loaded with leading ends abutting the gate. The gate is lowered and the food articles proceed into the conveyors. When the initial food articles are sliced to the extent that the trailing ends of the food articles clear the gate, the gate is raised and new food articles are loaded in the feed paths, held back by the gate. Shortly thereafter the gate is lowered and new food articles slide down to where lead ends of the new food articles abut trailing ends of the initial food articles being sliced. The new food articles are driven into the cutting plane trailing the initial food articles. Food articles are sequentially and continuously loaded in this manner, lead end-to-trailing end, in abutting contact with the preceding food articles.

U.S. Pat. No. 5,628,237 and European patent EP 0 713 753 describe a back-clamp or gripper type slicing machine. According to this type of slicing machine, two food articles are loaded onto a lift tray and the lift tray is raised to a ready-to-sweep position. Two loaf grippers are retracted after the previous food articles are sliced. During retraction of the loaf grippers, loaf-to-slicing blade gate doors are closed and ends of the previous food articles are dropped through a loaf end door. After the grippers have reached the retracted position or "home position" remote from the slicing blade, a loaf sweep mechanism is activated, moving the food articles laterally together into the slicing position. A spacing mechanism moves down and spaces the food articles apart. The grippers then advance after it has been determined that the loaf sweep mechanism has moved the food articles to the slicing position. The grippers have onboard sensing mechanisms that are triggered by contact with the food articles. After sensing and gripping the food articles, the food articles are retracted slightly, and the loaf-to-slicing blade gate doors are opened and the food articles are advanced to the slicing plane of the slicing blade. The loaf sweep mechanism retracts and the loaf lift tray lowers, ready for the next reload cycle. According to this design, in practice, the reload cycle is accomplished in about eight seconds. In a high volume slicing operation, reload cycle time can be a significant limitation to optimum production efficiency.

In either configuration the FX180® slicing machine has achieved great commercial success. However, the present inventors have recognized that it would be desirable to slice up to four food articles or more with independent feeding and weighing capabilities, with hygienic and operational enhancements.

SUMMARY OF THE INVENTION

The present invention provides a high speed slicing apparatus and a weighing and classifying conveyor combination that provides plural advantages in productivity, food hygiene, and operation.

The combination provides a mechanism and method for slicing multiple food articles with independency of feed rate and the ability to weigh each product group from each food article respectively to achieve optimal weight control and yield of each food article. The combination provides food hygiene advantages by the use of unibody construction with minimal penetrations, double sealed door closures, and self draining angled surfaces. It also provides hygienic, round, sealed adjustable legs, and a hygienic configuration of a food article lift and sweep mechanism. Further, the combination provides an automated cleanup position wherein, the elevated food article feed mechanism can be collapsed to a more convenient plane or maintenance position, the weighing and classifying conveyor is oriented at a distance from the slicing apparatus for ease of cleanup and maintenance, and the slicing head cover is automatically lifted to an open cleanup position. Additionally, all product contact conveyor belts throughout the combination are easily removable.

Numerous other advantages and features of the present invention will become readily apparent from the following detailed description of the invention and the embodiments thereof, and from the accompanying drawings.

BRIEF DESCRIPTION OF THE DRAWINGS

FIG. 4B is a fragmentary, elevational, enlarged view of a portion of the slicing machine shown in FIG. 1;

FIG. 15 is an elevational view of the food article feed apparatus shown in FIG. 14;

FIG. 15A is a sectional view taken generally along line 15A-15A;

FIG. 16 is an elevational view of the food article feed apparatus;

FIG. 17 is a plan view of a gripper taken from the food article feed apparatus of FIG. 16;

FIG. 17A is a front view of the gripper taken generally along line 17A-17A of FIG. 17;

FIG. 18 is a sectional view taken generally along line 18-18 of FIG. 17A;

FIG. 33A is a sectional view taken generally along line 33A-33A of FIG. 33;

FIG. 37 is an enlarged fragmentary far side elevational view of the combination of FIG. 1 showing underlying components and features;

FIG. 46A is a near side elevational view of the slicing apparatus showing underlying components;

DESCRIPTION OF THE PREFERRED EMBODIMENTS

Figure 1:
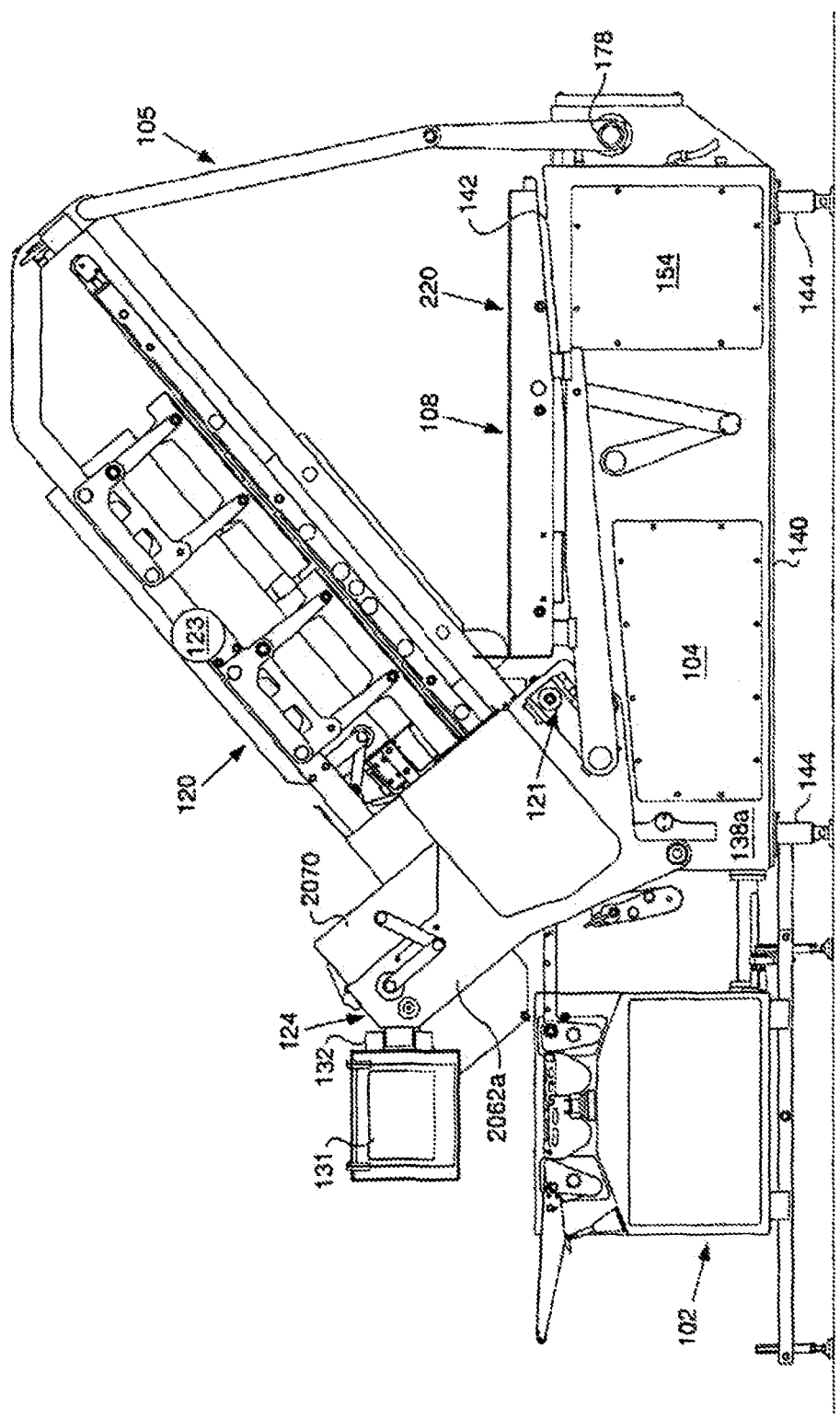
FIG. 1 is a near side elevational view of a slicing machine and a weighing and classifying conveyor combination of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

U.S. Patent Application No. 60/999,961 filed on Oct. 22, 2007 and U.S. Patent Application No. 61/000,202 filed on Oct. 23, 2007 are both herein incorporated by reference.

Figure 2:
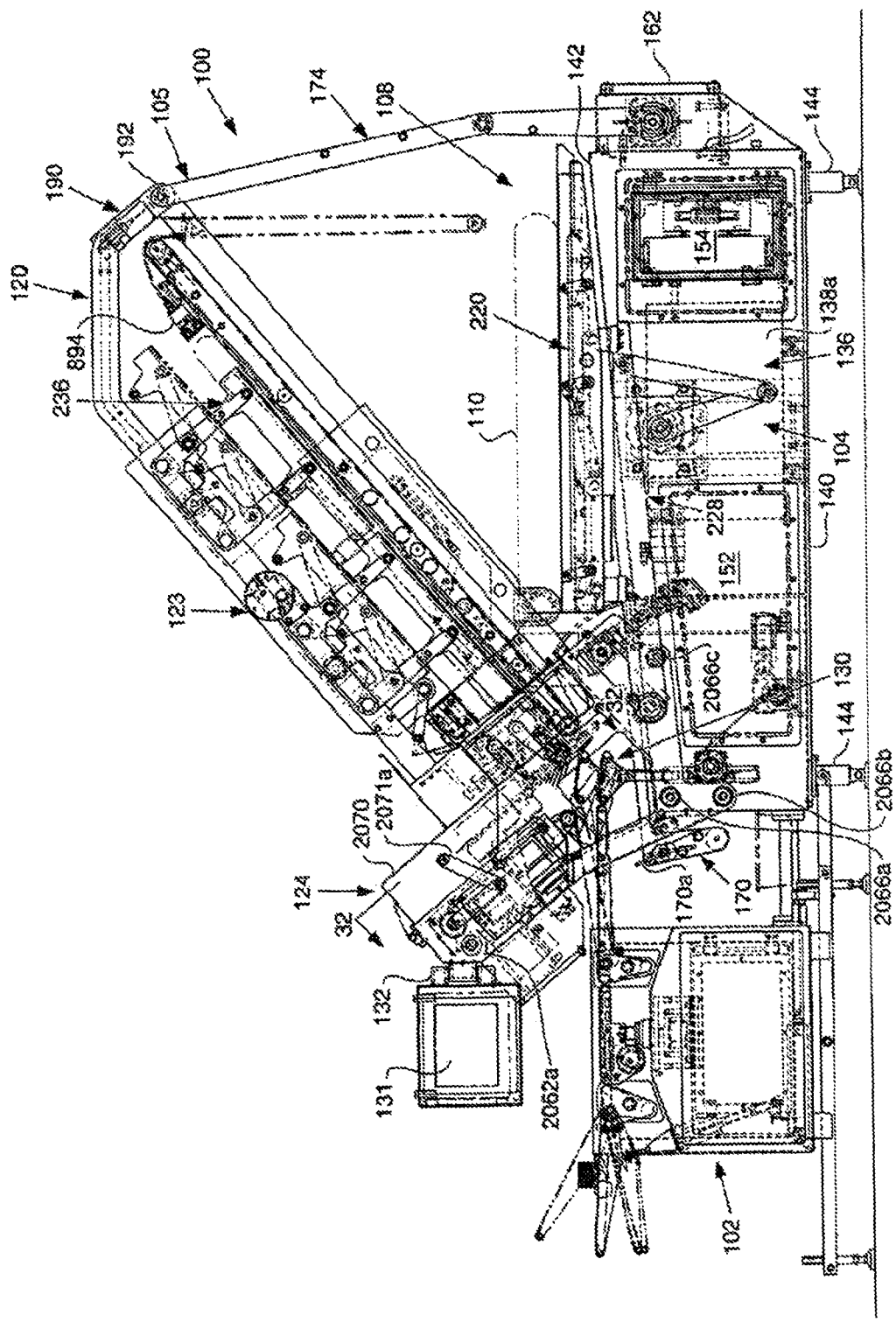
FIG. 2 is an elevational view of the combination of FIG. 1 with some panels removed or made transparent illustrating some underlying components.
Figure 3:
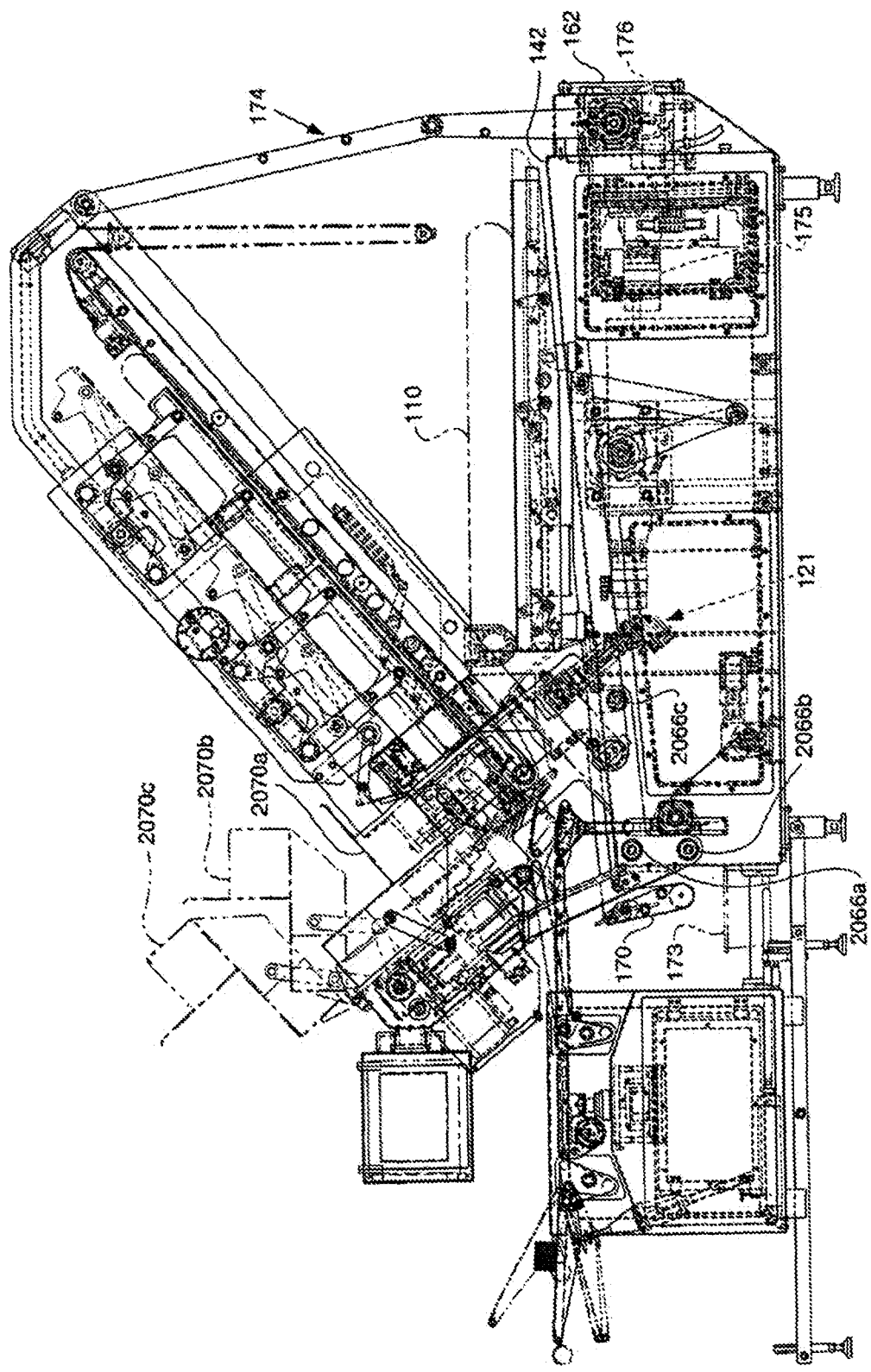
FIG. 3 is an elevational view of the combination of FIG. 1 with further panels removed or made transparent and underlying components revealed.

FIGS. 1-3 illustrate a high speed slicing apparatus 100 and a weighing and classifying conveyor or output conveyor 102 according to a preferred embodiment of the invention. The slicing apparatus 100 includes a base section 104, a collapsible frame 105, an automatic food article loading apparatus 108 that receives food articles 110 to-be-sliced, a food article feed apparatus 120, a food article feed elevation adjusting apparatus 121, a food article end removal apparatus 122 (FIG. 27), a laser safety guard system 123, a slicing head apparatus 124, and a slice receiving apparatus 130. The slicing apparatus also includes a computer display touch screen 131 that is pivotally mounted on and supported by a support 132.

The apparatus 100 can also include an onboard information carrier system 135 (FIGS. 51, 52) that allows installed parts to be tagged with an information read and write data carrier that can communicate control or maintenance or other information to machine control.

Base Section

The base section 104 includes a compartment 136 having side walls 138a, 138b, a bottom wall 140, and an inclined top wall 142. The apparatus 100 is supported on four adjustable feet 144. The compartment 136 has a tapered side profile from back to front wherein the top wall 142 slants down from back to front. The slanted orientation of the top wall 142 ensures water drainage off the top of the compartment 136.

Figure 4:
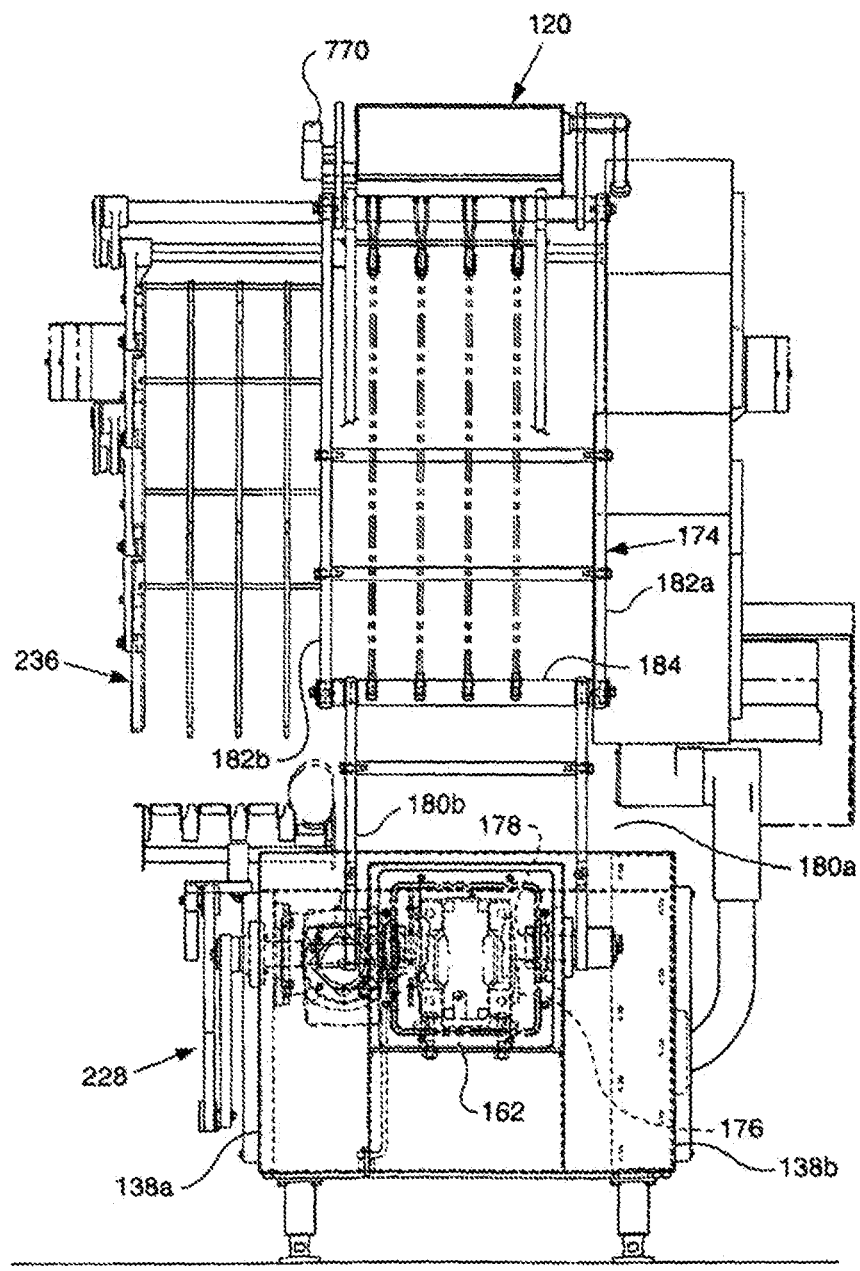
FIG. 4 is a rear view of the combination shown in FIG. 3.

The adjustable feet 144 are shown in FIG. 4B. The feet include a cylinder 144a that is bolted to the bottom wall 140. The cylinder 144a includes an internal threaded bore 144b that receives a threaded portion 144f of a shaft 144c that is mounted on a foot base 144d. The shaft 144c includes a smooth portion 144g of below the threaded portion 144f. The smooth portion 144g is sealed to the cylinder 144a by an o-ring 144h carried inside the cylinder 144a. This design prevents threads from being exposed which can collect particles and spray water from clean up.

The compartment 136 includes near side doors 152,154, far side doors 156, 158 (FIG. 5), and a rear door 162 that permit access into the compartment or to modules normally within the compartment 136. The compartment 136 typically affords an enclosure for a computer, motor control equipment, a low voltage supply, and a high voltage supply and other mechanisms as described below. The compartment may also include a pneumatic supply or a hydraulic supply, or both (not shown).

Base section 104 also includes a debris or scrap conveyor 170 that can be operated to slowly circulate at all times to remove food pieces or other debris that would otherwise collect on top of the top wall 142, and delivers the debris to a collector bucket 173 located below an output end 170a of the conveyor 170.

The debris conveyor 170 is shown in FIGS. 45 and 47-50. The debris conveyor includes a belt 163 that circulates around a rear idle roller 164a, a front tensioning roller 164b and a drum motor roller 164c. The belt circulates against a front idle roller 164d. The rollers 164b and 164c are supported by side plates 165a, 165b. The side plates 165a, 165b are fixed to support shafts 166a, 166b which are attached in cantilever fashion to a far side of the machine by a triangular base plate 167 that is fastened to end nuts 2066a, 2066b of the tubular shafts 2067a, 2067b described below. The cantilever mounting allows for the belt to be removed off the rollers at a near side of the machine for cleaning.

Each of the rollers 164a, 164b, 164d are rotatably carried on a pair of bearings 168 that have a block shaped outer contour 168a with a recessed square block shaped region 168b. The square block shaped region 168b of each bearing 168 is configured to tightly fit within a respective support bracket 169a, 169b, 169c to removably support the respective roller. The outer contour 168a captures the respective support bracket 169a, 169b, 169c by sandwiching both sides of the respective bracket 169a, 169b, 169c. The support brackets 169a are J-shaped hangers located on the far side and near side of the machine. The support brackets 169b, 169b are U-shaped brackets mounted to the side plate 165a at the far side of the machine and to the front of the compartment 136 at a near side of the machine. The support brackets 169c, 169c are formed as part of the side plates 165a, 165b and are open upward.

A tensioning shaft 171 extends across the conveyor 170 below the roller 164b. The shaft 171 is connected to cams 171a, 171b at positions adjacent to and outside of the side plates 165a, 165b. At a near side of the machine a handle 171h is fixed to the shaft 171. The cams 171a, 171b ride against bottoms 168c of the rectangular block shaped contours 168a of the bearings 168. Each cam 171a, 171b has a substantially flat portion 171c on its cam surface that underlies the bottoms 168c to lock the roller 164b in an elevated position to tension the belt 163.

To tension the belt 163, the handle 171h is turned from the pointing down position shown in FIG. 46A to the pointing up position shown in FIG. 46A, i.e., turned clockwise.

Collapsible Frame and Elevated Housings

The base section 104 supports the collapsible frame 105 as shown in FIGS. 1-4A. The collapsible frame 105 includes a foldable support mechanism 174 that supports a food article feed mechanism frame 190.

The foldable support mechanism 174 includes a servomotor 175 that drives a gear reducer 176 having a drive shaft 178 that extends out of the gear reducer 176 at opposite ends. The drive shaft 178 is fixed to parallel levers 180a, 180b which swing out with a turning of the drive shaft 178. The levers 180a, 180b are pivotally connected to parallel support columns 182a, 182b via an axle joint 184. The columns 182a, 182b are pivotally connected to the frame 190 which pivotally supports the food article feed apparatus 120 on an axle 192.

Figure 5:
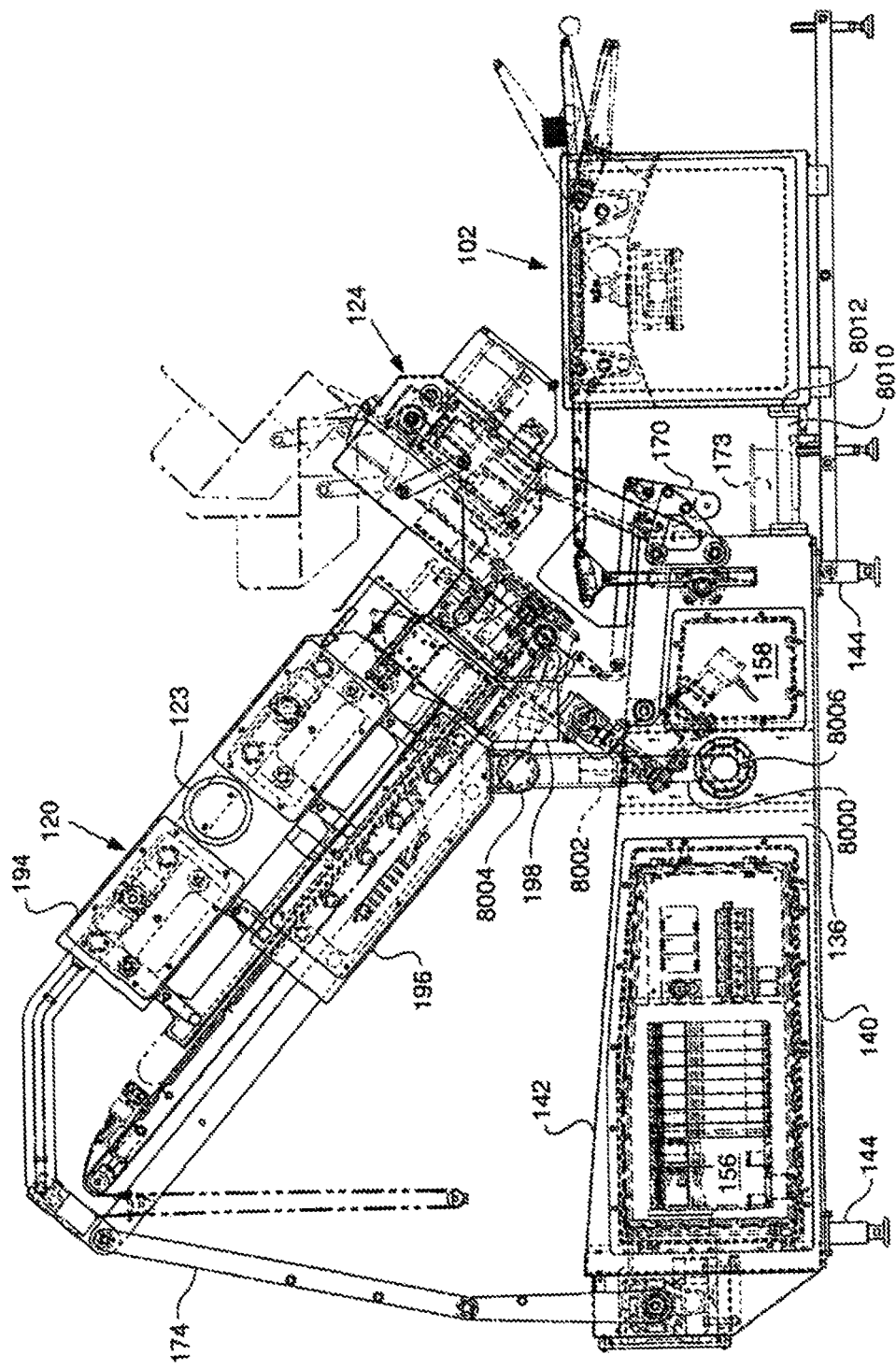
FIG. 5 is a far side elevational view of the combination shown in FIG. 1.
Figure 6:
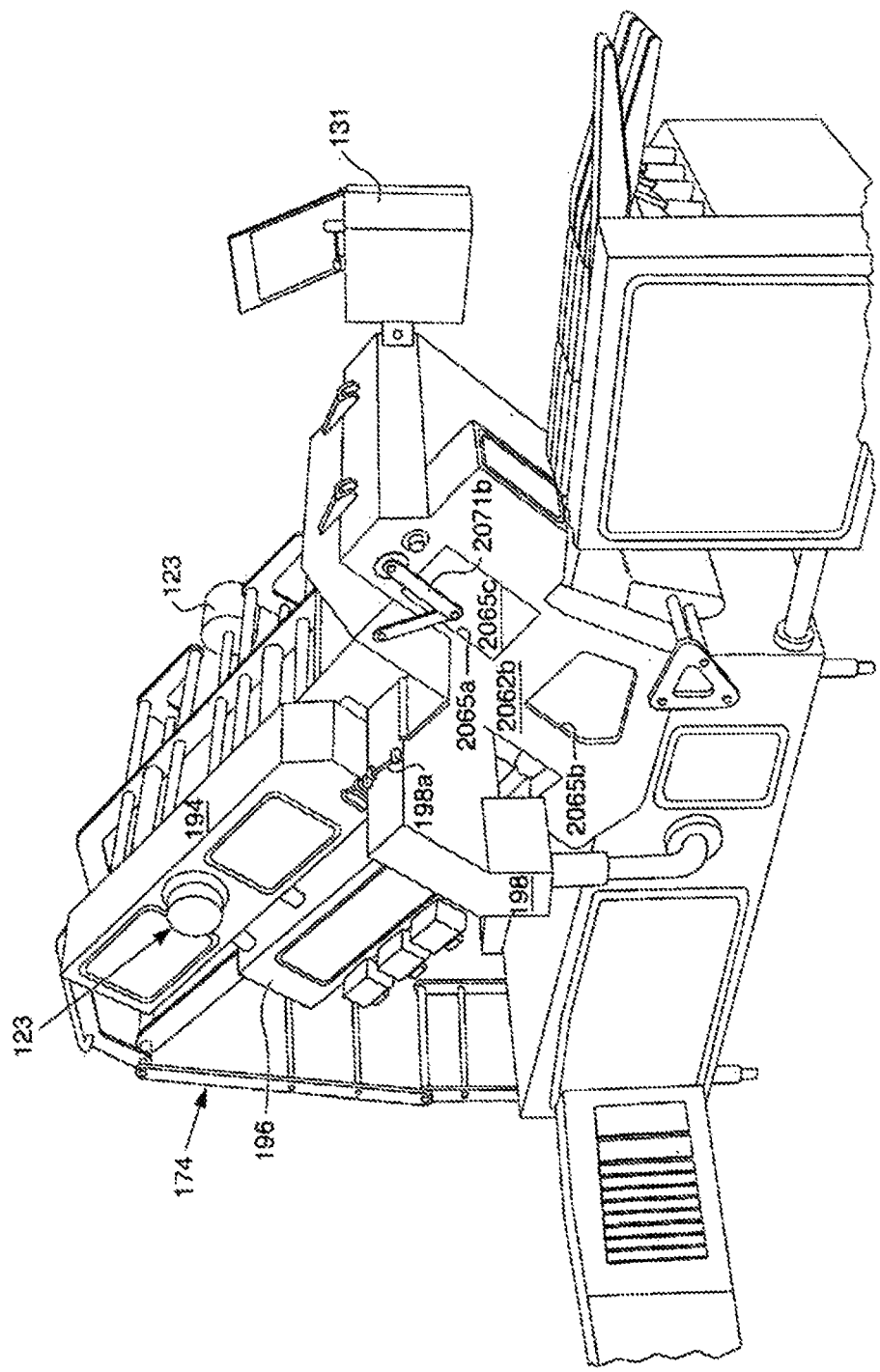
FIG. 6 is a far side perspective view of the combination shown in FIG. 5.

The food article feed mechanism frame 190 also supports a sweep mechanism housing 194, a feed conveyor drive housing 196, and a end disposal housing 198, all on the far side of the apparatus, shown in FIGS. 5 and 6. The frame also supports the laser safety guard system 123.

Figure 4A:
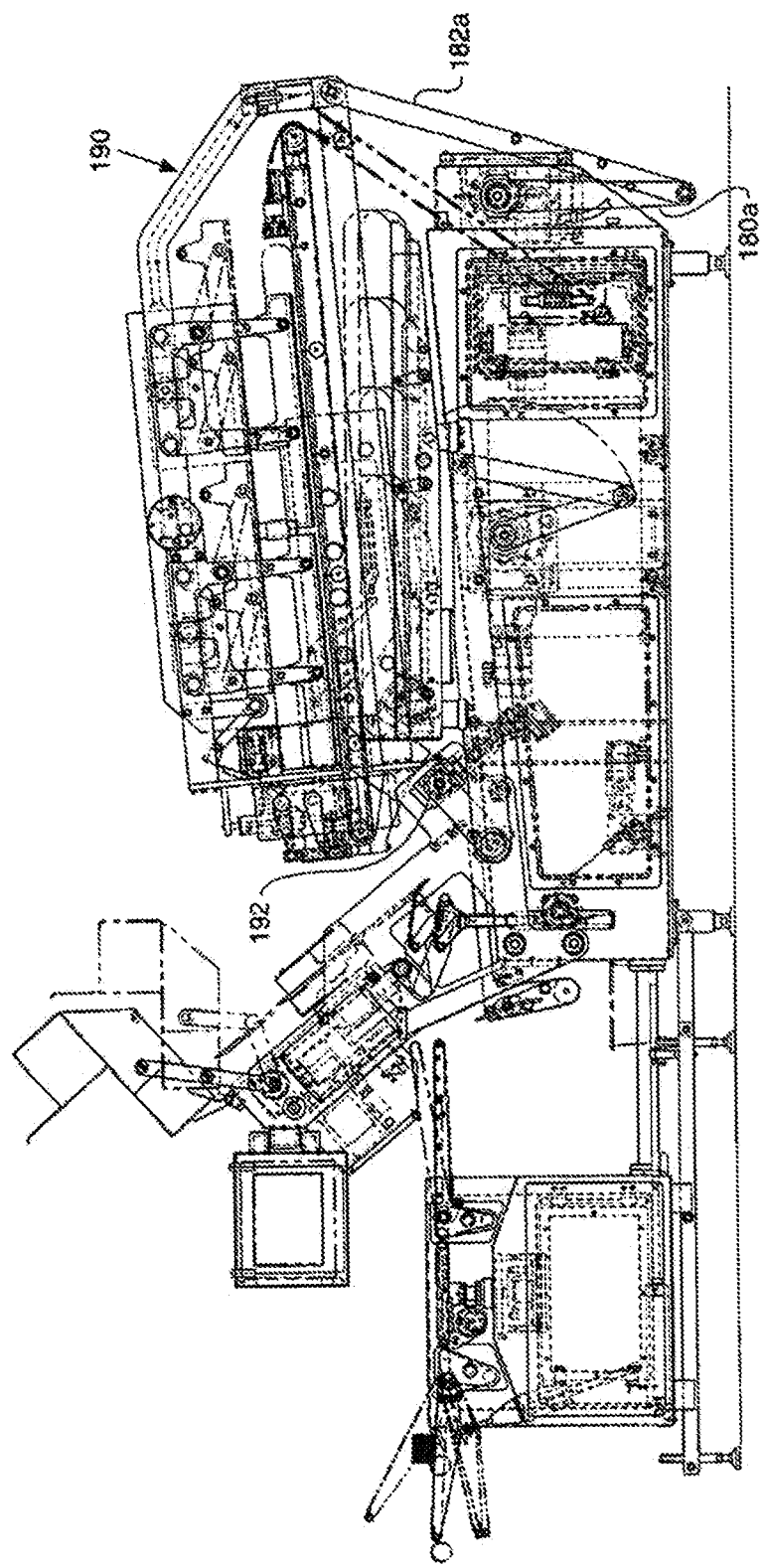
FIG. 4A is an elevational view of the combination of FIG. 1 in a clean-up, non-operational position.

For cleaning and maintenance purposes, the collapsible frame 105 is collapsed down by actuating the servomotor 175 and gear reducer 176 to rotate the levers 180a, 180b, which draws down the columns 182a, 182b as the frame 190 rotates on the axle 192. The frame 190, and all equipment supported thereby, is lowered for more convenient maintenance and cleaning as illustrated in FIG. 4A. In some cases this eliminates the need for ladders or platforms when servicing the slicing apparatus 100.

Automatic Food Article Loading Apparatus

Figure 7:
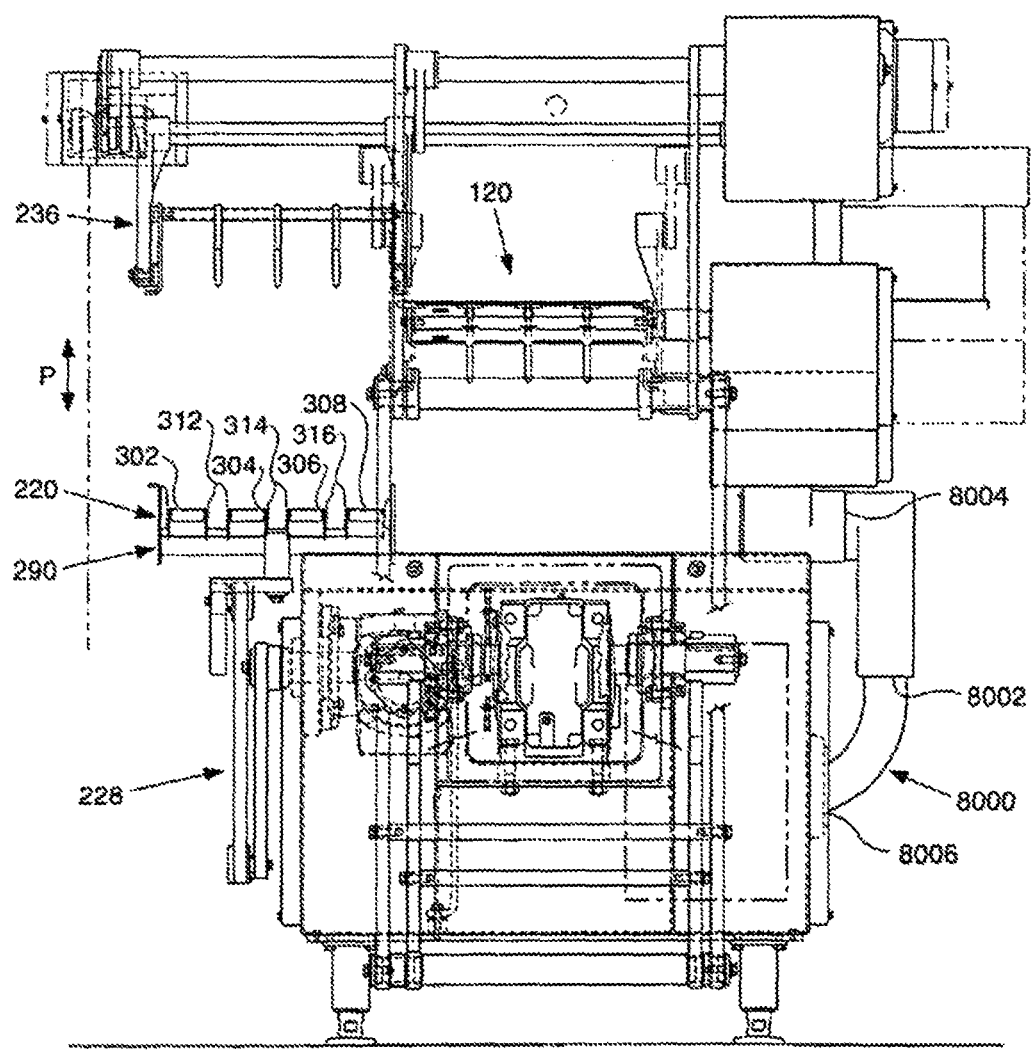
FIG. 7 is a rear view of the combination shown in FIG. 3.
Figure 8:
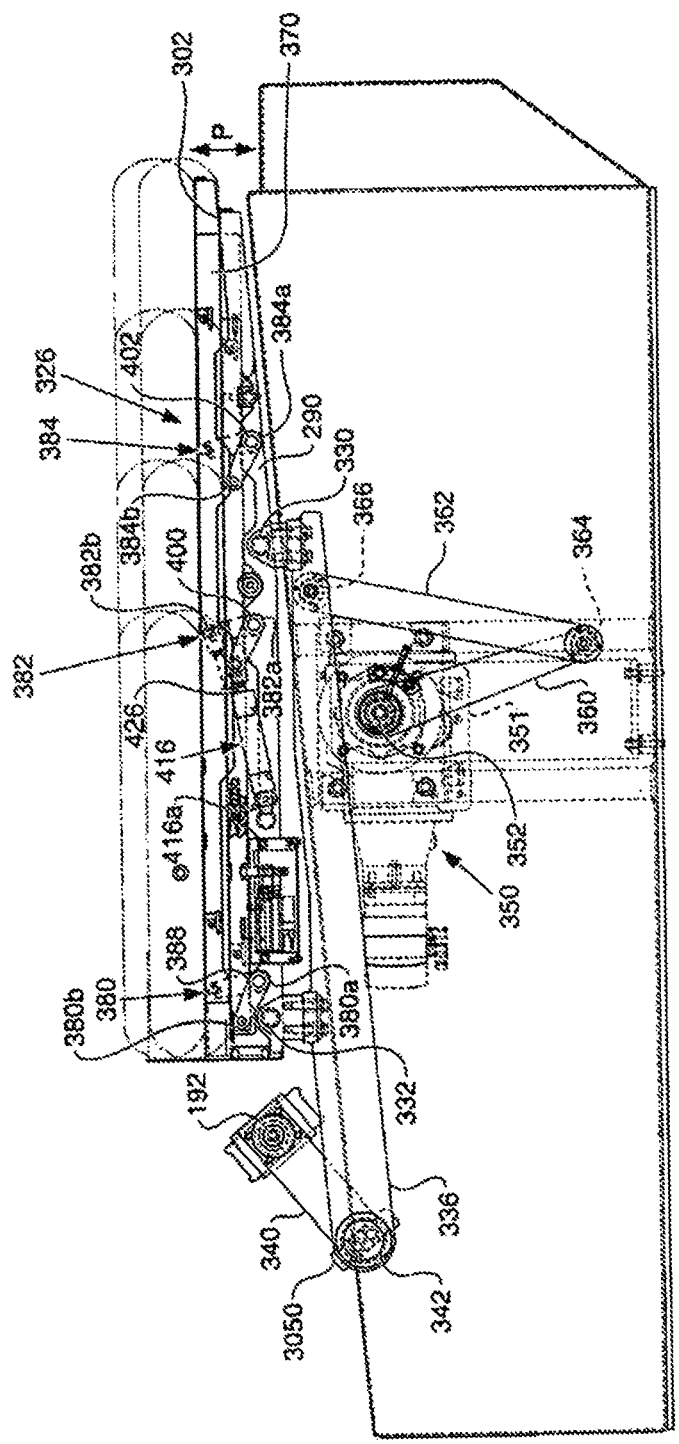
FIG. 8 is an enlarged, fragmentary near side elevational view of food article lift tray and food article positioning systems.
Figure 9:
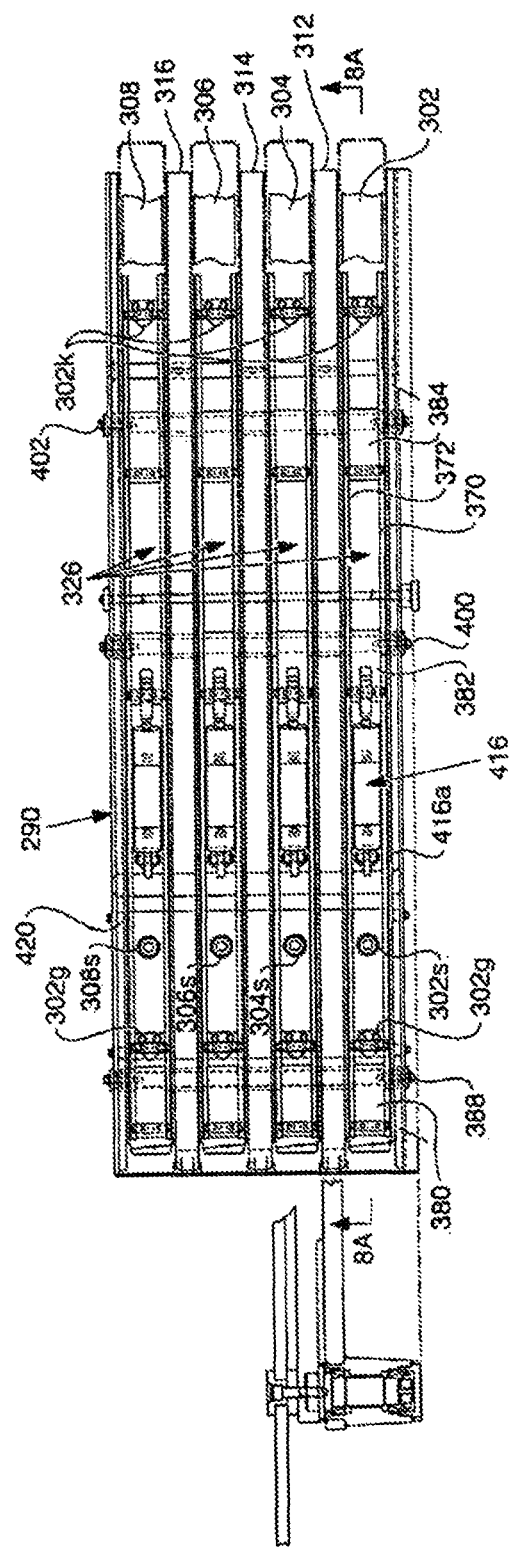
FIG. 9 is a fragmentary plan view of a food article lift tray.

As illustrated in FIG. 7-9, the automatic food article loading apparatus 108 includes a lift tray assembly 220, a lift tray positioning apparatus 228 and a food article lateral transfer apparatus 236. The lift tray assembly 220 receives food articles to-be-sliced. The tray positioning apparatus 228 pivots the tray assembly 220 to be laterally adjacent to, and parallel with, the food article feed apparatus 120. The food article lateral transfer apparatus 236 moves the food articles from the lift tray assembly 220 onto the food article feed apparatus 120.

Lift Tray Positioning Apparatus

Figure 10:
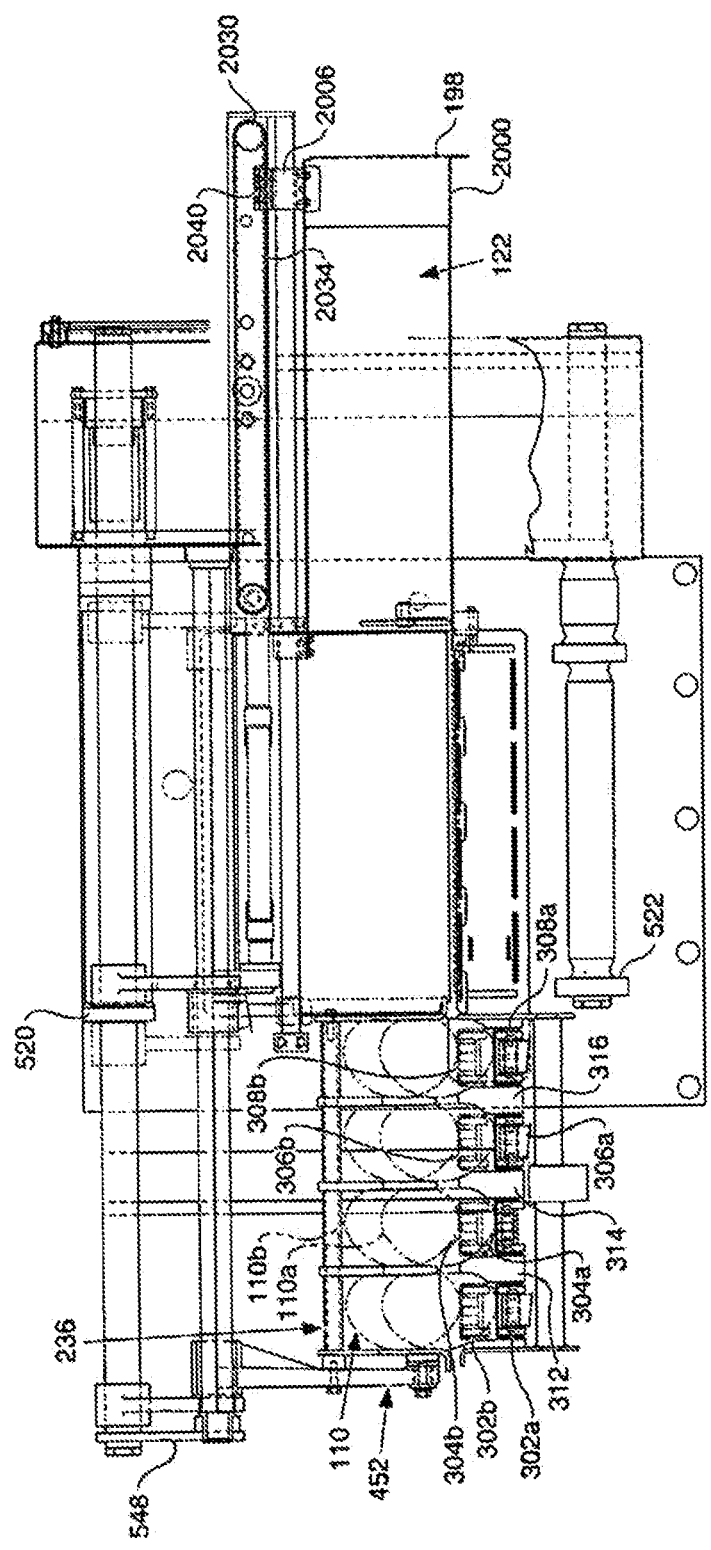
FIG. 10 is a rear view of the food article lift tray shown in FIG. 9.

FIGS. 7, 9 and 10 illustrate the food article lift tray assembly 220 includes a frame 290 that supports four movable food article support plates 302, 304, 306, 308.

As illustrated in FIG. 8, the frame 290 is connected by a rear connection 330 and a front connection 332 to a lever 336. The lever 336 is pivotally connected to a height adjustment bar 340 at a pivot connection 342. A servomotor 350 drives a gear reducer 351 that has an output shaft 352 that is fixed to a crank arm 360. The crank arm 360 is pivotally connected to a lift arm 362 at a pivot connection 364. The lift arm 362 is pivotally connected to the lever 336 at a pivot connection 366.

When the servomotor 350 turns the crank arm 360 via the gear reducer 351, the crank arm 360 is turned counterclockwise in FIG. 8 and the lift arm 362 is elevated to pivot the lever 336 about the pivot connection 342. This pivots and elevated the rear end of the frame 290 and the food article lift tray assembly 220.

Lift Tray Assembly

As illustrated in FIGS. 9 and 10, the support plates 302, 304 are separated by a divider 312. The support plates 304, 306 are separated by a divider 314. The support plates 306, 308 are separated by a divider 316. The dividers 312, 314, 316 are fixed with respect to the frame 290. The support plates 302, 304, 306, 308 are movable in a perpendicular direction "P" to a length direction of the frame 290 (FIG. 8). When the frame 290 is horizontally oriented, direction "P" is substantially vertical.

Figure 40:
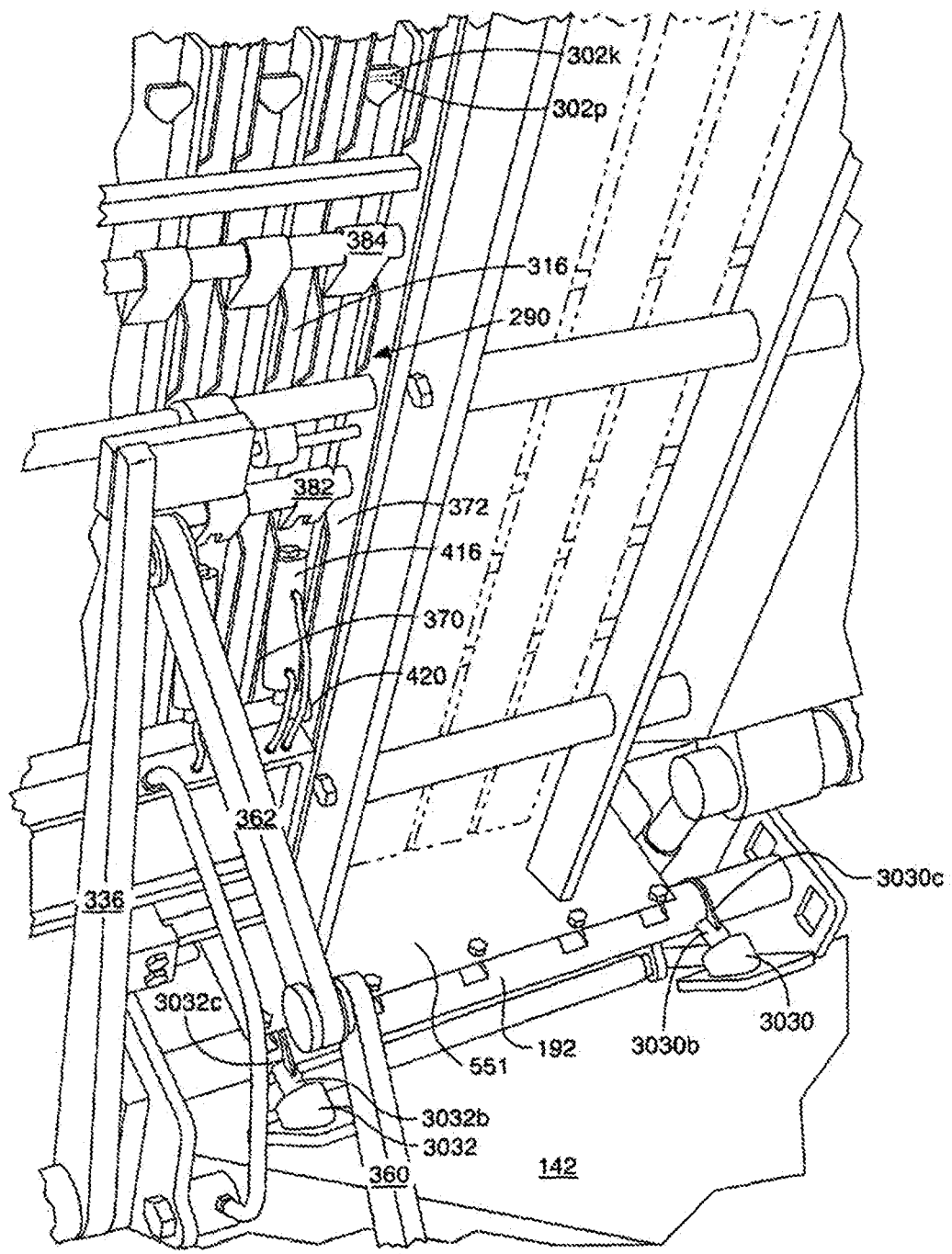
FIG. 40 is a bottom perspective view of the lift tray and food article feed apparatus.

Each food article support plate 302, 304, 306, 308 is supported by a selective lift mechanism 326 described in FIGS. 8, 9 and 40. FIG. 8 discloses the selective lift mechanism 326 for the support plate 302 with the understanding that the selective lift mechanism 326 for each of the food article support plates 302, 304, 306, 308 is identical.

The support plate 302 is fastened to two parallel lift bars 370, 372. Three swing levers 380, 382, 384 are pivotally connected to transverse shafts 388, 400, 402 of the frame 290, at base ends 380a, 382a, 384a of the swing levers 380, 382, 384, respectively. Distal ends 380b, 382b, 384b of the swing levers 380, 382, 384, respectively, are pivotally connected to the two parallel lift bars 370, 372. A pneumatic cylinder 416 is pivotally connected at a first end 416a to a transverse strut 420 of the frame 290. The cylinder 416, particularly the cylinder rod 426, is pivotally connected at a second end 416b to the distal end 382b of the swing lever 382.

Figure 8A:
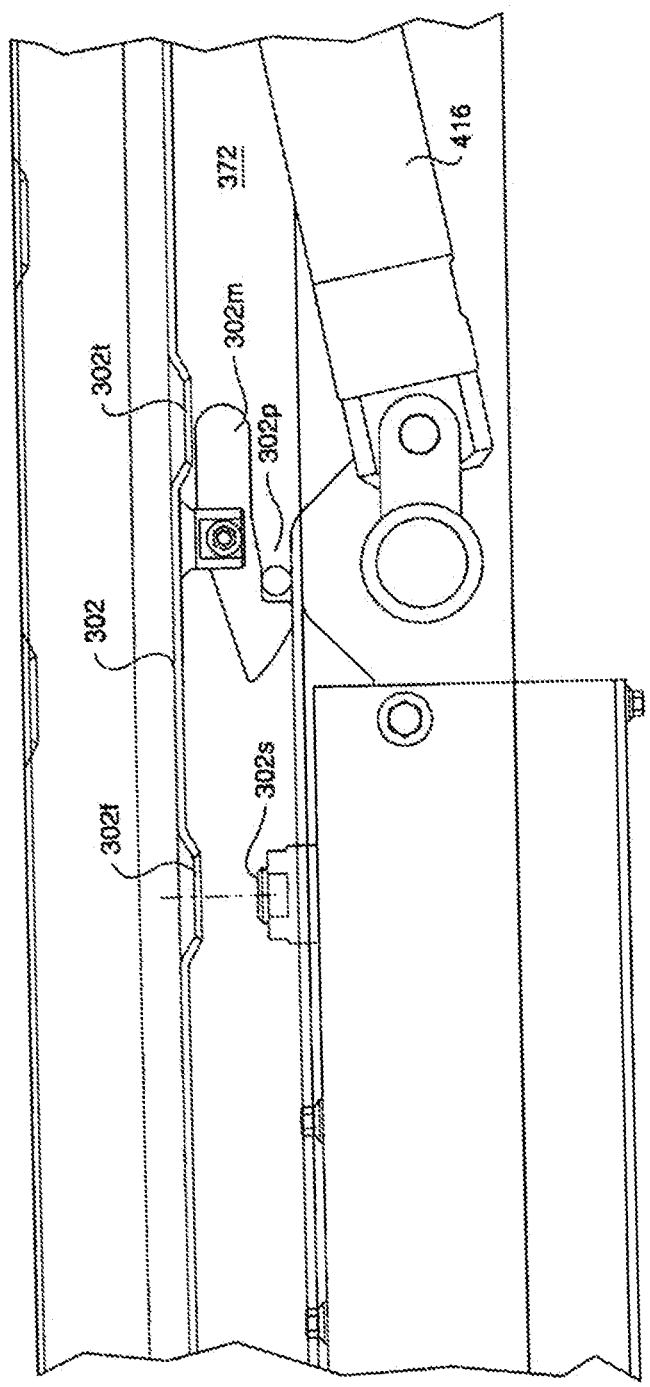
FIG. 8A is an enlarged fragmentary sectional view taken generally along line 8A-8A of FIG. 9.

Each support plate is provided with an optical sensor or other proximity sensor 302s, 304s, 306s, 308s that is signal-connected to machine control. As illustrated in FIG. 8A, the sensors 302s, 304s, 306s, 308s beam light and receive reflected light through a hole 302f in the respective support plate. The proximity sensors 302s, 304s, 306s, 308s are configured to sense when a food article is loaded onto the respective support plate 302, 304, 306, 308.

Each support plate is also provided with fore and aft stationary hooks 302g, 302k that engage pins 302p spanning between the lift bars 370, 372 and which hooks are open facing forwardly, and a movable latch 302m that engages a pin 302p between the lift bars 370, 372. The latch 302m has a hook that is open rearward and can be disengaged by a finger pushed down through a hole 302t in the respective support plate, and the support plate then moved rearwardly, to the rights in FIGS. 8A and 9, disengaging the hooks 302g, 302k to allow the support plate to be withdrawn from the lift tray for cleaning.

In operation, when the cylinder 416 is actuated pneumatically to elongate, i.e., the rod 426 is moved to the right in FIG. 8, the swing levers 380, 382, 384 will swing clockwise about their base ends 380a, 382a, 384a. The swing lever 382 will swing from direct force by the cylinder 416 and the swing levers 380, 384 will swing from the force from the parallel lift bars 370, 372 on the distal ends 380b, 384b, of the swing levers 380, 384.

Figure 64:
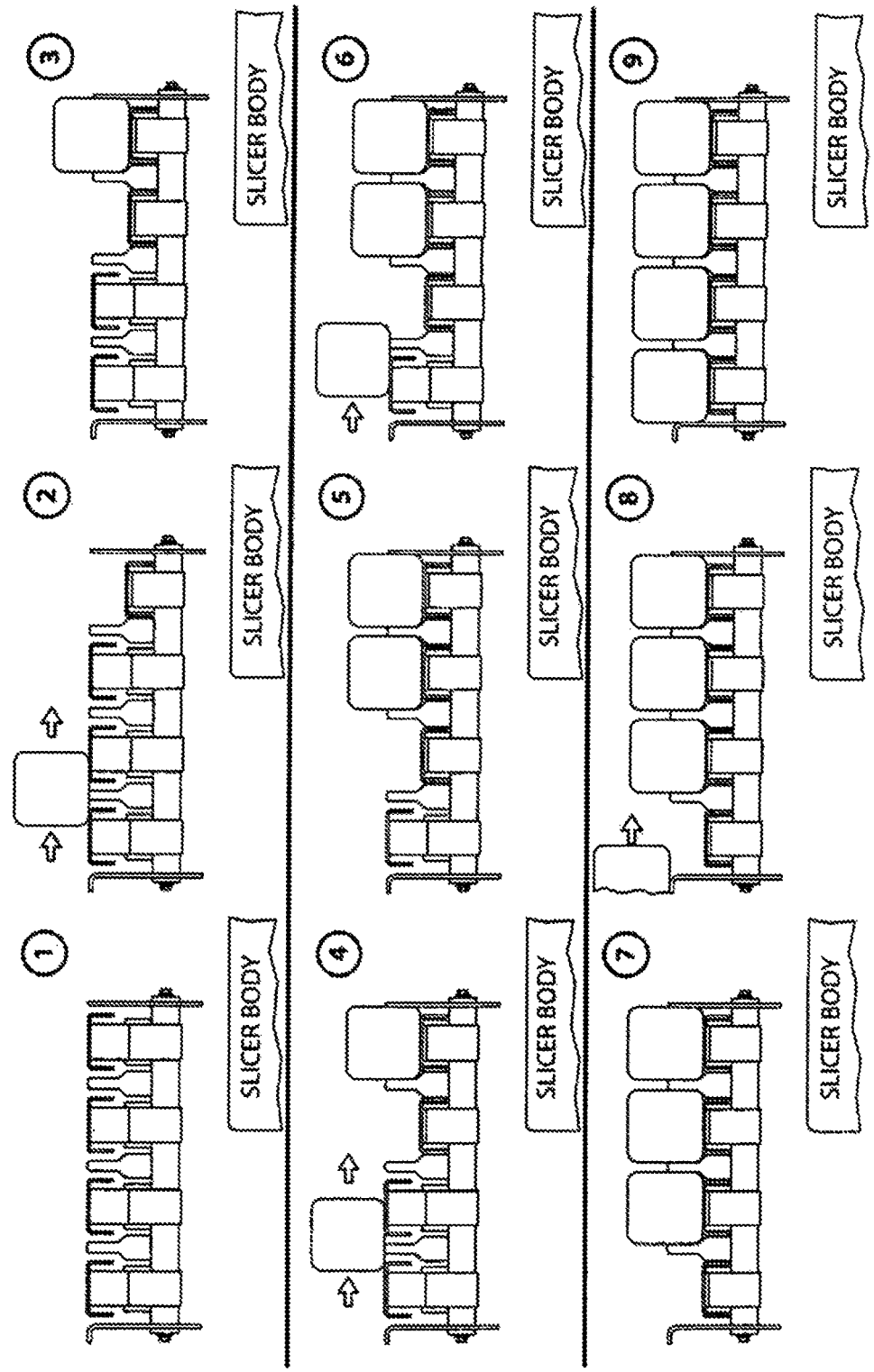
FIG. 64 is a progressive schematic diagram showing the loading of four food articles onto a food article lift tray.
Figure 65:
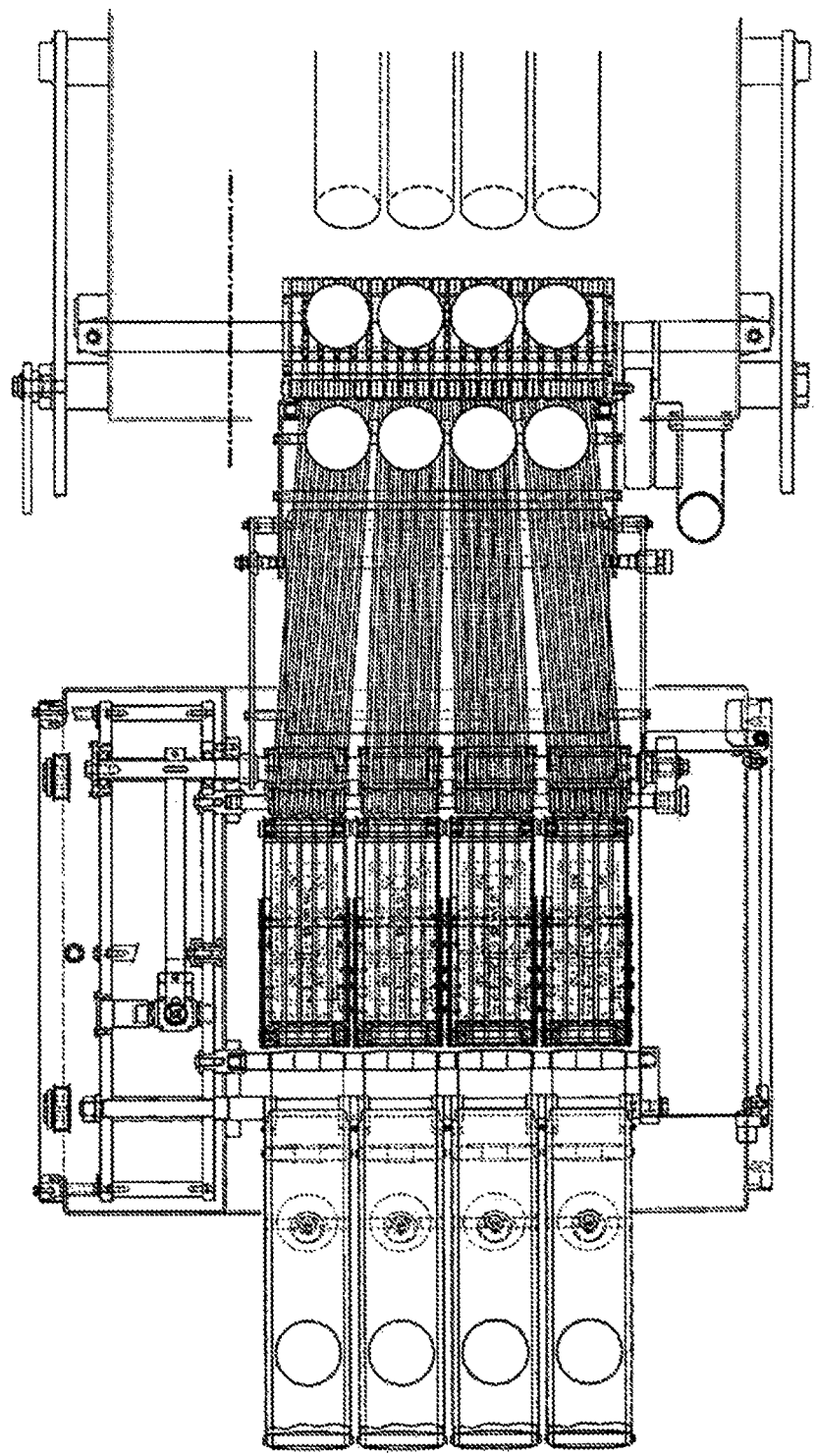
FIG. 65 is a schematic plan view showing the weighing and classifying conveyor configured for four lanes of sliced product.
Figure 66:
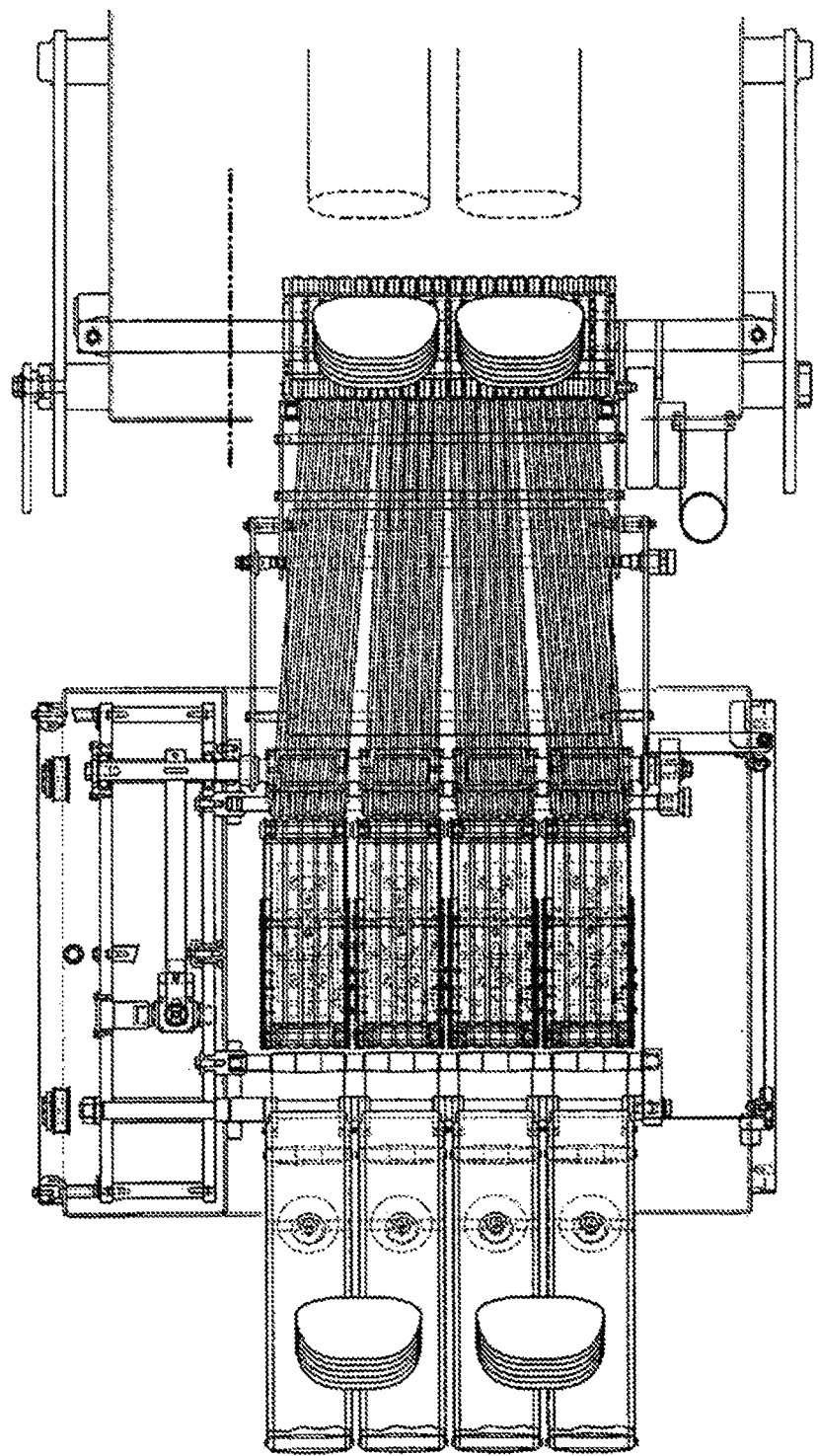
FIG. 66 is a schematic plan view showing the weighing and classifying conveyor configured for two lanes of sliced product.
Figure 67:
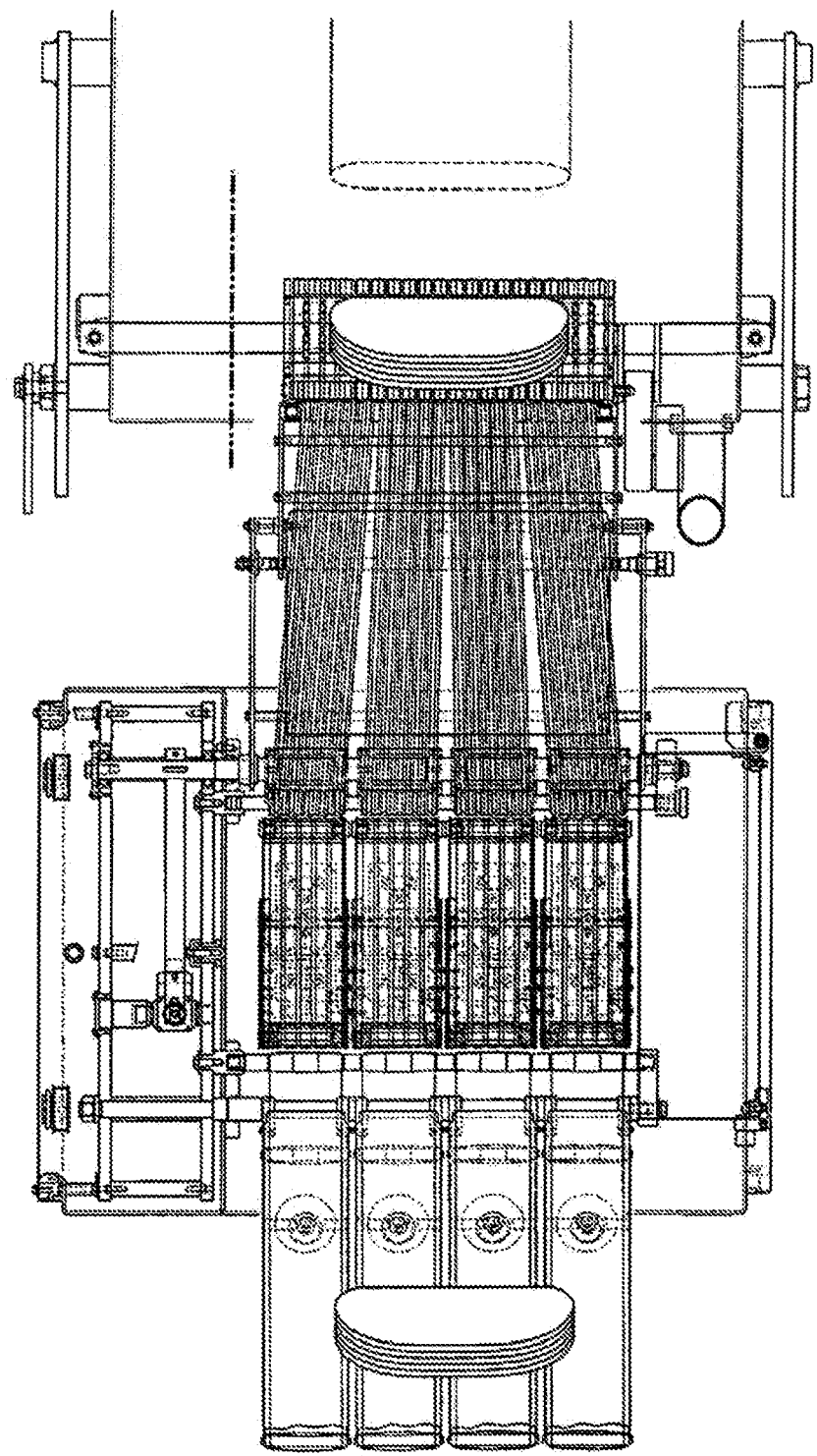
FIG. 67 is a schematic plan view showing the weighing and classifying conveyor configured for one lane of sliced product.
Figure 68:
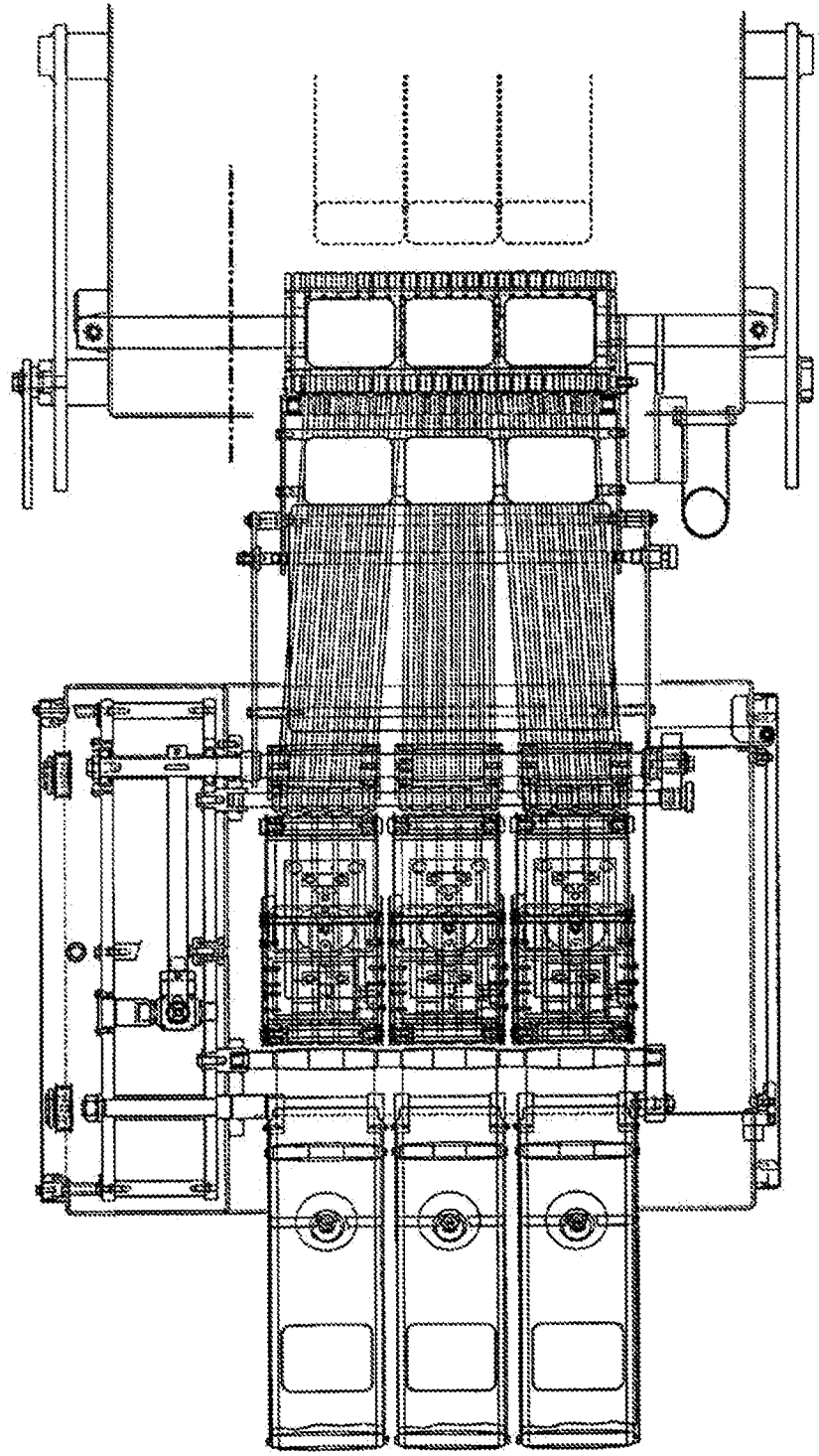
FIG. 68 is a schematic plan view showing the weighing and classifying conveyor configured for three lanes of sliced product.
Figure 69:
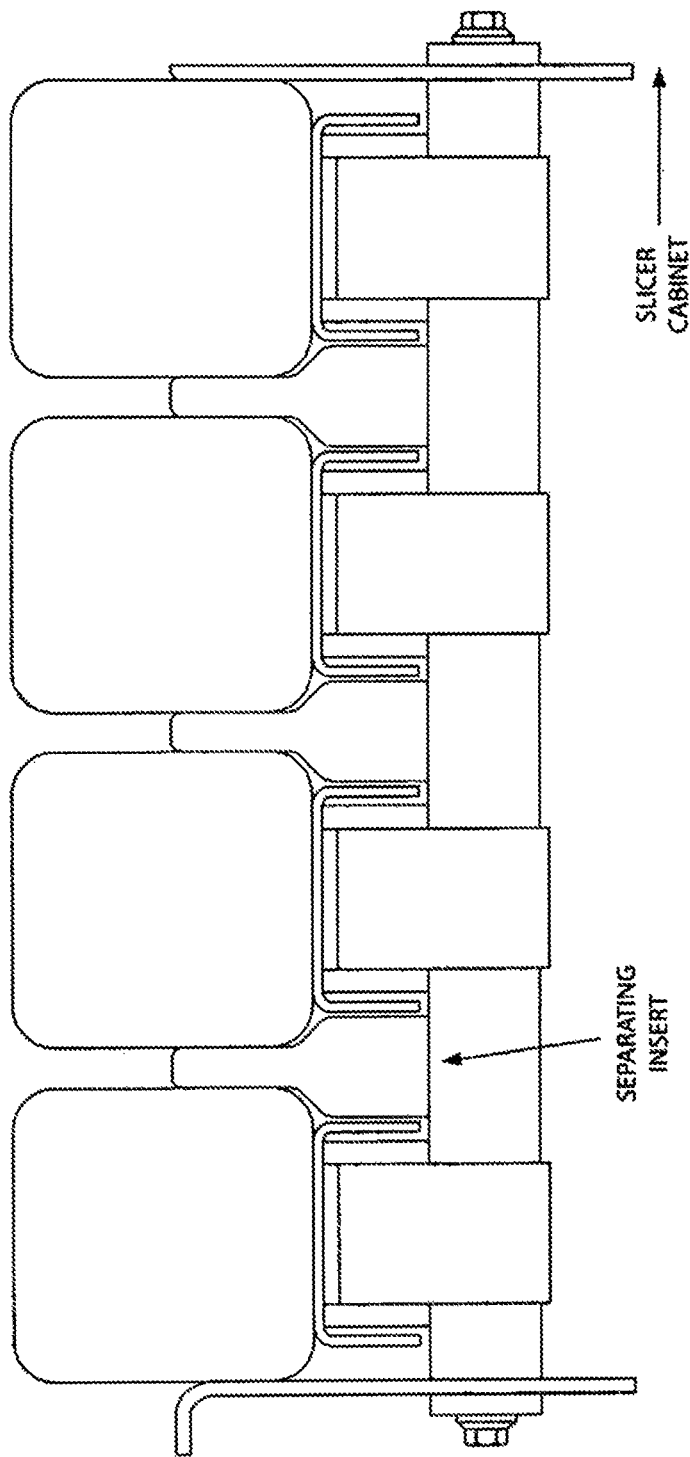
FIG. 69 is a schematic rear end view of the food article lift tray showing the tray configured to hold four square cross section food articles.
Figure 70:
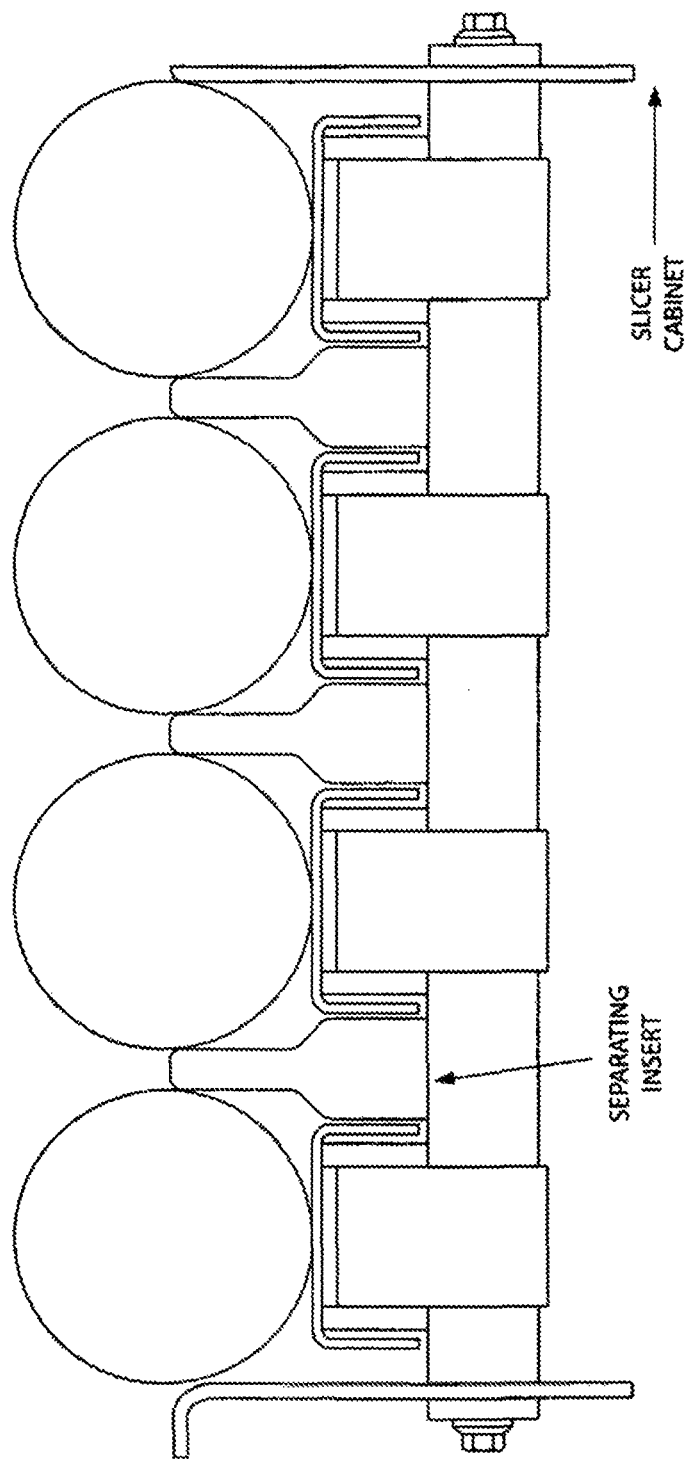
FIG. 70 is a schematic rear end view of the food article lift tray showing the tray configured to hold four circular cross section food articles.
Figure 71:
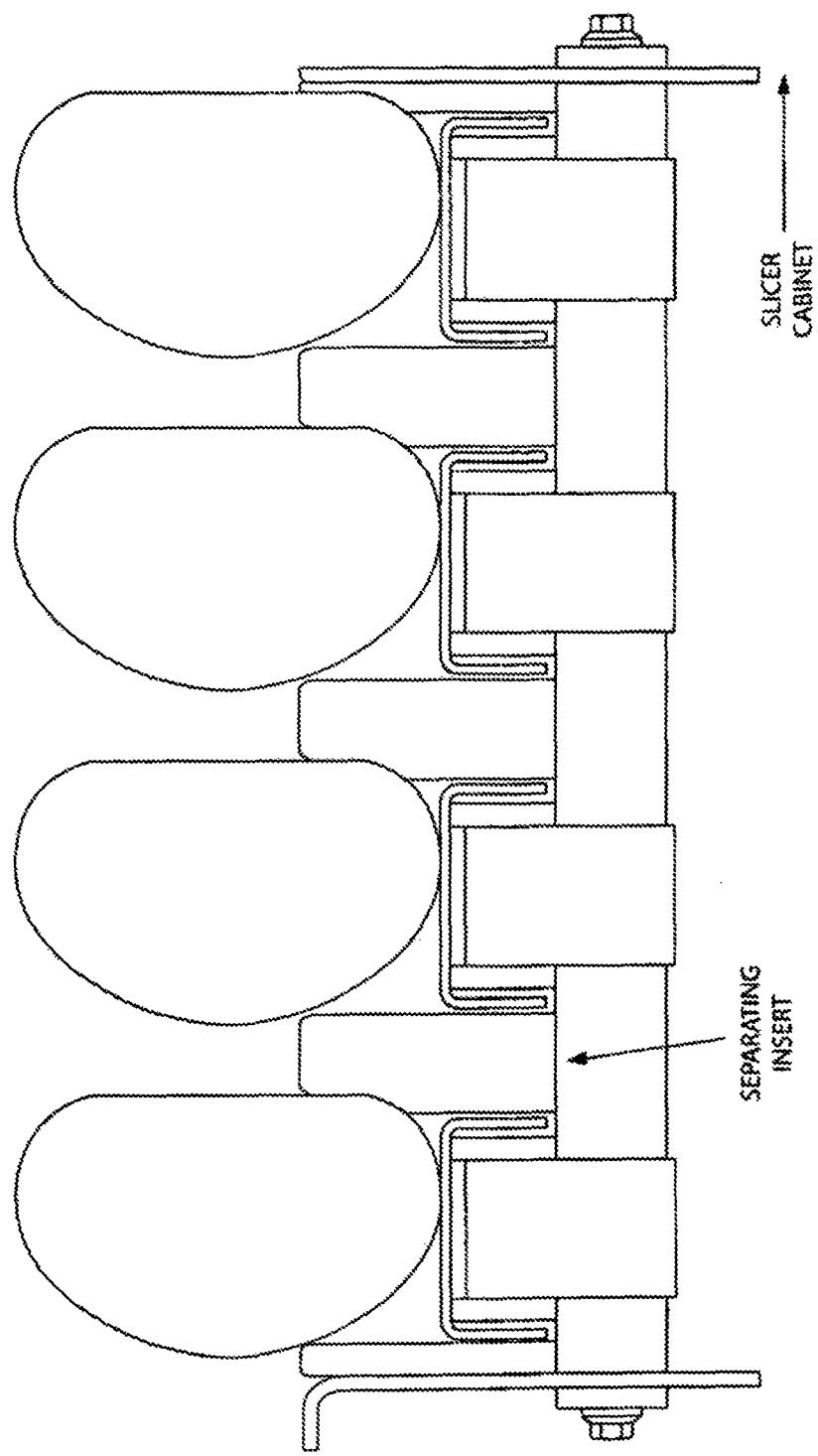
FIG. 71 is a schematic rear end view of the food article lift tray showing the tray configured to hold four large D-shaped food articles.
Figure 72:
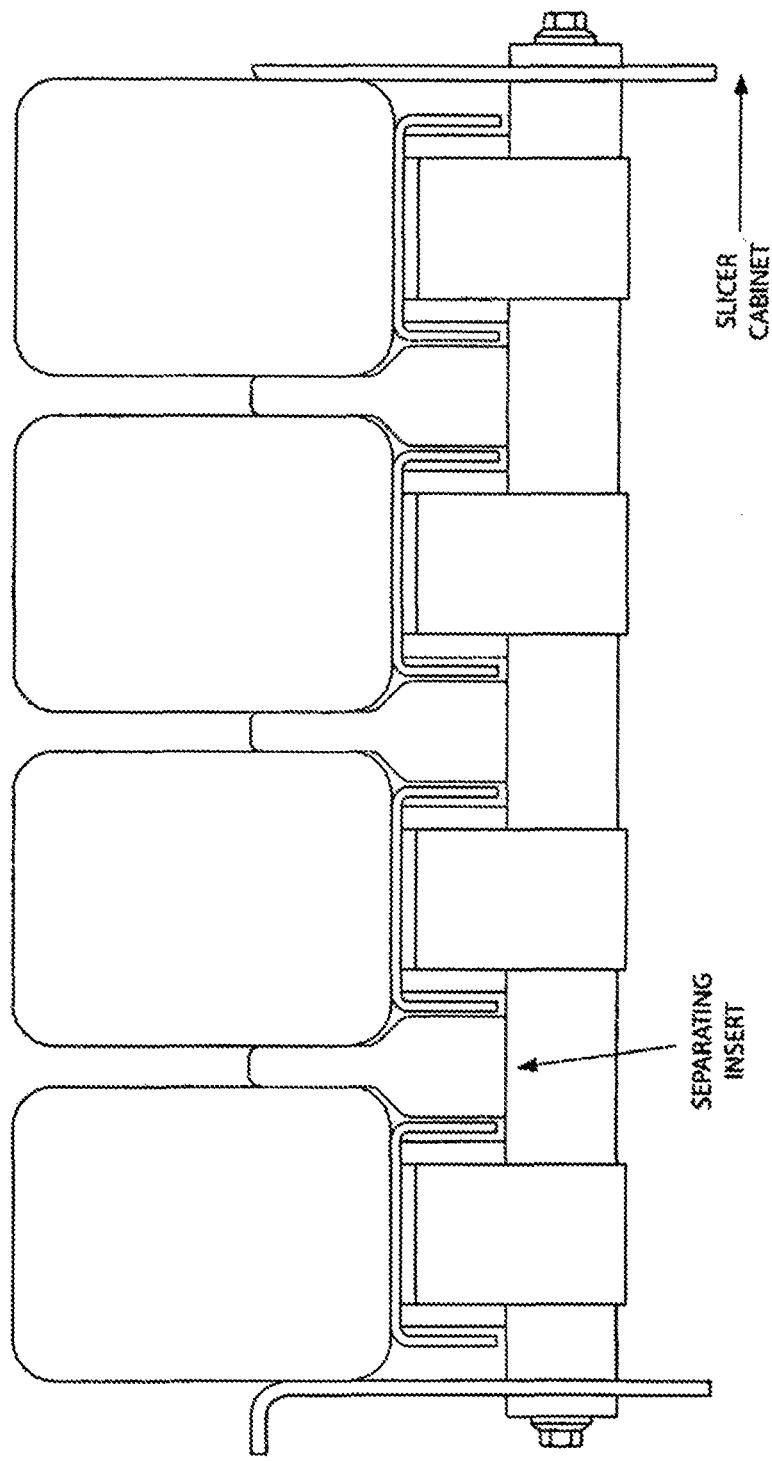
FIG. 72 is a schematic and view of the food article lift tray showing the tray configured to hold for large rectangular cross section food articles.
Figure 73:
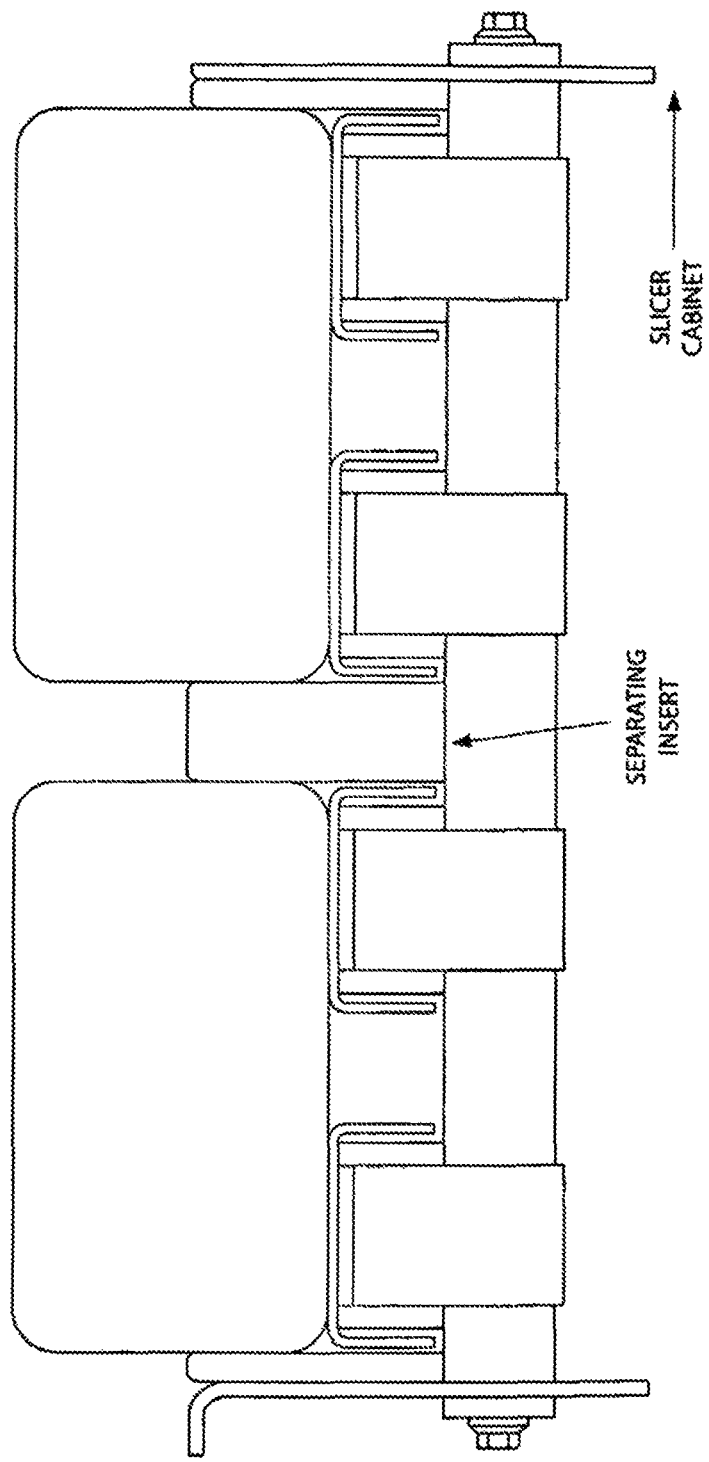
FIG. 73 is a schematic and view of the food article lift tray showing the tray configured to hold two large prone rectangular food articles.
Figure 74:
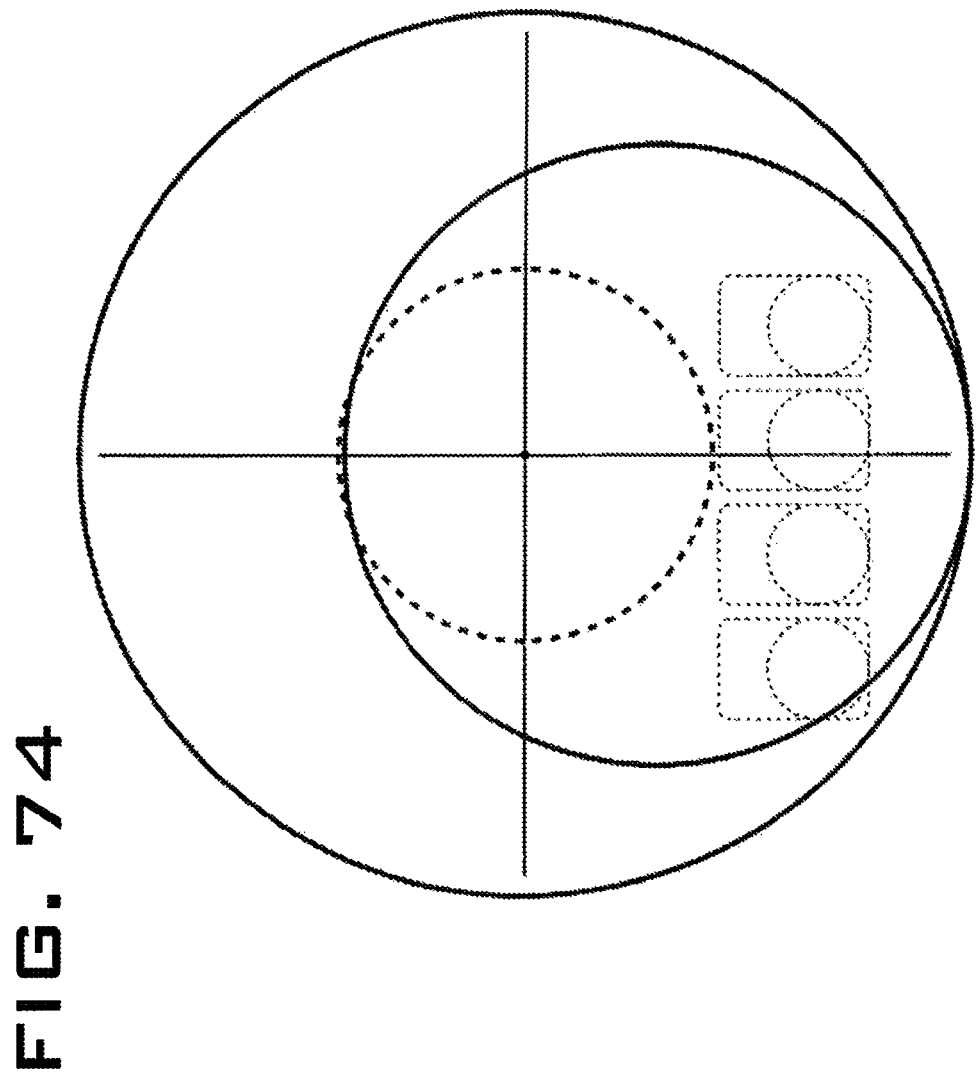
FIG. 74 is a schematic elevational view of a round knife blade to be used with the apparatus of the present invention.
Figure 75:
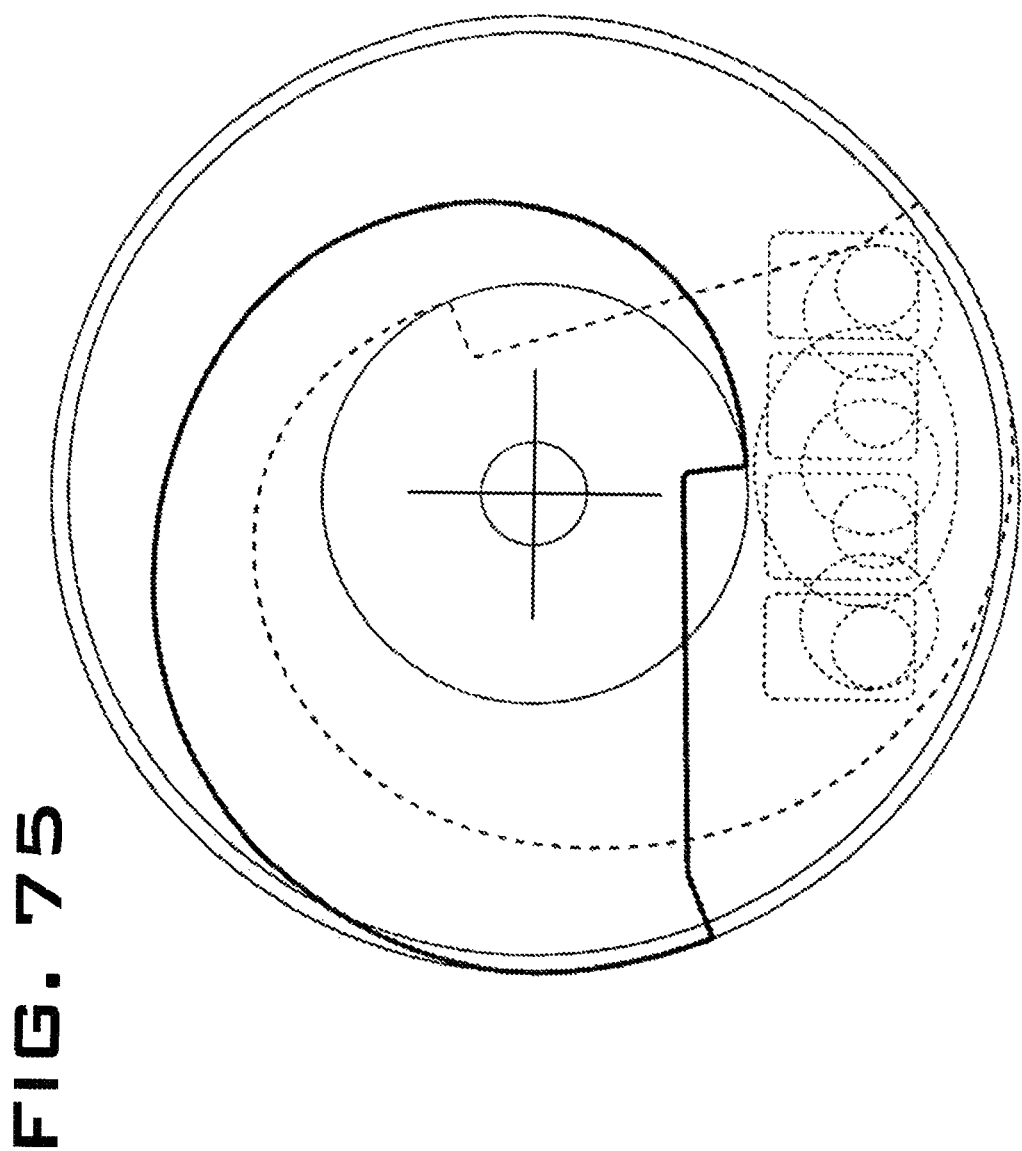
FIG. 75 is a schematic elevational view of an involute-shaped knife blade for slicing large food articles to be used with the apparatus of the present invention.
Figure 76:
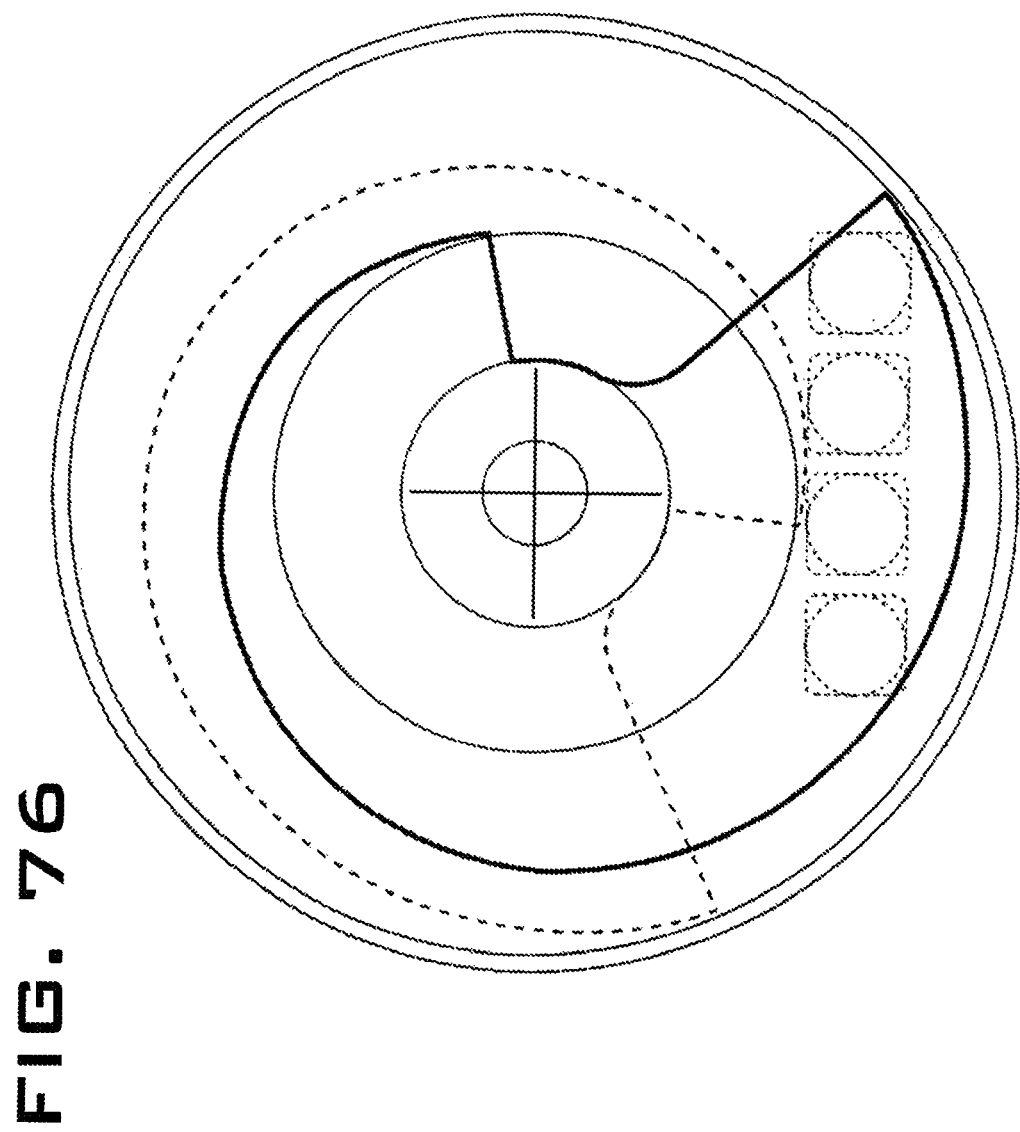
FIG. 76 is a schematic elevational view of an involute-shaped knife blade for slicing small food articles to be used with the apparatus the present invention.

Referring to FIG. 10, when the cylinders are elongated, the support plates 302, 304, 306, 308 are elevated from a lowered position indicated as 302a, 304a, 306a, 308a to an elevated position indicated as 302b, 304b, 306h, 308b. The plates initially are all elevated. The innermost plate 308 is lowered first to receive a food article of the. Once the proximity sensor 308s senses a food article is present, the next plate 306 is lowered to receive the next food article. Once a food article is loaded onto the plate 306 and its presence is sensed by the sensor 306s, the next plate 304 is lowered. Once a food article is sensed on the plate 304, the plate 302 is lowered. This sequence is demonstrated in FIG. 64. In the case where less than four food articles are to be loaded onto the food article tray, machine control can change the sequencing and response to signals from the switches 302s, 304s, 306s, 308s.

Once the tray is loaded and lifted, the food articles 110 will be moved from the lowered position indicated at 110a wherein the food articles are guided in lateral position by the guides 312, 314, 316, to a raised position indicated as 110b, wherein the support plates 302, 304, 306, 308 are elevated to be flush with a top of the guides 312, 314, 316.

Food Article Lateral Transfer Apparatus

Figure 11:
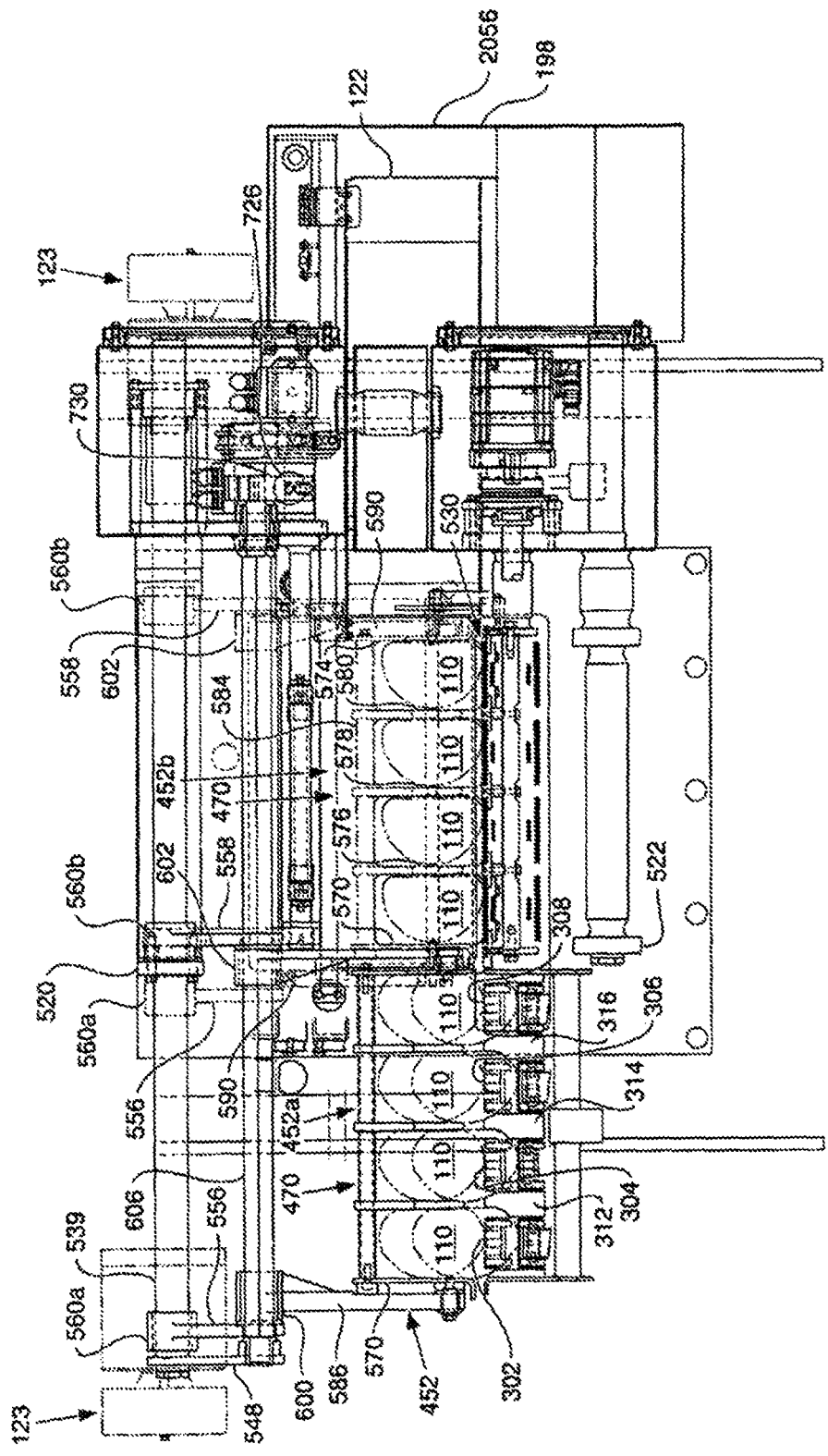
FIG. 11 is a rear view of the food article lift tray and food article transfer apparatus.
Figure 12:
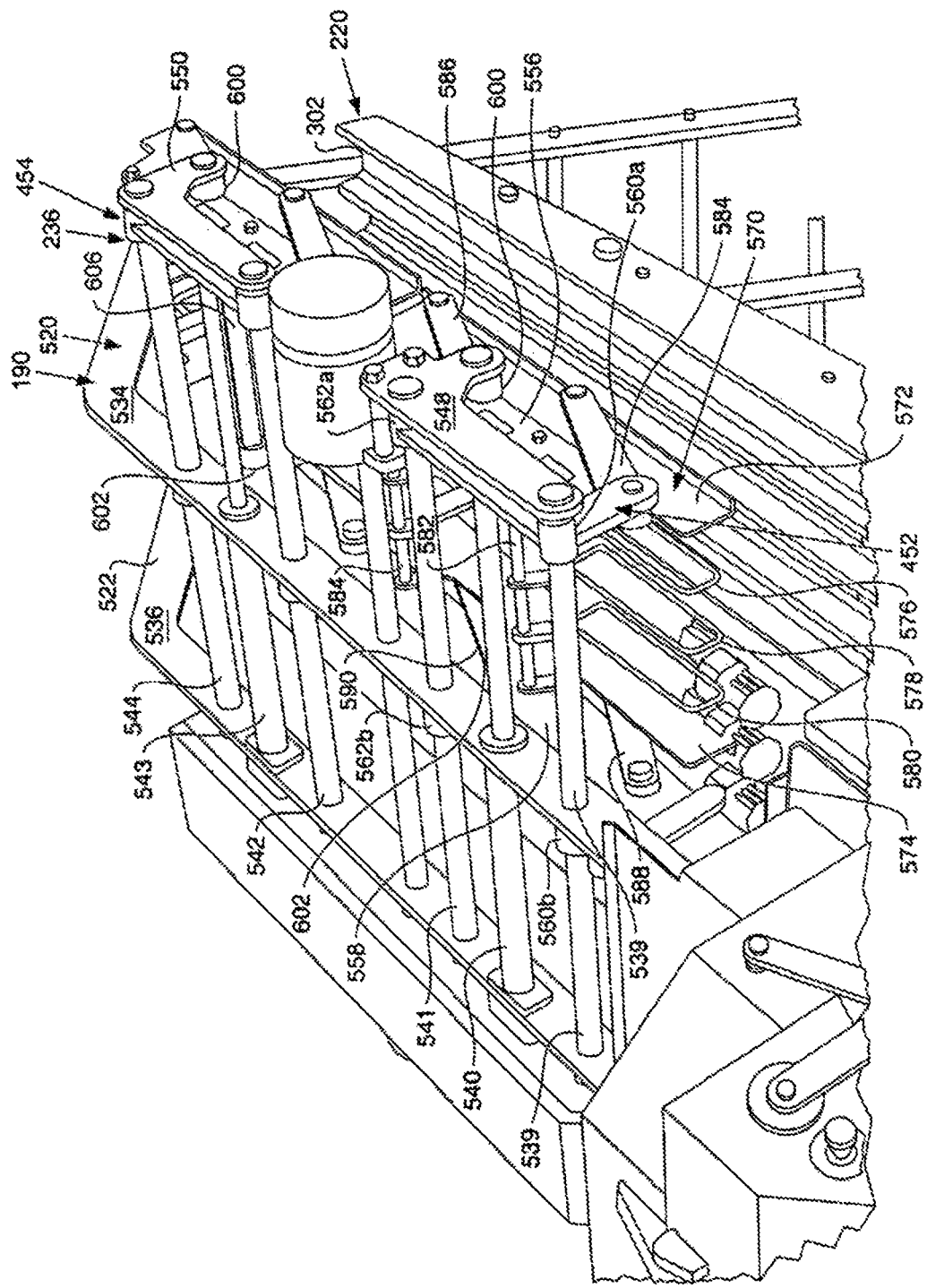
FIG. 12 is a fragmentary perspective view of the food article lift tray and food article transfer apparatus.
Figure 12A:
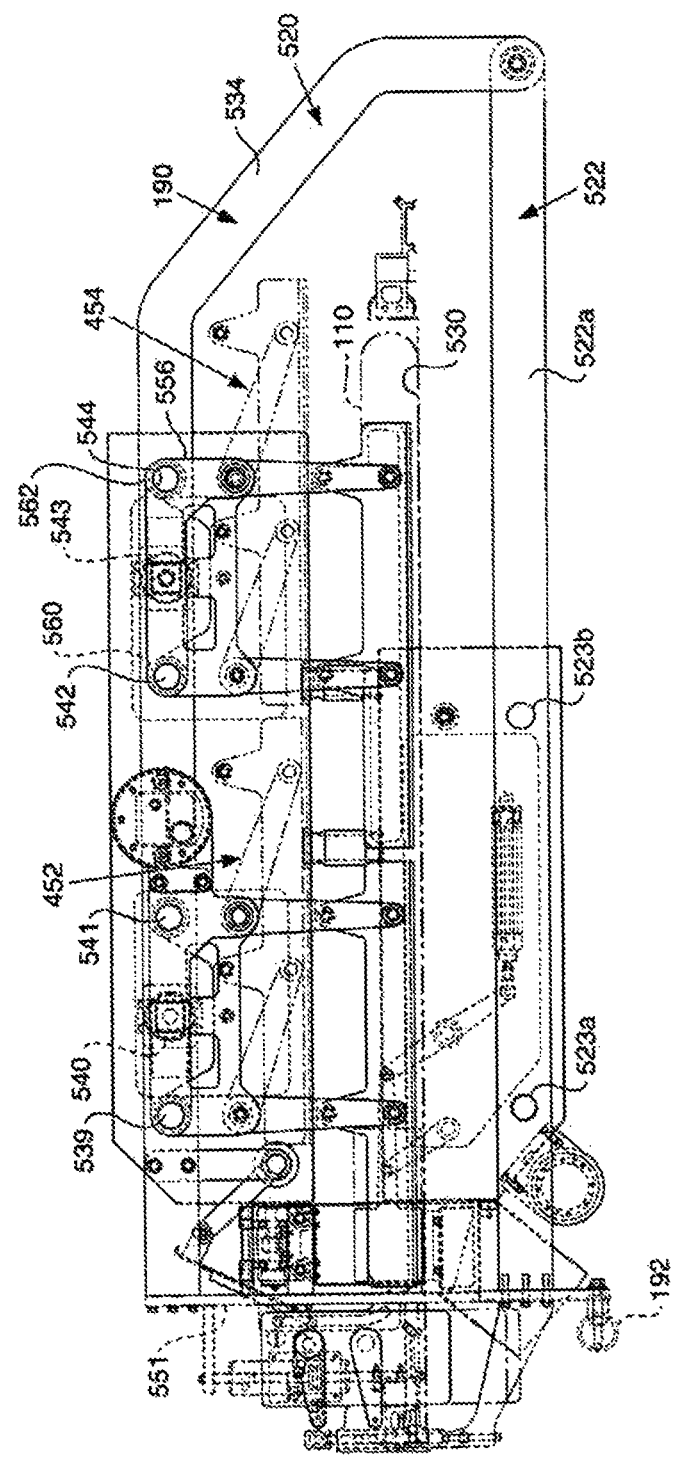
FIG. 12A is an enlarged elevational view of the food article transfer apparatus.

The food article lateral transfer apparatus 236 is illustrated in FIGS. 10-13. The apparatus 236 includes front and rear transfer sweeps 452, 454 (FIG. 12). The front and rear transfer sweeps are identically configured so only the front transfer sweep 452 will be described in detail.

The food article feed apparatus frame 190 includes an upper frame 520 and a lower frame 522. The upper frame comprises two parallel rails 534, 536, four tubular braces 539, 541, 542, 544 and two L-shaped frame extensions 548, 550 that are laterally spaced from the near side rail 534. The frame extension 548 is fixed to ends of the tubular braces 539, 541, and the frame extension 550 is fixed to ends of the tubular braces 542, 544. The lower frame 522 comprises parallel straight rails 522a, 522b and two transverse struts 523a, 523b which connect the two straight rails 522a, 522b. At a front end of the food article feed mechanism frame 190, the rails 534, 536, 522a, 522b are fastened to a thick support plate 551 that is bolted to the axle 192.

The front sweep 452 comprises two vertical frames 556, 558 that are substantially mirror image identical. Each frame 556, 558 comprises front journals 560a, 560b and rear journals 562a, 562b that slide laterally on tubular braces 539, 541, respectively. A multi-lane spacer 570 is arranged below the frames 526, 558. The multi-lane spacer 570 comprises side plates 572, 574 and intermediate rectangular-shaped tubular spacers 576, 578, 580. The side plates 572, 574 and tubular spacers 576, 578, 580 are connected together by front and rear struts 582, 584, respectively that connect raised portions of each of the plates 572, 574 and spacers 576, 578, 580. The struts 582, 584 hold the plates 572, 574 and spacers 576, 578, 580 in a vertical, spaced-apart and parallel orientation. The relative positioning of the plates 572, 574 and spacers 576, 578, 580 define the desired spacing of four food articles to be carried on the food article feed apparatus to be sliced simultaneously by the slicing head apparatus.

The multi-lane spacer 570 is hung from the frames 556, 558 by links 584, 586, 588, 590. The front links 584, 588 are pivotally connected to the respective frames 556, 558 and pivotally connected to the side plates 572, 574 of the multi-lane spacer 570. The rear links 586, 590 are pivotally connected to the side plates 572, 574 and connected to slide bearings 600, 602 that each slidably receives a square cross section drive rod 606 in a fashion such that turning of the square cross section drive rod 606 causes a turning of the rear links 586, 590. Turning of the rear links 586, 590 forcibly swings the rear links 586,590, which swings the multi-lane spacer 570 rearward and upward. The square cross section drive rod 606 slides through the slide bearings 600, 602 during lateral sliding of the sweep 452. The square cross section drive rod 606 has a round end that is journaled for rotation in a bearing 610 carried by the frame extension 550.

FIG. 11 illustrates the sweep 452 in two positions. In a first position marked 452a, the sweep is above four food articles 110 that are positioned on the support plates 302, 304, 306, 308, with the support plates in a raised position flush with the dividers 312, 314, 316. From this position, the sweep 452 is moved to the right by a sweep transfer device 630 shown in FIG. 13. The multi-lane spacer 470 is positioned to be above the conveyor 530. The top surface of the conveyor 530 is flush with the top surface of the support plates 302, 304, 306, 308 so a smooth sliding transfer is enabled. The sweep 452 moves laterally with the journals 560a, 560b; 562a, 562b sliding along the tubular braces 539, 541.

Figure 13:
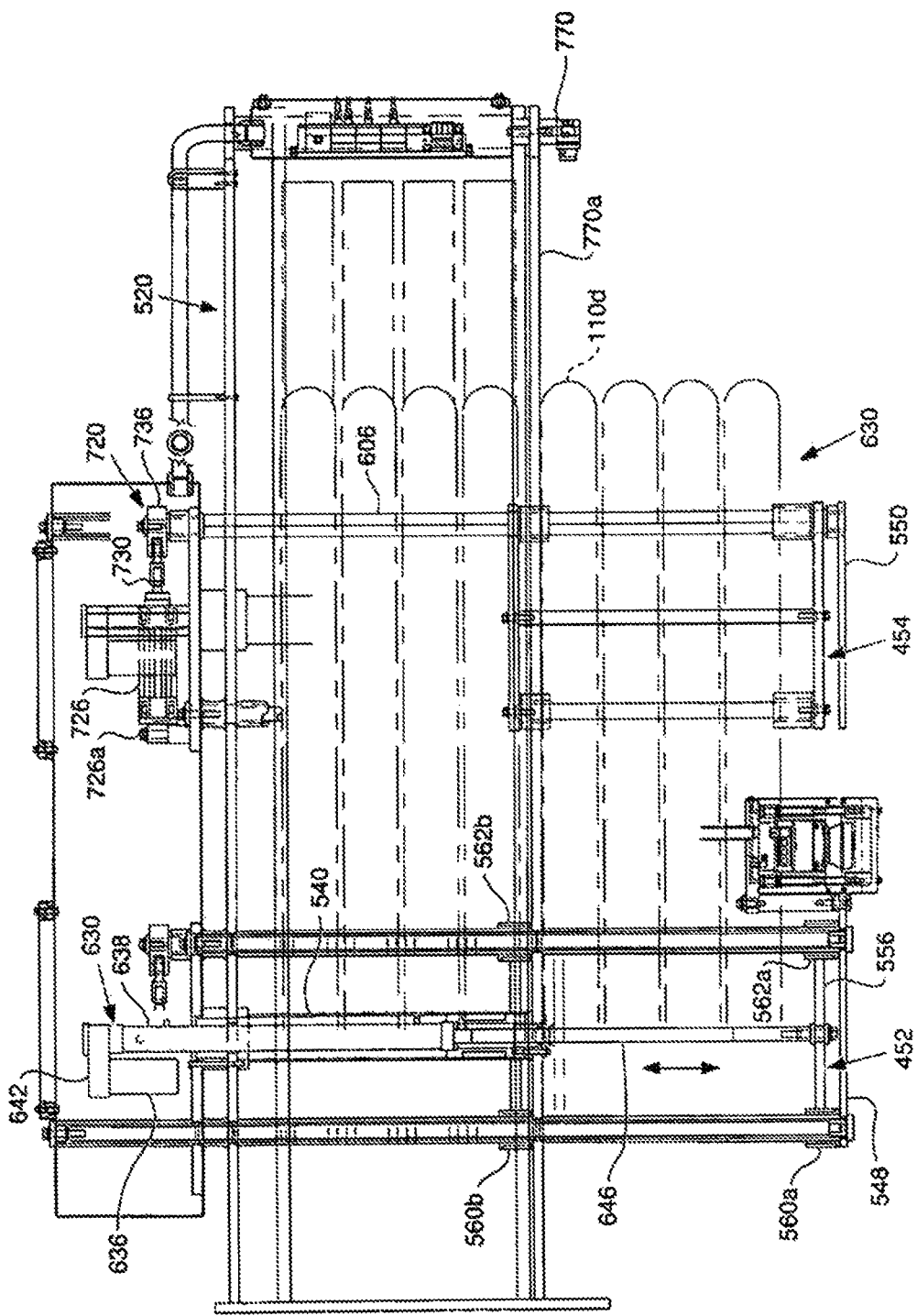
FIG. 13 is a plan view of the food article transfer apparatus.

FIG. 13 illustrates the transfer device 630 comprises a servomotor 636 that turns the operating mechanism of a screw drive 638 via a belt 642. The screw drive 638 is mounted within a tubular cover 540. A hollow rod 646 is fixed on an end thereof to the frame 556 and penetrates the cover 540. The rod 646 has internal threads, such as provided by a threaded nut or screw follower welded to the rod, and the screw drive 638 has an internal rod (not shown) with external threads which engage the internal threads. Thus, turning of the rod of the screw drive 638 in a pre-defined direction moves the nut along the rod and either extends or retracts the rod 646 from or into the cover 540.

To reload the conveyor 530 with four new food articles 110, the multi-lane spacer 470 must be raised so as not to interfere with the food articles being sliced on the conveyor 530, and then moved outward (to the left in FIG. 11). To raise the multi-lane spacer 470, the square cross section rod 606 is turned, to swing the links 586, 590. A turning mechanism 720 is shown in FIG. 13 associated with identical sweep 454, with the understanding that an identical mechanism 720 would be used for the sweep 452. The turning mechanism 720 includes a linear actuator servomotor 726 pivotally fastened at a base end 726a to the frame 520 and having an extendable rod 730 pivotally connected to a lever 736. At an opposite end the lever 736 is connected to the square cross section rod 606. The rod 730 is connected to the lever 736 at a location eccentric to a centerline of the square cross section rod 606. The servomotor 726 turns an internal threaded rod or like device to extend or retract the rod 730 and thus turn the lever 736 and the square cross section rod 606 in either direction, clockwise or counterclockwise about an axis of the rod 606. Thus, when the rod 730 is extended, the rod 606 is turned counterclockwise (as viewed in FIG. 12) and the multi-lane spacer 470 is raised.

The servomotor 636 then turns the screw drive 638 to extend the rod 646 to move the sweep 452 to the left position shown in FIG. 11 but raised above the lift tray 220. The linear actuator servomotor 726 then retracts the rod 730 to reverse rotate the square cross section rod 606 to lower the multi-lane spacer 470 to the position indicated as 452a in FIG. 11. At this position, four new food articles 110 can be raised by the supports 302, 3204, 306, 308 to take the four lane positions between the side plates 570, 574 and the spacers 576, 578, 580.

As the food articles 110 are transferred from the support plates 302, 304, 306, 308 a sensor 770 determines a location of the end 110*d* of each food article 110. According to the preferred embodiment, the sensor 770 comprises a laser distance sensor that uses a beam 770*a* to determine the distance between the sensor 770 and the back end 110*d* of each food article as the food articles pass by during transfer. This distance is recorded in the machine control and associated with each food article 110, particularly, associated with the food article 110 and the lane to be occupied by each food article during slicing. The machine control has instructions for calculating a length of each food article based on the distance value provided the sensor.

Food Article Feed Apparatus

Figure 14:
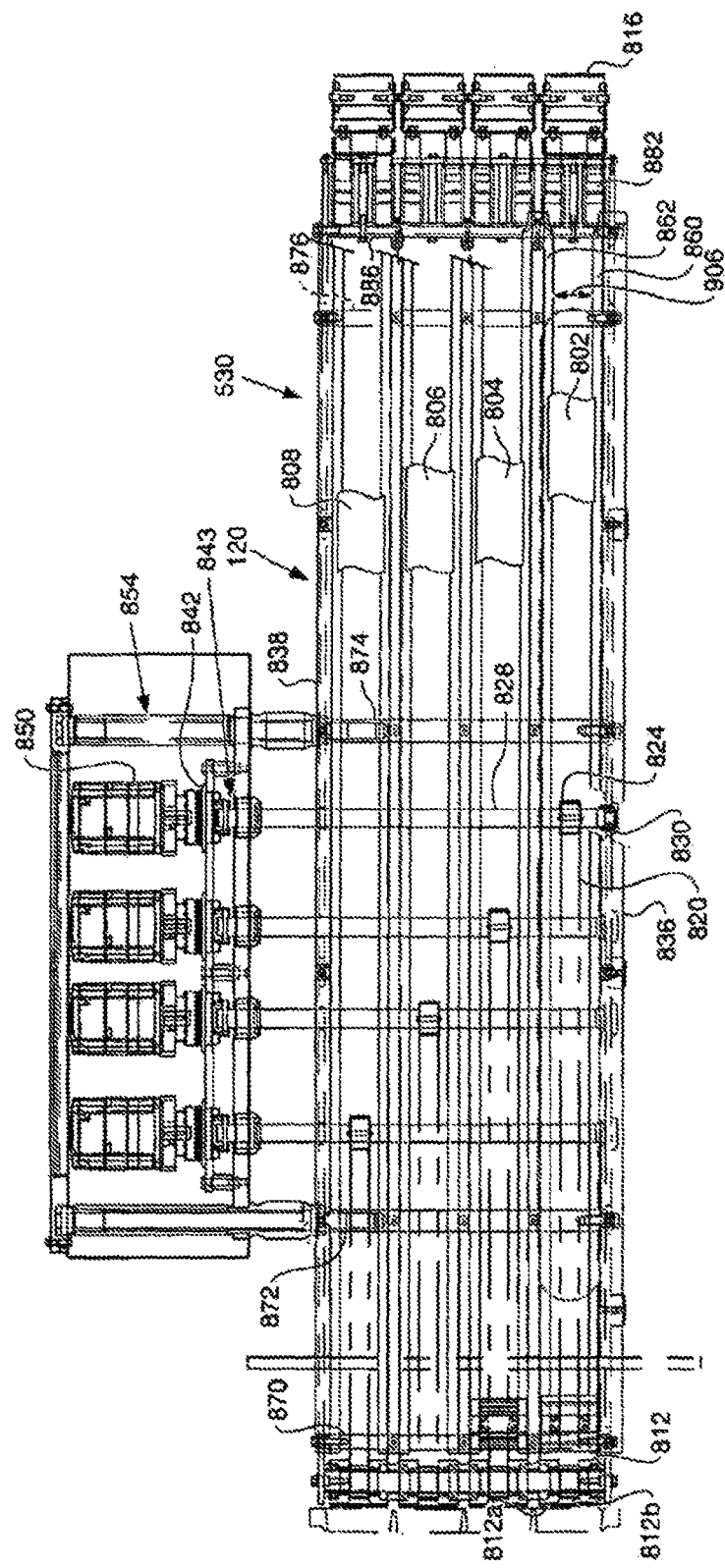
FIG. 14 is a plan view of the food article feed apparatus.

The lower conveyor 530 of the food article feed apparatus 120 is shown in FIG. 14. The conveyor 530 includes four independently driven endless conveyor belts 802, 804, 806, 808. Each belt 802, 804, 806, 808 is identically driven so only the drive for the belt 802 will be described. A machine control "C" (FIG. 51) has instructions for ending machine slicing of all food articles on the food article feed apparatus when the shortest food article is sliced to a minimum length. The minimum length may be predefined, may be a food article length below which the machine can no longer slice a food article, or may be a food article length below which continued slicing will produce unacceptable scrap slices cause by slicing a food article end.

The belt 802 is wrapped around a toothed front drive roller or pulley 812 and a back idler roller or pulley 816. The belt 802 preferably has teeth that engage teeth of the two rollers 812, 816. Each drive roller 812 includes a toothed outer diameter 812*a* and a toothed, recessed diameter 812*b*. An endless drive belt 820 having a smaller width than the belt 802 wraps around the recessed diameter 812*b*. As shown in FIG. 15A, the smaller endless drive belt 820 operates within the larger operating path of the larger endless conveyor belt 802. The drive belt 820 also wraps around a drive roller 824 that is fixed to a drive shaft 828. The drive shaft 828 extends transversely to the belt 802 and is journaled for rotation within a bearing 830 mounted to a near side frame member 836.

The drive shaft 828 penetrates a far side frame member 838 and extends to a bearing 843, coupled to a gear reducer 842 mounted to a support frame 854. The gear reducer 842 is coupled to a servomotor 850 that is mounted to the support frame 854. The drive belt 820 circulates within the perimeter defined by the endless belt 802.

The servomotor 850 drives the drive shaft 828 which turns the roller 824 which circulates the belt 820 which rotates the roller 812 which circulates the belt 802.

A shown in FIGS. 14, 15, 15A, 19 and 20 the belt 802 is supported along its length by flat rails 860, 862 which underlie lateral edges of the belt 802. The rails 860, 862 (as well as rails for the belts 804, 806, 808) are supported by struts 870, 872,874 and 876 which connect the near frame member 836 to the far frame member 838.

Each idler roller 816 is provided with a pneumatic belt tension adjustment mechanism 882 that is braced from a transverse bar 886 that is fastened between the frame members 836, 838. The pneumatic belt tensioning adjustment mechanism 882 has an internal piston which is acted upon by pneumatic air pressure to exert a constant force on tension rods 882*a* which exert a force on frame 883 of each idler roller 816 outwardly away from the transverse bar 886 to maintain tension on the belts.

FIG. 15-20 illustrate a gripper 894 used in cooperation with the belt 802. The gripper 894 is mounted to a top run of the belt 802 and is translated along the food article path by the belt 802. The gripper 894 is clamped to a belt joint block 896 by a screw 897. The block 896 comprises an upper member 899 and a lower member 900 that include teeth 899*a*, 900*a* on members 899, 900 that engage the upper and lower teeth of the belt 802 once the members 899, 900 are clamped together to splice the free ends 802*e*, 802*f* of the belt 802. For clamping, fasteners 902, 904 are provided which are inserted from below the member 900 through plain holes in the member 900 and tightly threaded into threaded holes 902*a*, 904*a* in the member 899.

Figure 19:
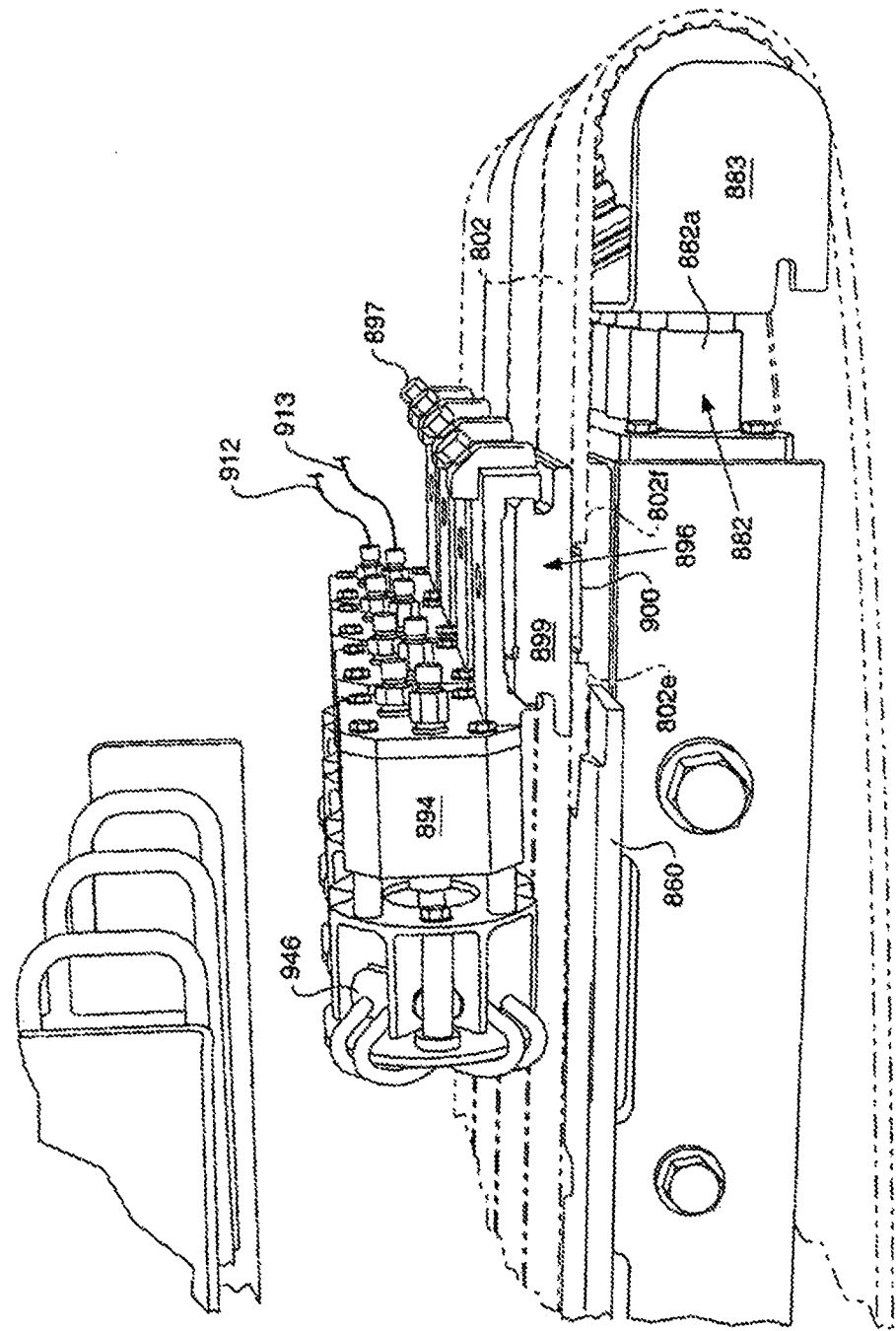
FIG. 19 is a fragmentary perspective view of the food article feed apparatus.
Figure 20:
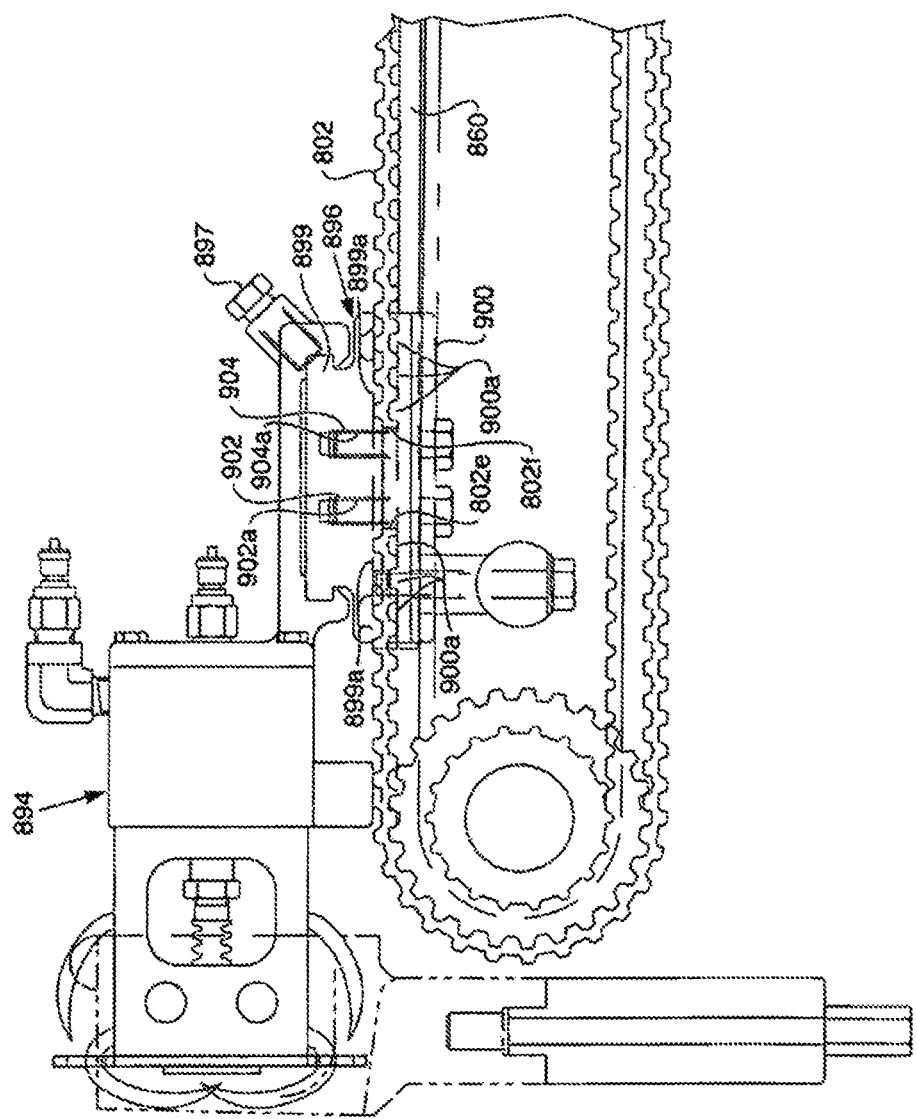
FIG. 20 is an enlarged sectional view of the attachment of the gripper to the belt.

The gripper 894 travels from the retracted home position shown in FIGS. 16 and 19, to the advanced, forward position, shown in FIGS. 15 and 20. The lower member 900 is sized to slide between a lateral clearance 906 located between rails 860, 862 (FIG. 14).

The gripper 894 is pneumatically actuated via pressurized air hoses 912, 913 (FIG. 16). The air hoses 912, 913 are coupled to include free hanging supply loops 914, 915 that includes a dead weight pulley 916 to prevent inadvertent tangling of the hoses with other equipment. Tube guides can also be provided on the back of the frame member 190 to guide the air hoses vertically to prevent tangling of the hoses with other equipment.

The gripper 894 includes an air cylinder 926 having a piston 930 therein. Air connectors 932, 936 communicate air to/from opposite sides of the piston to control movement of the piston in either direction. A shown in FIG. 18, movement of a piston rod 938 connected to the piston 930 moves an annular rack 942 that is engaged to four pinion gears 944 of four claws 946. Movement of the annular rack 942 away from the cylinder 926 opens the claws 946, and movement of the annular rack 942 toward the cylinder 926 closes claws 946.

Upper Conveyor

Figure 21:
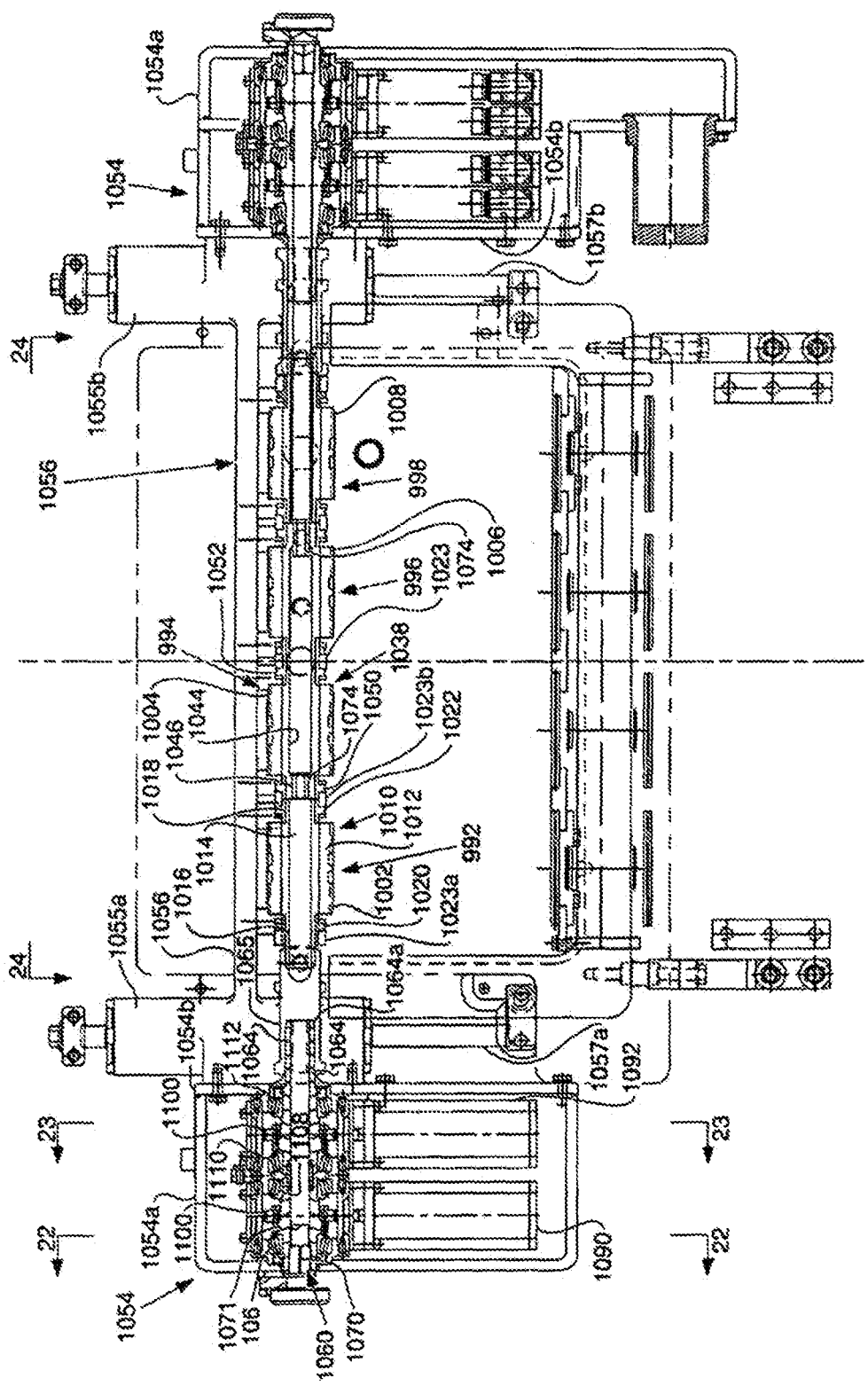
FIG. 21 is a sectional view taken generally along line 20-20 of FIG. 16.

As illustrated in FIG. 21, at a front end of the food article feed apparatus 120, above the lower feed conveyor 530 are four upper feed conveyors 992, 994, 996, 998 having endless belts 1002, 1004, 1006, 1008, respectively. The endless belts 1002, 1004, 1006, 1008 are independently driven and are directly opposed to the lower conveyor belts 802, 804, 806, 808, respectively. The respective belt pairs, such as the upper belt 1002 and the lower belt 802 are circulated in opposite directions to drive a food article clamped there between into the slicing plane.

The near side upper conveyors 992, 994 are configured in a mirror image fashion, across a longitudinal vertical center plane of the food article feed apparatus 120, to the far side two conveyors 996, 998 so that only the near side two conveyors 992, 994 need be described.

FIG. 21 shows the conveyor 992 has a drive roller 1010 having a central hub 1012 with a center bore 1014. The drive roller 1010 has tubular stub axles 1016, 1018 extending from opposite ends of the central hub 1012. The tubular stub axles 1016, 1018 are journaled for rotation by bearings 1020, 1022 that are fastened to carrier blocks 1023*a*.

The conveyor 994 includes a drive roller 1038 having a central hub 1042 with a bore 1044. The drive roller 1038 has tubular stub axles 1046 and 1048 extending from opposite ends of the central hub 1042. The tubular stub axles 1046, 1040 are journaled by bearings 1050, 1052 respectively that are attached to carrier blocks 1023*b*.

A motor housing 1054, including a baseplate 1054*b* and a cover 1054*a*, is mounted to an end of an upper conveyor support bar 1056. The base plate 1054*b* of each side of the machine is fastened to a linear actuator, such as a pneumatic cylinder 1055a and 1055b respectively. The cylinders 1055a, 1055b are connected together by the support bar 1056. Each cylinder slides on a fixed vertical rod 1057a, 1057b respectively. Thus, controlled air to the cylinders 1055a, 1055b can be used to uniformly raise or lower the near side housing 1054 and the far side housing 1054 uniformly.

A spindle 1060 extends through the motor housing 1054, through a sleeve 1064, through a coupling 1065, through the tubular stub axle 1016, through the central bore 1014, through the tubular stub axle 1018, through the tubular stub axle 1046, and partly into the bore 1044. The spindle 1060 has a hexagonal cross-section base region 1070, a round cross-section intermediate region 1072, and a hexagonal cross-section distal region 1074. The hexagonal cross-section base region 1070 is locked for rotation with a surrounding sleeve 1071 to rotate therewith.

The intermediate region 1072 is sized to pass through the sleeve 1064, through the tubular stub axle 1016, through the central bore 1014, and through the tubular stub axle 1018 to be freely rotatable therein. The distal region 1074 is configured to closely fit into a hexagonal shaped central channel 1078 of the tubular stub axle 1046 to be rotationally fixed with the tubular stub axle 1046 and the drive roller 1038.

The sleeve 1064 includes a hexagonal perimeter end 1064a that engages a hexagonal opening 1065a of the coupling 1065. The coupling 1065 includes an opposite hexagonal opening 1065a that engages a hexagonal perimeter end 1016a of the tubular stub axle 1016. The coupling 1065 couples the sleeve 1064 and the stub axle 1016 for mutual rotation such that the sleeve 1064 and the drive roller 1010 are locked for rotation together, i.e., turning of the sleeve 1064 turns the drive roller 1010.

Within the motor housing 1054 are two servomotors 1090, 1092 mounted to the housing by fasteners. The servomotors each have a vertically oriented output shaft 1096 that rotates about a vertical axis connected to a worm gear 1098 that is enmesh with and drives a drive gear 1100 that rotates about a horizontal axis. The drive gear 1100 drives the sleeve 1071 that drives the region 1070 of the spindle to rotate the spindle 1060. Rotation of the spindle 1060 rotates the drive roller 1038 via the hexagonal cross-section distal end region 1074.

Figure 22:
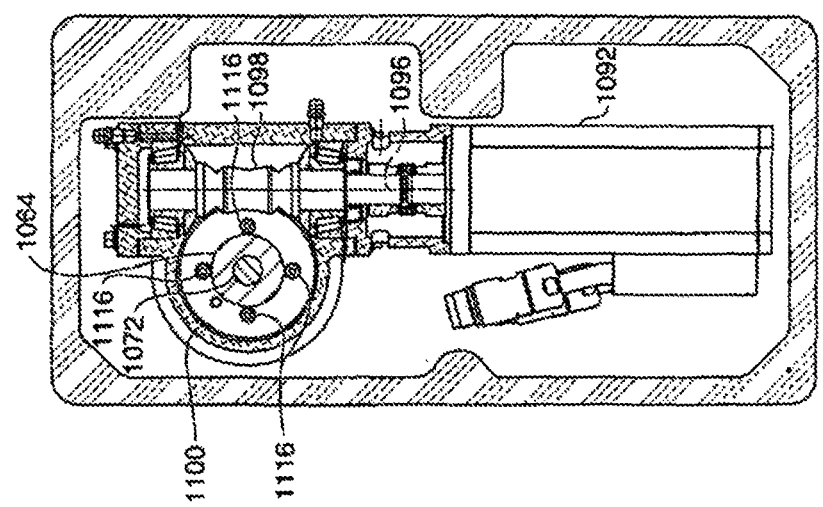
FIG. 22 is a sectional view taken generally along line 22-22 of FIG. 21.
Figure 23:
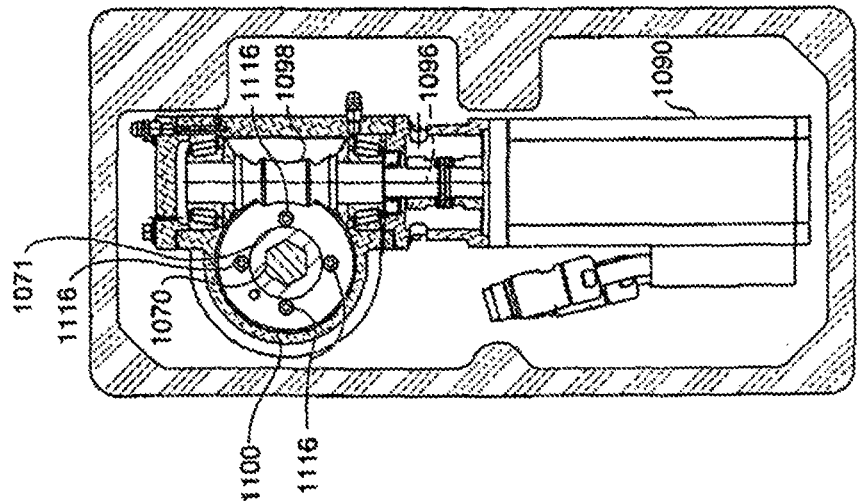
FIG. 23 is a sectional view taken generally along line 23-23 of FIG. 21.

Adjacent to the servomotor 1090 is the servomotor 1092. The servomotor 1092 is configured substantially identically with the servomotor 1090 except the worm gear 1098, as shown in schematic form in FIGS. 22 and 23, of the servomotor 1092 drives a drive gear 1100 that drives the sleeve 1064 to rotate. The sleeve 1064 rotates independently of the round cross-section region 1072 of the spindle 1060, and drives a stub axle 1016 to rotate, which rotates the drive roller 1010.

The sleeves 1071 and 1064 are journaled for rotation by bearings 1106, 1108; and 1110, 1112, respectively. The drive gears 1100, 1100 are fastened to the respective sleeve 1071, 1064 using fasteners 1116.

The housings 1054, via servomotors 1090, 1092, on both sides of the conveyors 992, 994, 996, 998 support the conveyors 992, 994, 996, 998. By using the cylinders 1055a, 1055b to raise and lower the housings 1054, the conveyors can be raised or lowered to match a product size.

Each conveyor belt 1002, 1004, 1006, 1008 is wrapped around the respective drive roller and a front idle rollers 1134, 1135, 1136, 1137 that is supported by respective side frames 1131, 1132. The front rollers 1134, 1135, 1136, 1137 are vertically movable independently by pivoting of the conveyor about an axis of the respective drive roller.

Figure 24:
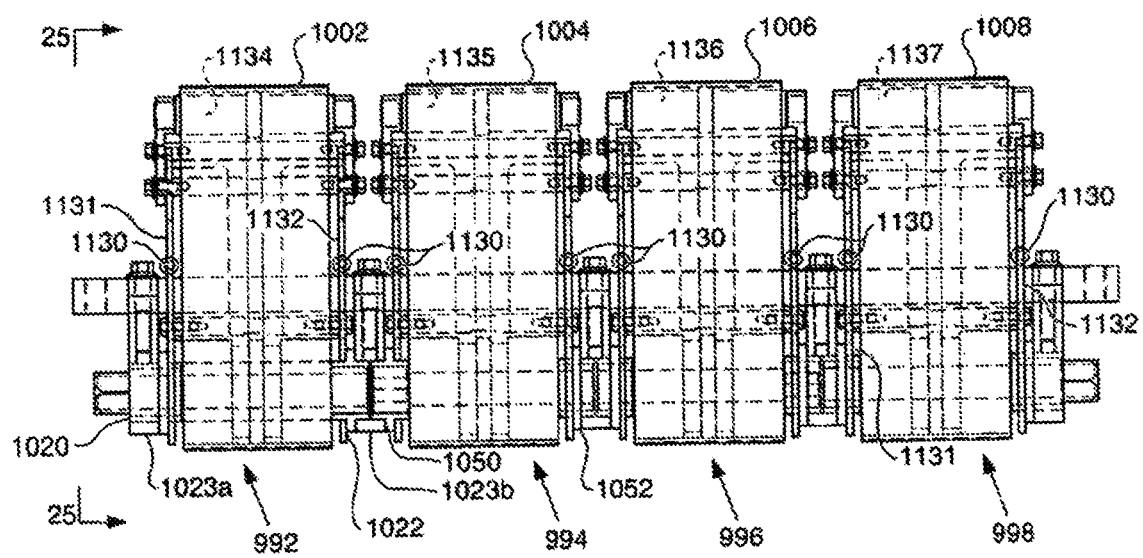
FIG. 24 is a plan view taken along line 24-24 FIG. 21.
Figure 25:
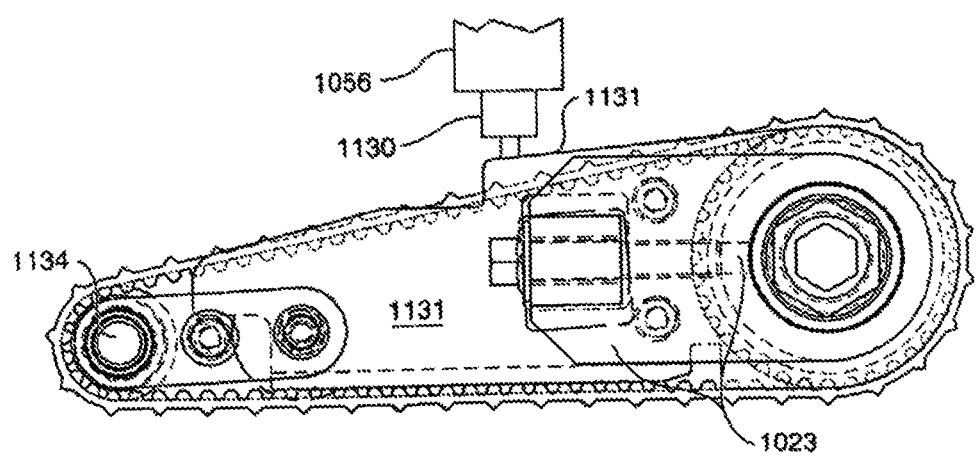
FIG. 25 is an elevational view taken generally along line 25-25 of FIG. 24.

Also, as shown in FIGS. 24 and 25, the underside of the support bar 1056 carries pneumatic cylinders 1130. Each pneumatic cylinder 1130 extends a piston rod to press down on side frames 1131, 1132 of each conveyor to pivots down a front end of each conveyor 992, 994, 996, 998 to lightly press down on a top of the product below. The inclination of each conveyor 992, 994, 996, 998 is set by upward pressure from the product and downward pressure from the pneumatic cylinders 1130.

Food Article Gate

Figure 26:
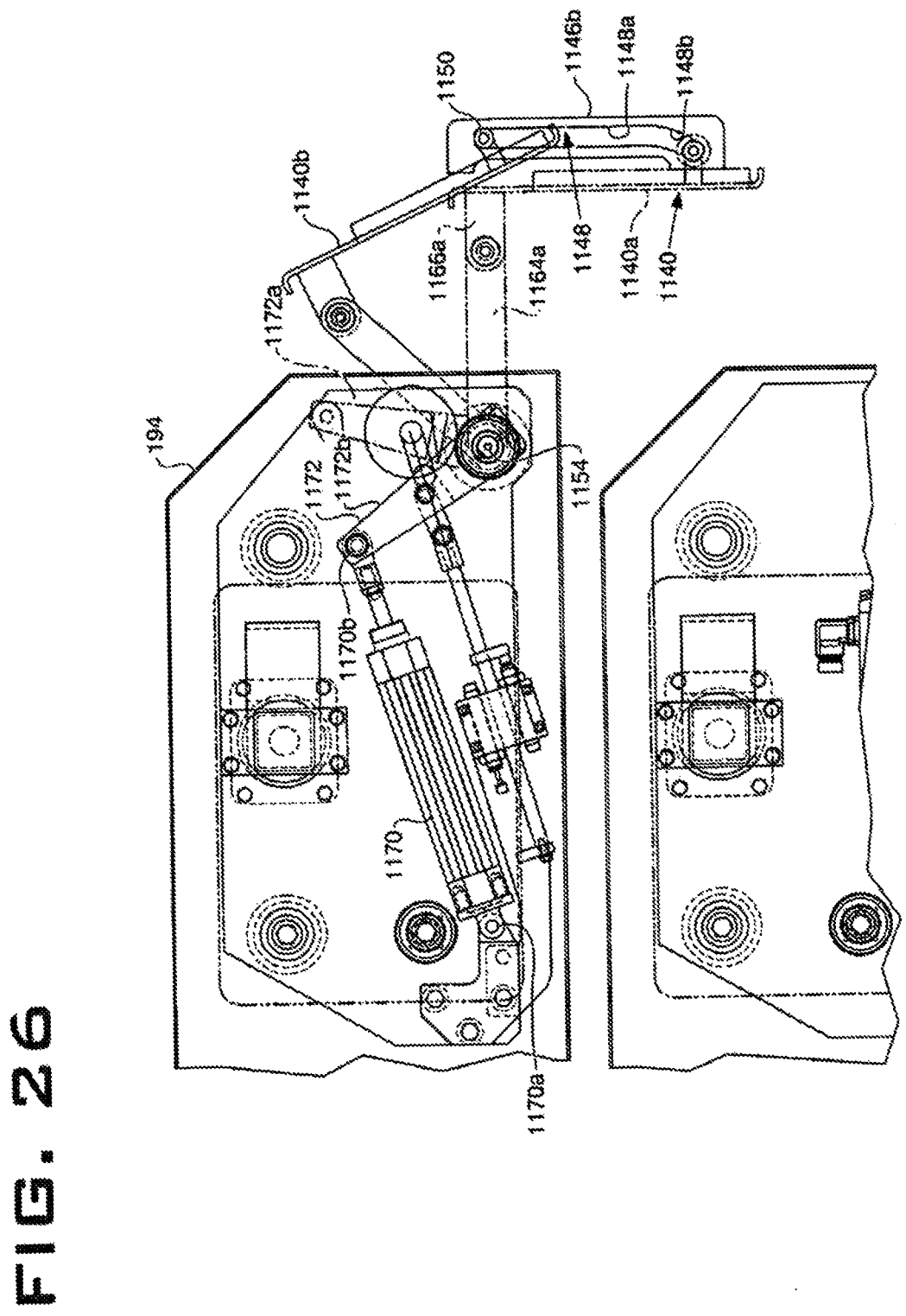
FIG. 26 is a fragmentary elevational view of a food article gate mechanism.
Figure 27:
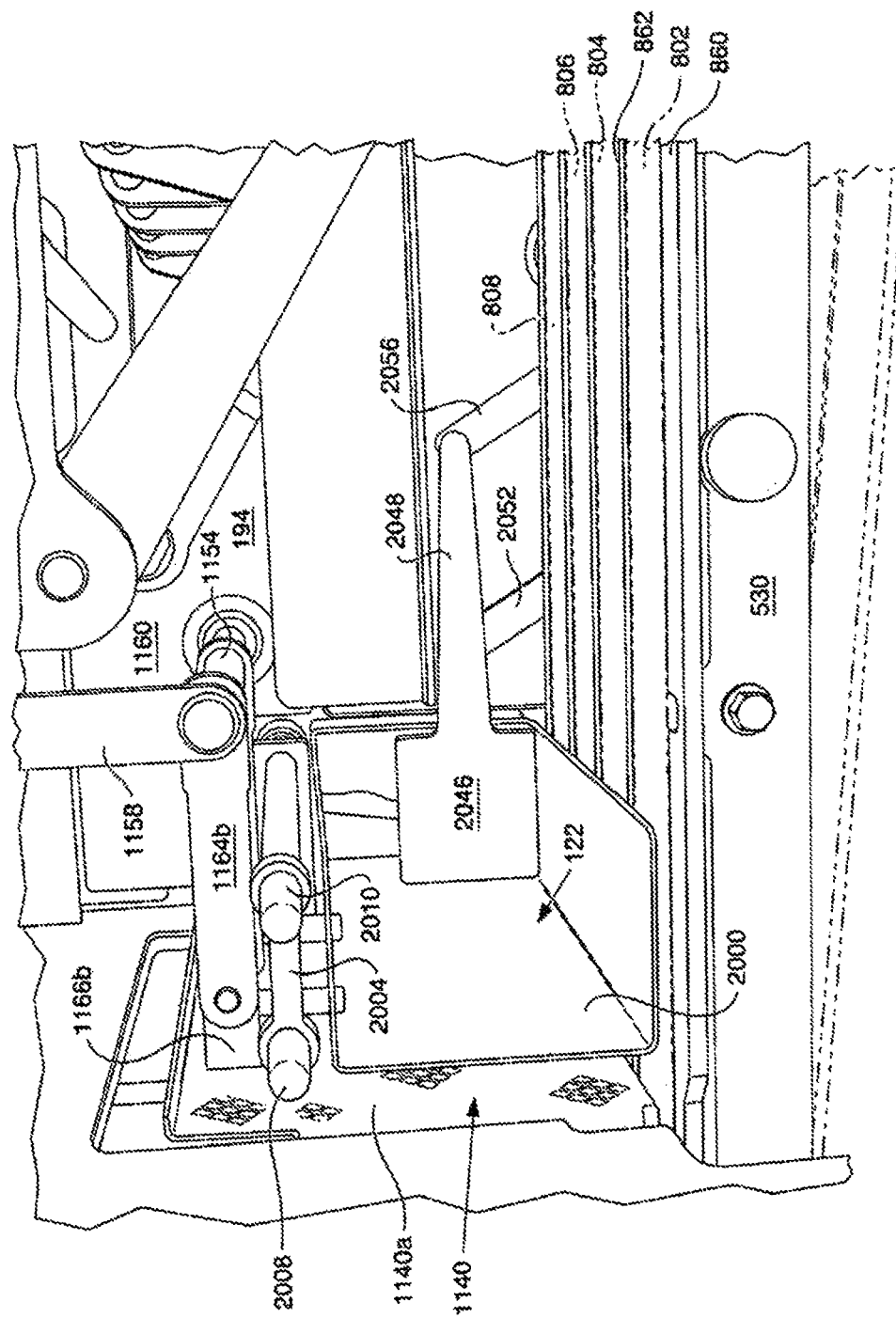
FIG. 27 is a near side perspective view of the food article gate mechanism and a food article end removal mechanism in a first operative position.
Figure 28:
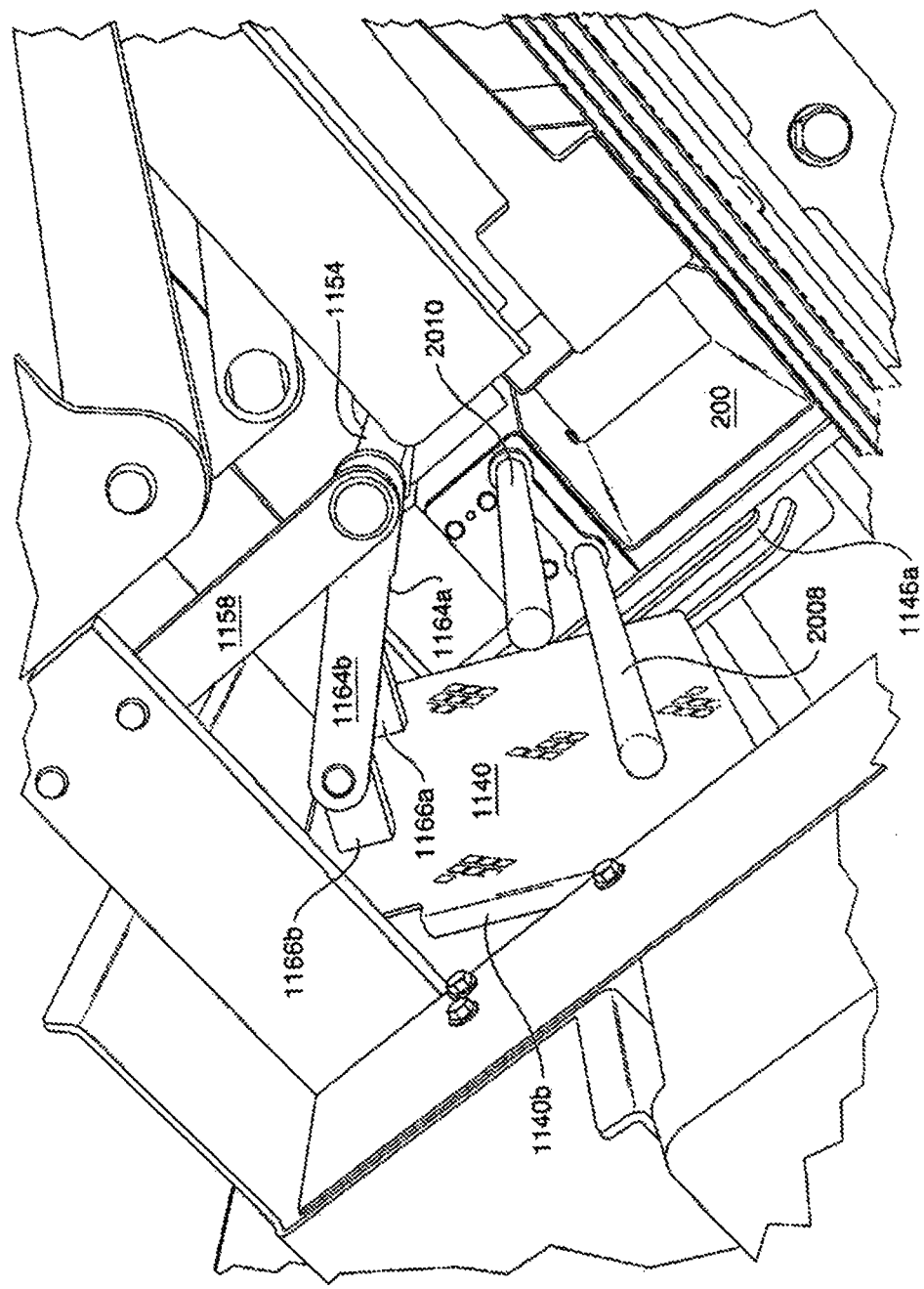
FIG. 28 is a near side perspective view of the food article gate mechanism and the food article end removal mechanism in a second operative position.

As illustrated in FIG. 26, at a front end of the food article feed apparatus 120 a food article gate 1140 is movably positioned to provide a stop for food articles that are loaded onto the conveyor 530. In order to commence slicing of the food articles, the food article gate 1140 must be displaced. FIGS. 26 and 27 show the gate 1140 in a lowered position marked 1140a. FIGS. 26 and 28 show the gate 1140 in a raised position marked 1140b. Guide plates 1146a, 1146b are provided fixedly attached to the frame 190, one on each lateral side of the gate 1140. Each guide plate includes a slot 1148 that has a vertical portion 1148a and a lower, inclined portion 1148b. Two rollers 1150 are connected to a front side of the gate 1140, one sliding within each slot 1148 of the two guide plates 1146a, 1146b respectively. An axle 1154 is journaled at opposite ends by a frame portion 1158 and a back wall 1160 of the sweep mechanism housing 194, using bearings. Two levers 1164a, 1164b are fixedly connected to the axle 1154 such as to swing when the axle 1154 is rotated about its axis. Each lever 1164a, 1164b is pivotally connected to a lug 1166a, 1166b, respectively. The lugs 1166a, 1166b are welded to a backside of the gate 1140.

Within the sweep mechanism housing 194 a linear actuator such as a pneumatic cylinder 1170 is pivotally connected at a base end 1170a and pivotally connected at a rod end 1170b to a turning lever 1172. The turning lever 1172 is fixedly connected to the axle 1154. Thus, when the pneumatic cylinder 1170 retracts the rod end 1170b toward the cylinder 1170 the turning lever 1172 will be in the position marked 1172b and the gate will be in the elevated position marked 1140b. When the pneumatic cylinder 1170 extends the rod end 1170b away from the cylinder 1170, the turning lever 1172 will be in the position marked 1172a and the gate will be in the lowered position marked 1140a.

Advantageously, the gate 1140 follows the track 1148 in an outward and upward motion which generally releases the food articles in a forward direction toward the slicing plane for slicing.

Food Article End Disposal

FIGS. 10, 11 and 27-31 illustrate the food article end removal apparatus 122. The apparatus 122 comprises a prone U-shaped transport 2000. The transport 2000 is carried by near side bearings 2004 and far side bearings 2006. The bearings 2004, 2006 slide along parallel rails 2008, 2010 that are fixedly supported by the frame 190. The transport 2000 can be moved from a position directly above the conveyor belts 802, 804, 806, 808 as shown in FIG. 27 to a position extended outside of the far side of the slicing apparatus 100 as shown in FIG. 28. A servomotor 2016 located within the sweep mechanism housing 194 drives a shaft 2020 in rotation. The shaft turns a drive pulley 2024 which turns a belt 2026 which turns a driven pulley 2028 which drives a further pulley 2030 via a common shaft 2032. A drive belts 2034 is wrapped around the further pulley 2030 and an idler pulley 2036, the idler pulley 2036 being journaled on an idler shaft 2038. A fixing block 2040 fixes a bottom run of the drive belt 2034 to the bearing 2006. Thus, when the servomotor 2016 rotates the shaft 2020, the belt 2026 is circulated by the pulley 2024 which circulates the drive belt 2034 via the pulley 2030 and the transport 2000 is moved by the fixing block 2040.

FIG. 27 shows a movable paddle 2046 which can be inserted into the open cross-sectional space of the transport 2000. The paddle 2046 is connected by an elongated handle 2048 that is pivotally connected to a front lever 2052 and to a rear lever 2056. The front and rear levers 2052, 2056 are pivotally connected to the far side frame member 838 of the food article feed conveyor 530 at bearings 2052a, 2056a respectively. The rear lever 2056 extends below the bearing 2056a and is pivotally connected to a pneumatic cylinder 2064 at a rod end 2064a. The pneumatic cylinder 2064 is pivotally connected to the frame 190 at an opposite end 2064b within the food article feed drive housing 196. Thus, extension of the rod end 2064a away from the cylinder 2064 will retract the paddle 2046 as shown in FIG. 28, and retraction of the rod end 2064a toward the cylinder 2064 will cause the paddle 2046 to extend into the transport 2000 as shown in FIG. 27.

In operation, after the food articles have been sliced completely leaving only ends gripped by the grippers, the grippers 894 are retracted toward the home position of the grippers but are halted temporarily a short distance along the food article path providing a clearance for the transport 2000. The transport 2000 is driven by the servomotor 2016 from an extended-outward position as shown in FIGS. 10 and 28 to the inward position as shown in FIG. 27 with the paddle in the position shown in FIG. 27. Any end portions that are on the transport 200 will be pushed off the transport 200 by the paddle 2046 during travel of the transport 200 onto the conveyor 530. The grippers 894 then would release the ends which will fall or slide by gravity onto the transport 2000. The grippers then continue up the food article feed paths to the gripper home position at the top of the feed mechanism. Before new food articles are loaded onto the feed mechanism 120, the paddle 2046 is withdrawn to the position shown in FIG. 28 and then the transport 2000 is moved to the position shown in FIG. 28 carrying the end portions out of the food article feed mechanism and away from the conveyor 530. The process is repeated after new food articles are sliced and grippers and ends proceed up the food article feed paths. The grippers are again halted at a position part way up the feed paths, the paddle is moved to the position shown in FIG. 27 and the transport 2000 is moved back onto the conveyor 530. The paddle 2046 displaces the end portions off of the transport 2000 and into a bucket or other disposal mechanism, as the transport moves over the conveyor.

Figure 29:
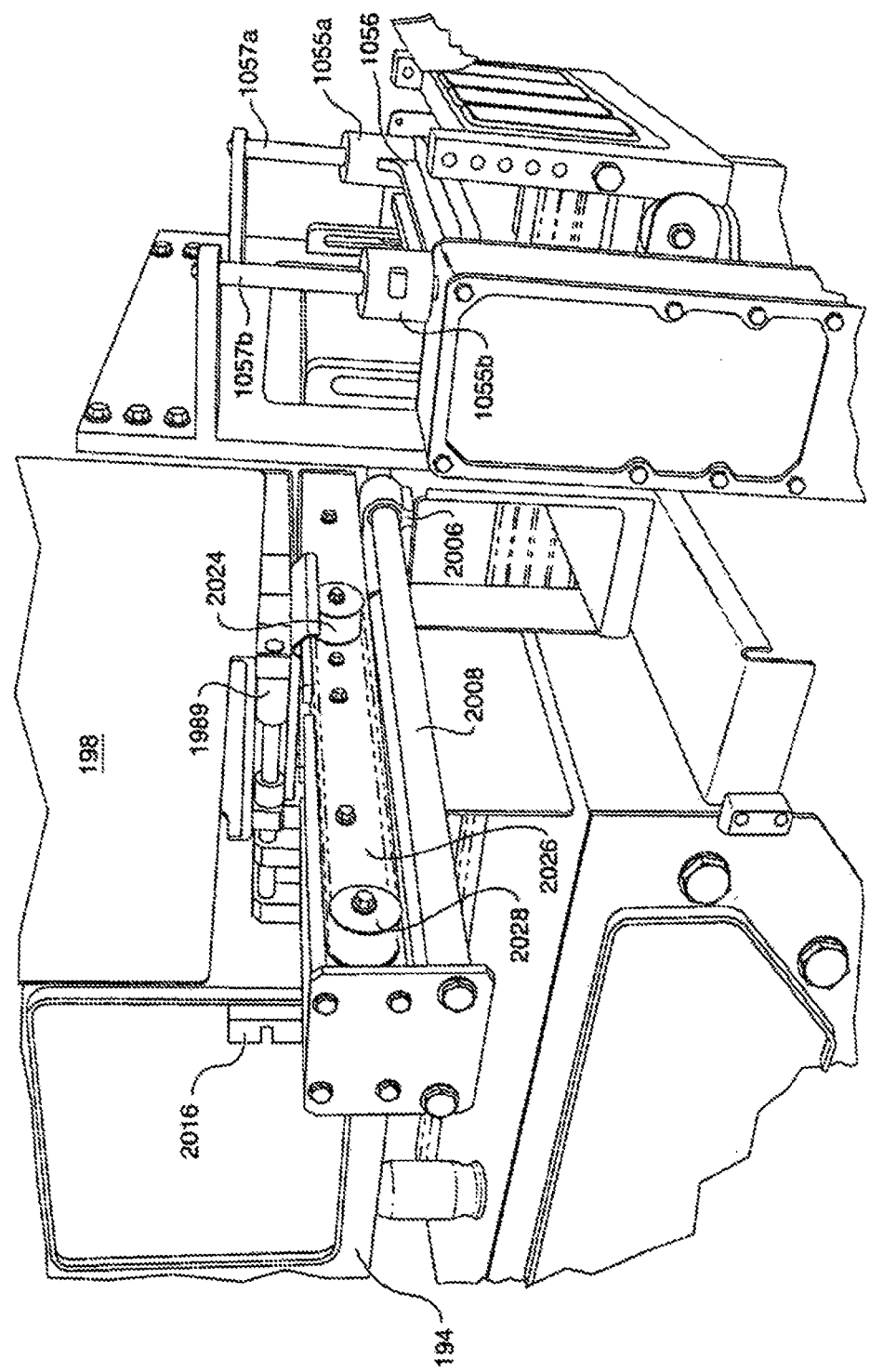
FIG. 29 is a far side perspective view of the food article end removal mechanism.
Figure 30:
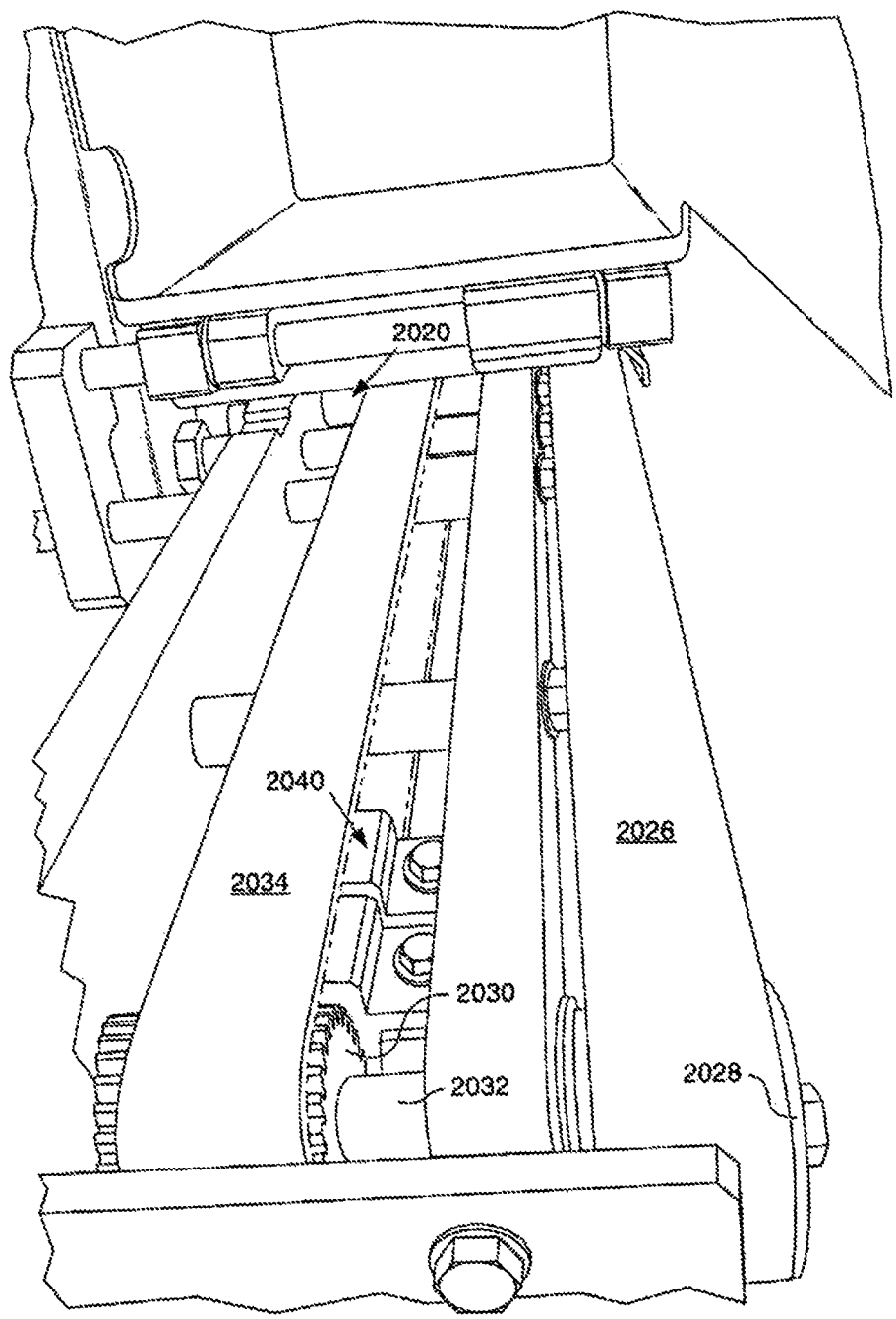
FIG. 30 is a top far side perspective view of the food article end removal mechanism.
Figure 31:
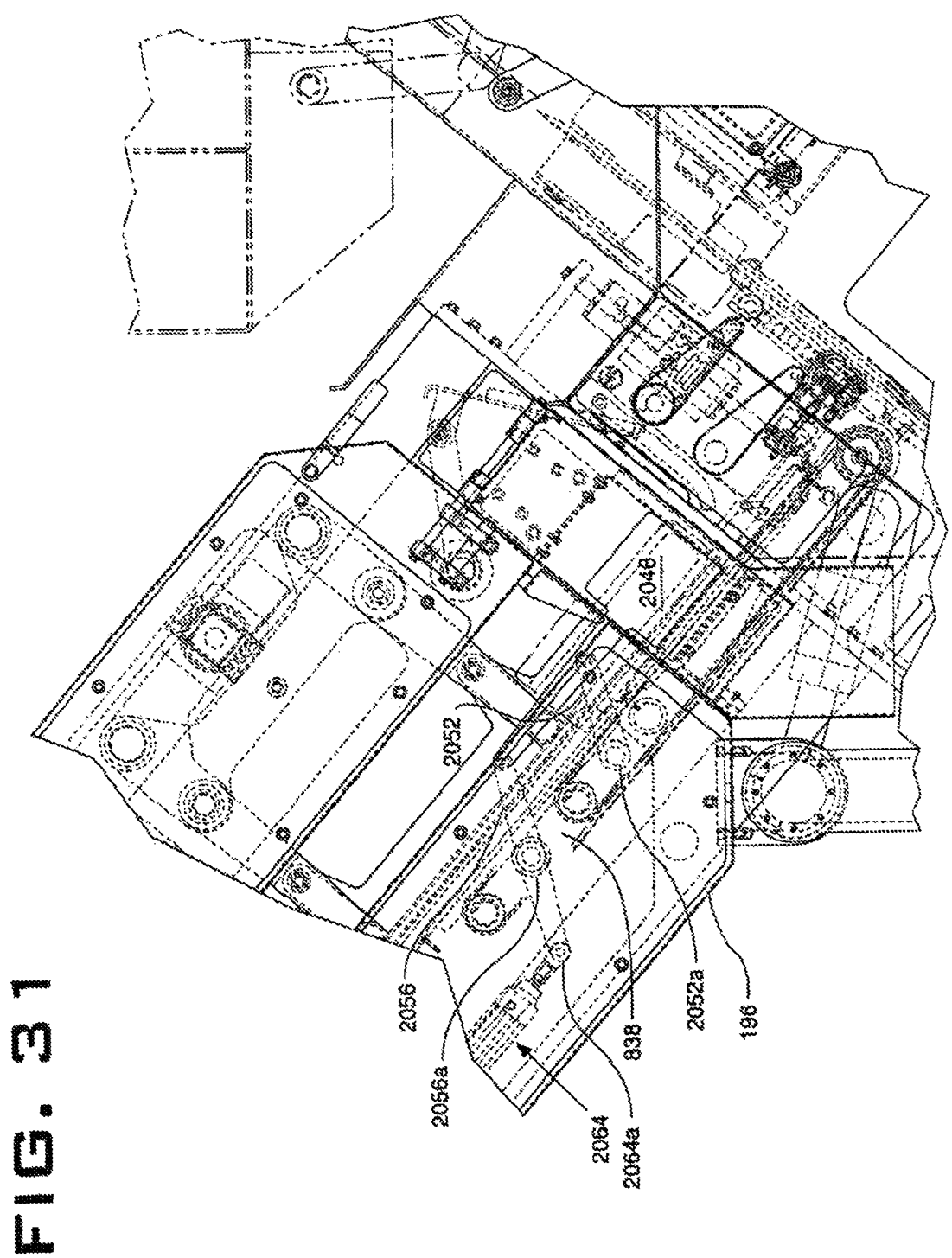
FIG. 31 is a far side elevation view of the food article gate mechanism and the food article end removal mechanism.

On a far side of the machine 100, the transport 2000 is covered by a cover and chute arrangement 198 shown in operating position in FIGS. 6 and 10 and pivoted about hinges 198a to be in a raised maintenance position shown in FIG. 29.

Slicing Head Section

FIGS. 2, 3, 5, 6 and 32-37 illustrate components and features of the slicing head section 124. The section 124 includes a housing 2060 having a thick top wall 2061 (FIG. 33), thick side walls 2062a, 2062b, an enclosing front skin 2063a, a top skin 2063b and a bottom wall 2064. The front skin 2063a can include a window 2063c closed by a cover 2063d that provides access to the motor within the housing 2060.

The side walls 2062a, 2062b are substantially similar. Each sidewall includes an upper window 2065a and a lower window 2065b. The upper windows are closed by covers 2065c. The side walls 2062a, 2062b extend outside of and down below the top wall 142 of the compartment 136 and are fastened through the compartment 136 by tubular braces 2067a, 2067b, 2067c traversing inside the compartment 136, welded to the sidewalls 138a, 138b and nuts 2066a, 2066b, 2066c on each side of the compartment tightened onto threaded rods (not visible) that are inserted through the tubular braces 2067a, 2067b, 2067c.

The thick top wall 2061 and thick side walls 2062a, 2062b form a rigid frame for the slicing head section 124.

A slicing head cover 2070 is provided to cover the moving slicing blade and openings near to the slicing blade during operation.

The slicing head cover 2070 is pivotally connected to the side walls 2062a, 2062b by a pair of articulated arms 2071a, 2071b that are mirror image identical across a longitudinal, vertical center plane of the slicing head section 124. The slicing head cover 2070 is hinged to the top skin 2063b by hinges 2072a, 2072b.

The slicing head cover 2070 can be pivoted upwardly by the arms 2071a, 2071b moving from a folded state or closed state as shown in FIG. 2 to a substantially unfolded state or open state as shown progressively in FIG. 3, wherein the slicing head cover moves from position 2070a to 2070b to 2070c.

Figure 32:
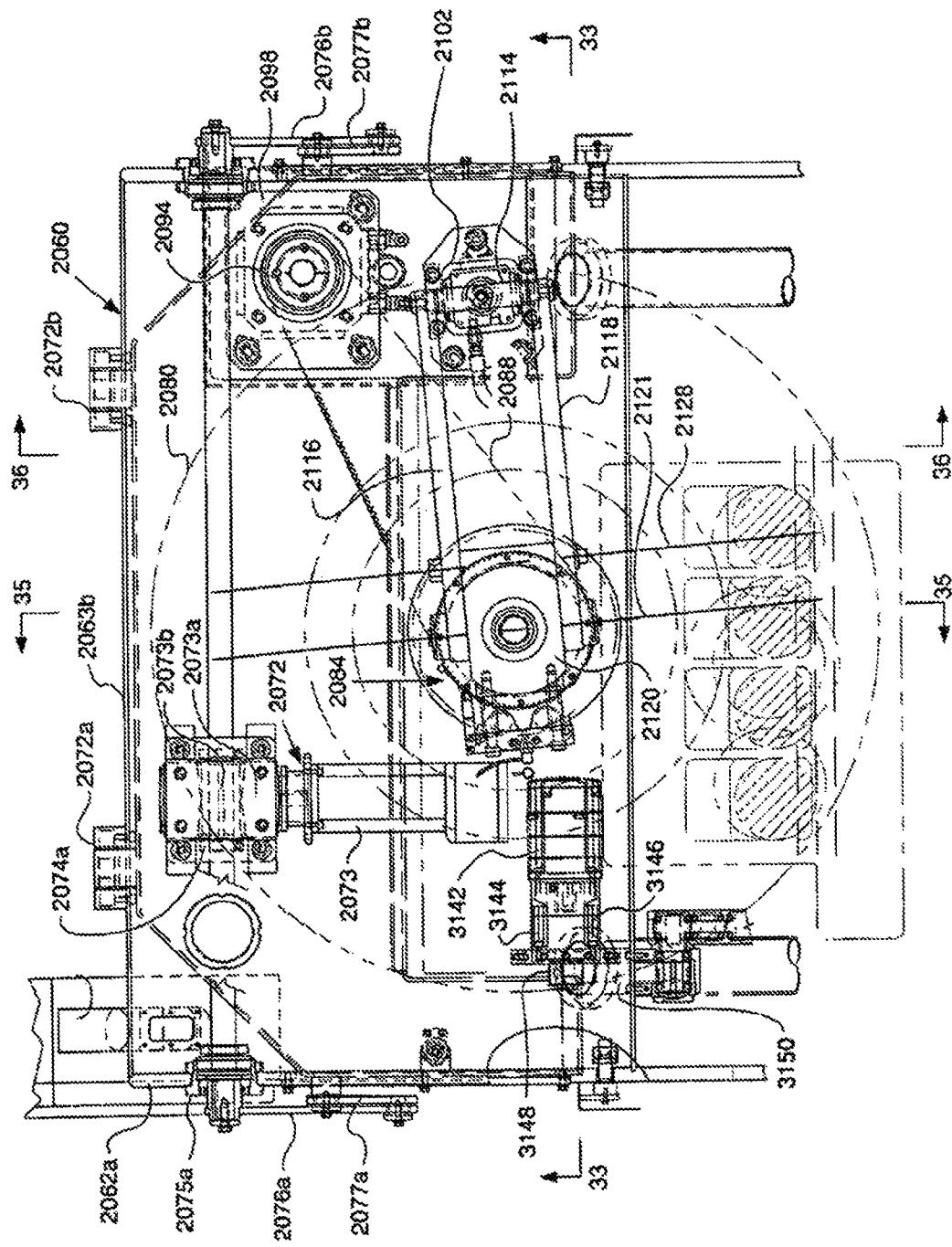
FIG. 32 is a sectional view taken generally along line 32-32 of FIG. 2.
Figure 33:
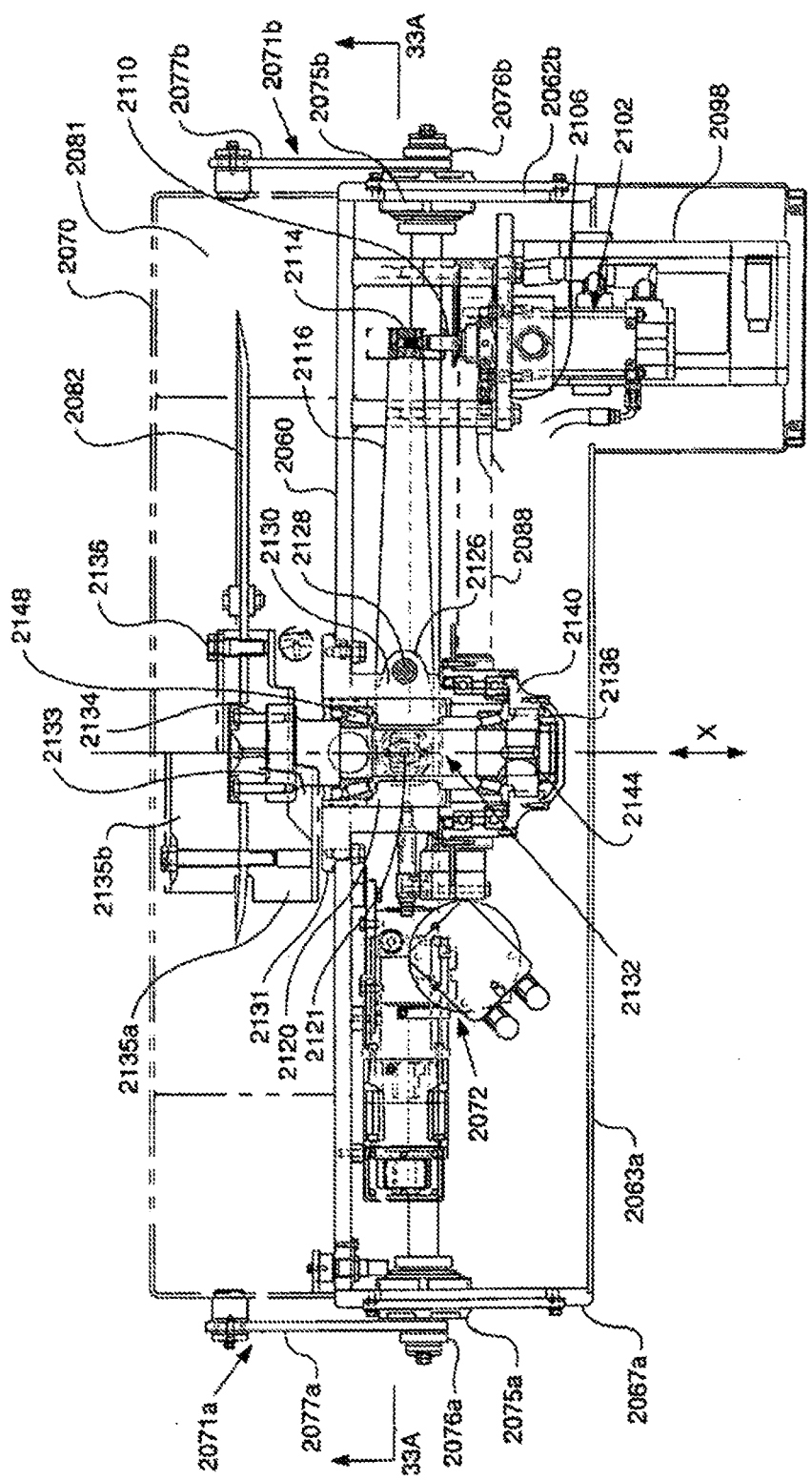
FIG. 33 is a sectional view taken generally along line 33-33 of FIG. 32.

FIGS. 32 and 33 illustrate a mechanism 2072 used to move the arms 2071a, 2071b to raise and lower the slicing head cover 2070. The mechanism comprises a vertically oriented servomotor 2073 having an output shaft 2073a connected to a worm gear 2073b. The worm gear 2073b is enmesh with a hollow follower gear 2074a fixedly mounted on a transverse shaft 2074b. The shaft 2074b extends across the housing 2060 and exits side walls 2062a, 2062b through bearings 2075a, 2075b.

The shaft 2074b is fixed to pivot levers 2076a, 2076b that are respectively pivotally connected to swing levers 2077a, 2077b of the respective arms 2071a, 2071b. Ends of the swing levers 2077a, 2077b are pivotally connected to the slicing head cover 2070.

When the servomotor is turned in the select direction to open the slicing head cover 2070, the worm gear 2073b turns about its axis which turns the shaft 2074b about its axis. Turning of the shaft 2074b counterclockwise as viewed in FIGS. 2 and 3 pivots the lever arms 2076a, 2076b clockwise which thrusts the swing arms 2077a, 2077b upward to lift up the slicing head cover 2070.

The circle 2080 in FIG. 32 schematically illustrates the cutting path within a cutting plane 2081 of an involute-shaped blade 2082 (shown in FIG. 33). A rotary hub 2084 has a fixed toothed annular surface 2084a that is rotated by a toothed belt 2088 that is circulated by a drive pulley 2094 that is driven by a servomotor 2098. The rotary hub 2084 is carried by a stationary hub 2130. The stationary hub 2130 includes a flange 2131 that is fastened to the thick top wall 2061.

A linear servo actuator 2102 has a trunion mount 2106 that is fastened to the top wall 2061 of the housing 2060. The cylinder has an extendable rod 2110 that is connected to a vertical link 2114 that is pivotally connected at its opposite ends to base ends of parallel pivot bars 2116, 2118. For clarity, the lower pivot bar 2118 is not shown in FIG. 33. The pivot bars 2116, 2118 are both pivotally and slidably attached at distal ends about an axis 2121 to opposite sides of a bearing hub 2120 that is arranged for sliding movement only in the axial direction "X" (FIG. 33), within the stationary hub 2130. The pivot bars 2116, 2118 are also both pivotally attached at an intermediate location about a pivot axis 2128 to a flange 2126 formed on the stationary hub 2130. The pivot axis 2128 is located between the base ends and distal ends of the pivot bars 2116, 2118.

Figure 34:
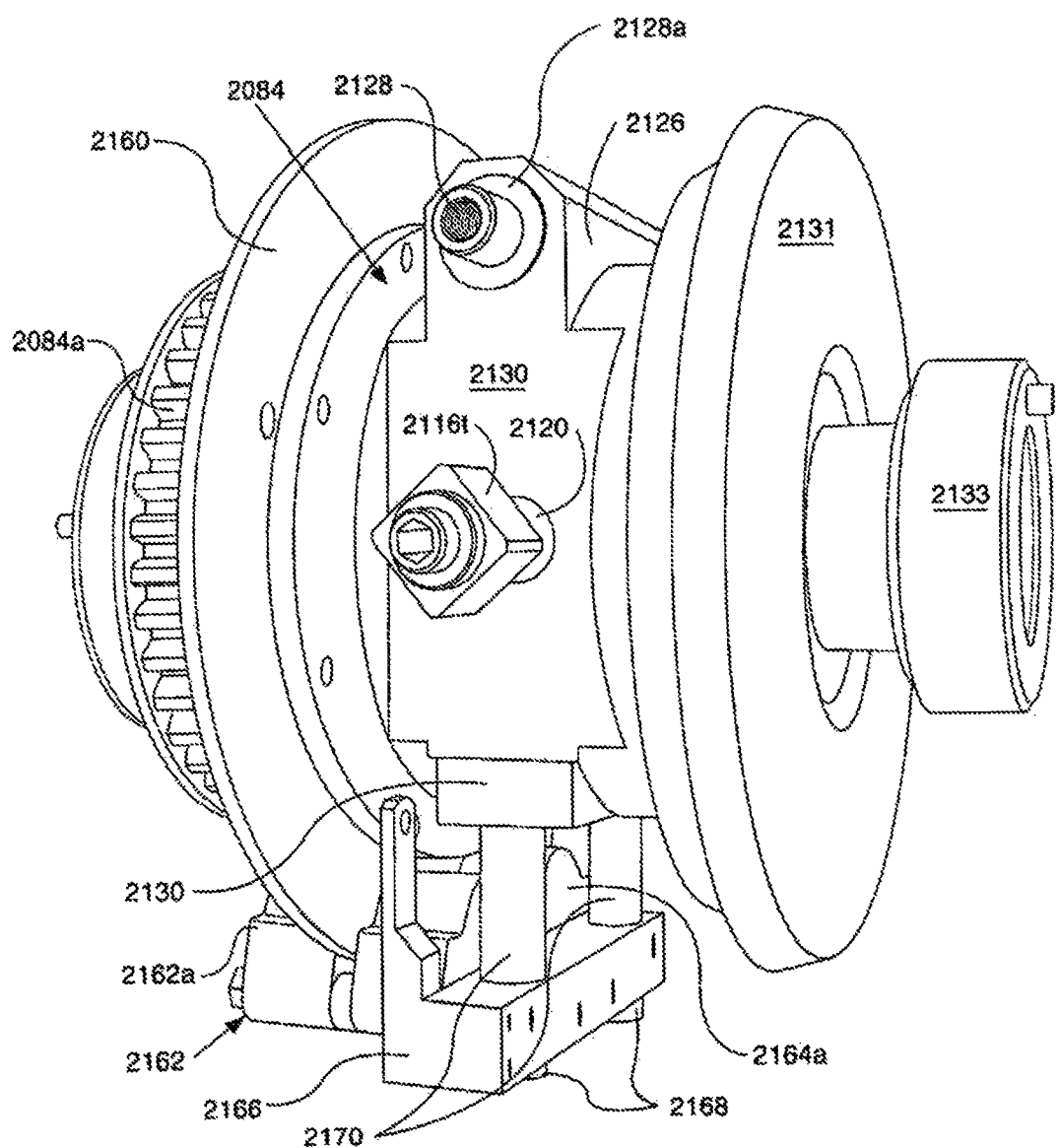
FIG. 34 is a perspective view of a portion of a slicing blade assembly taken from FIG. 32.
Figure 36:
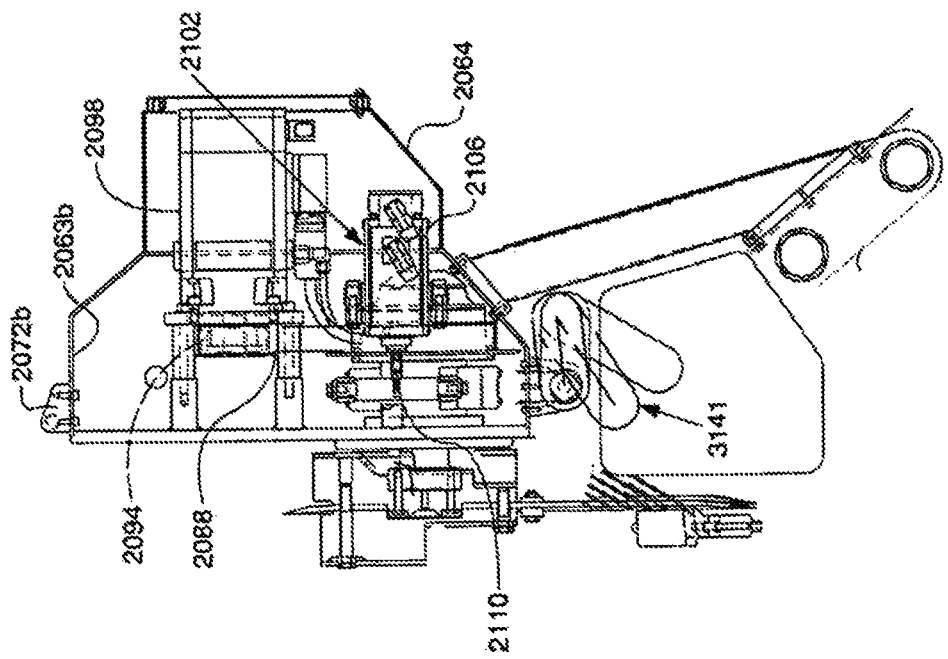
FIG. 36 is a sectional view taken generally along line 36-36 of FIG. 32.
Figure 35:
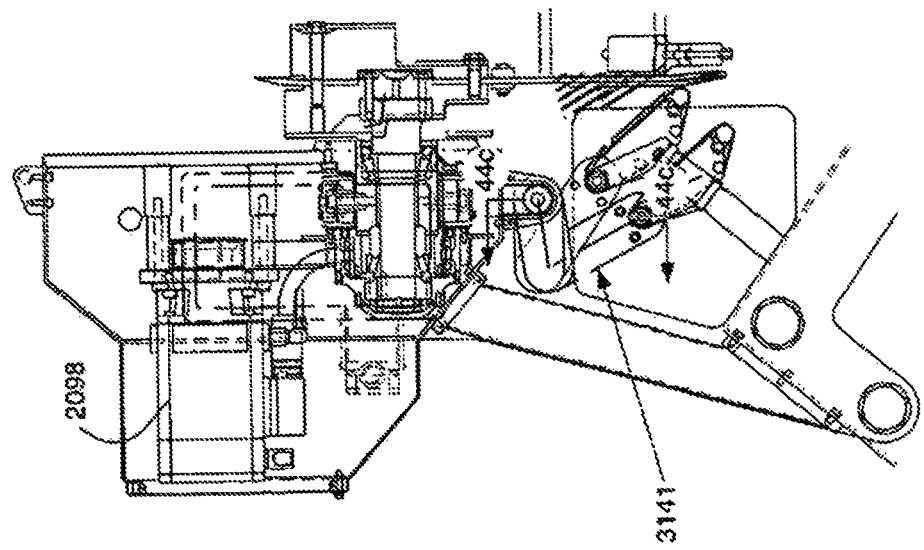
FIG. 35 is a sectional view taken generally along line 35-35 of FIG. 32.

As shown in FIGS. 33A and 34, since the stationary hub surrounds the bearing hub 2120, enlarged or oblong holes 2130c are provided through the stationary hub 2130 to allow a pair of pins 2130d, each having a smaller diameter than the respective oblong or enlarged hole 2130c to pass through the stationary hub 2130 on opposite sides, to be fixed to the bearing hub 2120. The oblong or enlarged holes 2130c allow for some clearance for the sliding movement of the bearing hub 2120 with respect to the stationary hub 2130.

Rectangular sliding lugs 2116t, 2118t are fit within elongated rectangular holes 2116v, 2118v in the pivot bars 2116, 2118. The lugs 2116t, 2118t and holes 2116v, 2118v allow sliding movement of the lugs 2116t, 2118t in the direction "T" during pivoting of the pivot bars 2116, 2118. The lugs 2116t, 2118t are rotatably fastened to the pins 2130d and cover with caps 2130f wherein oil or grease can be filled in under the caps.

The pivot axis 2128 is provided by a pivot pin 2128a, with threaded end holes, that locks the pivot bars 2116, 2118 together by bolt caps 2128b.

A blade drive shaft 2132 is splined to the rotary hub 2084 by a gear 2136 engaged to a plurality of inner teeth 2140 on the inside of the rotary hub 2084. Thus, the rotary hub 2084 is fixed for rotation with the blade drive shaft 2132. The rotary drive shaft 2132 is journaled for rotation by base tapered roller bearings or thrust bearings 2144 and distal tapered roller bearings or thrust bearings 2148 in order for the rotary drive shaft 2132 to rotate with respect to the non-rotating bearing hub 2120.

The blade drive shaft 2132 includes a lower counterweight mount 2133 that permits a lower counterweight 2135a to be fastened directly to the blade drive shaft 2132 using fasteners 2134 threaded into threaded holes provided in the blade drive shaft 2132. Upper counterweight 2135b for balancing the involute-shaped blade 2082 is fastened to the involute-shaped blade 2082 using fasteners 2136.

When the rod 2110 is extended with respect to the actuator 2102, the pivot bars 2116, 2118 rotate counterclockwise (as viewed in FIG. 33) about the pivot axis 2128 and thrust the pivot axis 2121 in a direction away from the cutting plane 2081 (down in FIG. 33). The bearing hub 2120 slides within the stationary hub 2130. The cutting blade 2082 becomes offset by a small amount away from the cutting plane 2081.

When the actuator 2102 reverses the direction of the rod 2110, i.e., the rod is retracted, the pivot bars 2116, 2118 rotate clockwise (as viewed in FIG. 33) about the pivot axis 2128 and the pivot bars 2116, 2118 thrust the axis 2121 in a direction toward the cutting plane 2081. The bearing hub 2120 slides toward the cutting plane 2081 (up in FIG. 33), and the blade 2082 returns to being coplanar with the cutting plane 2081.

A disc 2160 is fastened to the rotary hub 2084 with fasteners to rotate therewith. As shown in FIGS. 33A and 34, a pair of disc brakes 2162, 2164 are provided having calipers 2162a, 2164a, respectively. The calipers 2162a, 2164a are fixedly mounted to a mounting bar 2166 and fit over opposite sides of the disc 2160. The mounting bar 2166 is mounted to the stationary hub 2130 by fasteners 2168 and tubular spacers 2170. Each disc brake 2162, 2164 includes movable, opposing friction pads within the calipers 2162a, 2164a (not seen) that face opposite sides of the disc 2160 and are subject to air pressure within the calipers 2162a, 2164a to squeeze the rotating disc 2160 and bring the rotating disc 2160 and the rotary hub 2084, the drive shaft 2132 and the blade 2082 to a rapid and safe stop.

Food Article Feed Elevation Adjusting Apparatus

Figure 38:
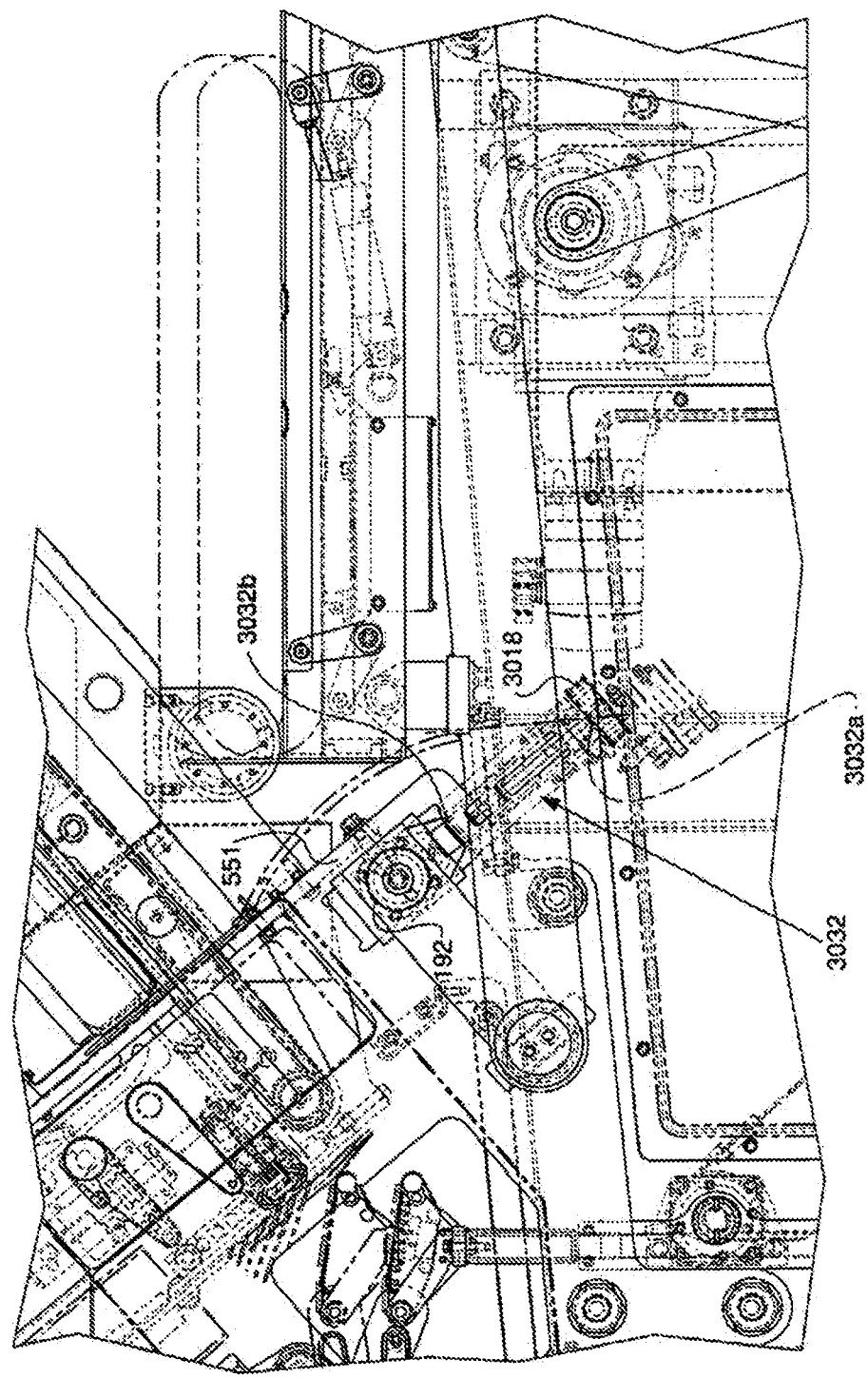
FIG. 38 is an enlarged fragmentary near side elevational view of the combination of FIG. 1 showing underlying components and features.

It is an advantage of the or present invention that the height of the conveyor 530 at the front and back ends thereof can be precisely set depending on the product size to be cut. Accordingly, a food article feed elevation adjusting apparatus 3000 is provided and illustrated in FIGS. 37-39. The adjusting apparatus 3000 also includes the foldable support mechanism 174 previously described in the control thereof. The adjusting apparatus 3000 includes a servomotor 3002 that is mounted within the enclosure 136 by a bracket 3006 that is secured to the transverse strut 2067c. The servomotor 3002 includes an output shaft 3005 that drives an output pulley 3008. A toothed belt 3010 surrounds the output pulley 3008 and two adjustment pulleys 3016, 3018. A tension pulley 3020 maintains a constant tension on the belt 3010, and causes the belt to wrap more teeth on each of the adjustment pulleys 3016, 3018. Each adjustment pulley 3016, 3018 is connected to an input shaft 3030a, 3032a of a fine movement screw adjusting cylinder or actuator 3030, 3032, respectively. Thus, when the servomotor 3002 turns, the pulleys 3008, 3016, 3018, 3020 causes fine, precise movement of the output end 3030b, 3032b of the adjusting cylinders 3030, 3032. The adjusting cylinders 3030, 3032 are set at an angle that is substantially perpendicular to the conveying surface of the conveyor 530, as shown in FIG. 27, and is substantially parallel to the cutting plane so that any adjusted change in elevation by the adjusting cylinders 3030, 3032, with a corresponding change in elevation of the foldable support mechanism 174 through a controlled movement of a servomotor 175, will not change the angle of slice through food articles carried on the conveyor 530.

FIG. 40 shows the adjusting cylinders 3030, 3032 extending above the top wall 142 of the compartment. The cylinders 3030, 3032 are fixed with respect to the top wall 142 but the output ends 3030b, 3032b can be raised and lowered by the servomotor 3002. The output ends 3030b, 3032b are rotatably connected to the axle 192 by rings 3030c, 3032c that are connected to the output end 3030b, 3032b, and encircle the axle 192 but allow free rotation of the axle 192 within the rings 3030c, 3032c.

Figure 41:
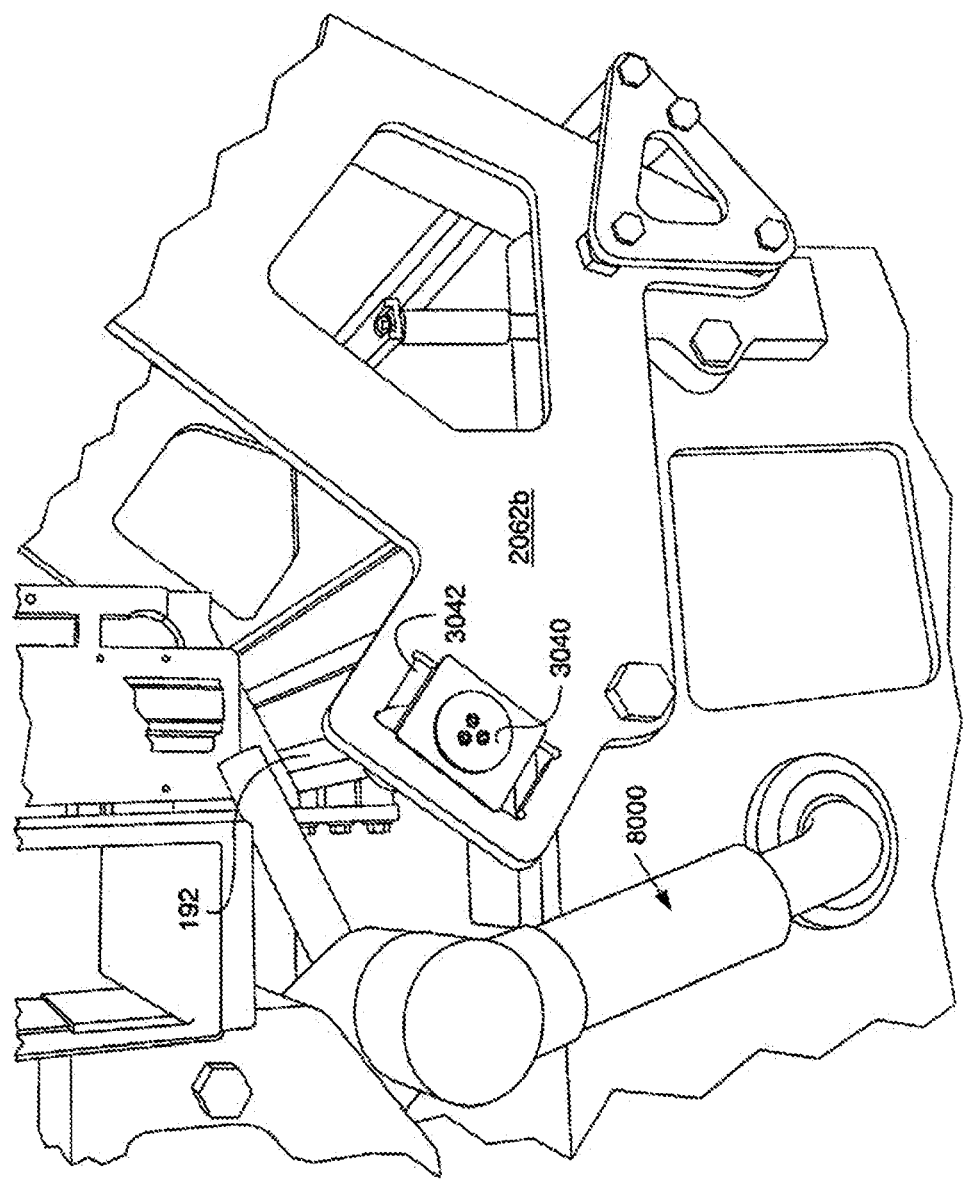
FIG. 41 is a far side perspective view of a front portion of the combination of FIG. 1.
Figure 42:
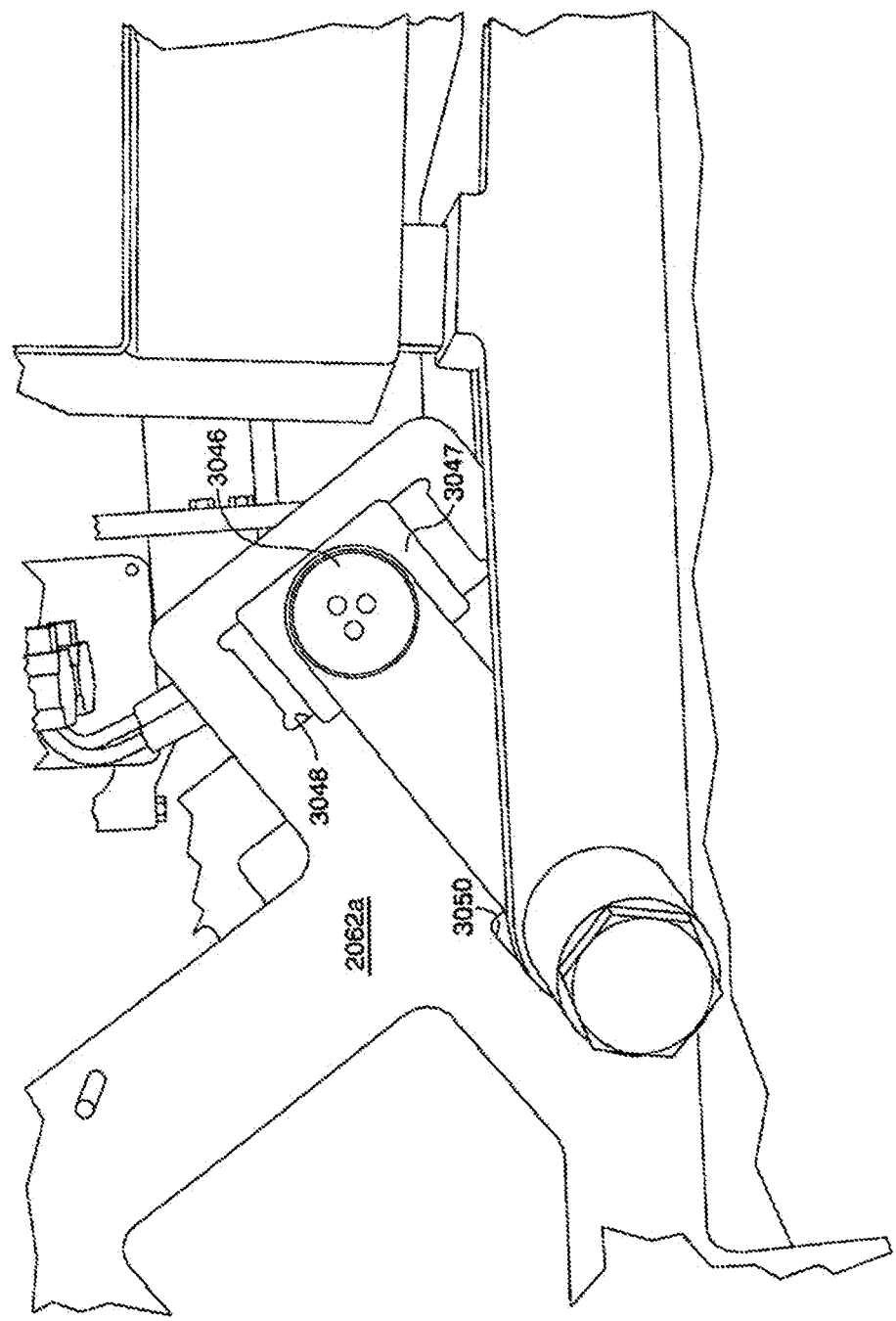
FIG. 42 is a near side perspective view of a food article positioning apparatus and food article feed elevation adjusting apparatus.

FIG. 41 illustrates the axle 192 journaled by a bearing 3040 that is mounted to a slide block 3041 that is slidably carried by the side wall 2062b along a slot 3042 that is elongated along the same angle as the adjustment direction of the cylinders 3030, 3032. FIG. 42 shows the axle 192 journaled by a bearing 3046 that is mounted to a slide block 3047 that is slidably carried by the side wall 2062a along a slot 3048 that is elongated along the same angle as the adjustment direction of the cylinders 3030, 3032.

Also, for adjusting the elevation of the food article lift tray positioning apparatus, the pivot point 342 (FIG. 5) is also guided by a bearing 3049 slidable within a slot 3050 in the side wall 2062a (FIGS. 42 and 50), the slots 3048 and 3050 being parallel in elongation.

Shear Support

Figure 43:
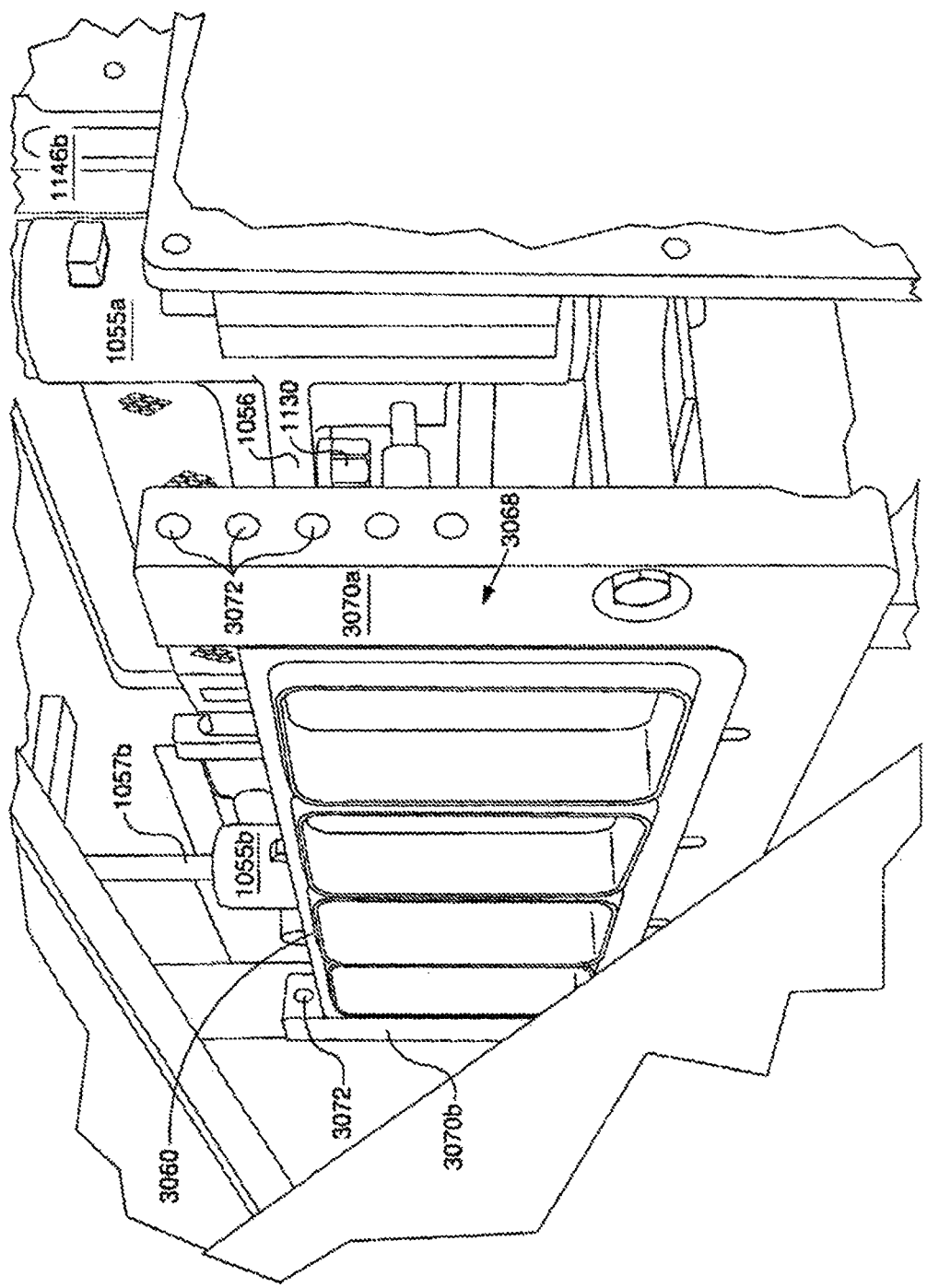
FIG. 43 is a near side perspective view of a food article shear support.
Figures 44, 44C:
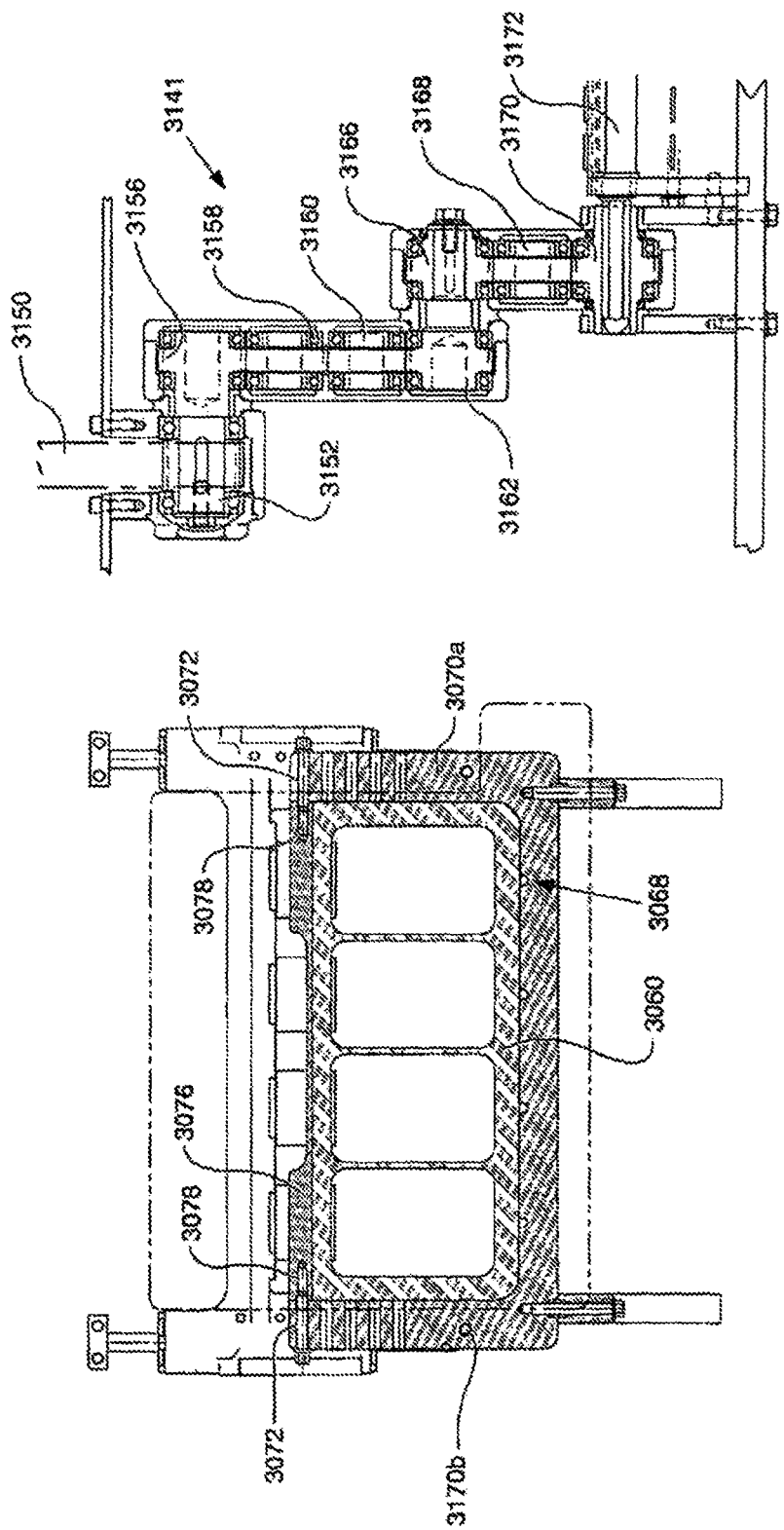
FIG. 44 is a front elevational view of the shear support shown in FIG. 43.
FIG. 44C is a sectional view of a jump conveyor drive assembly taken generally along line 44C-44C of FIG. 35.
Figure 44B:
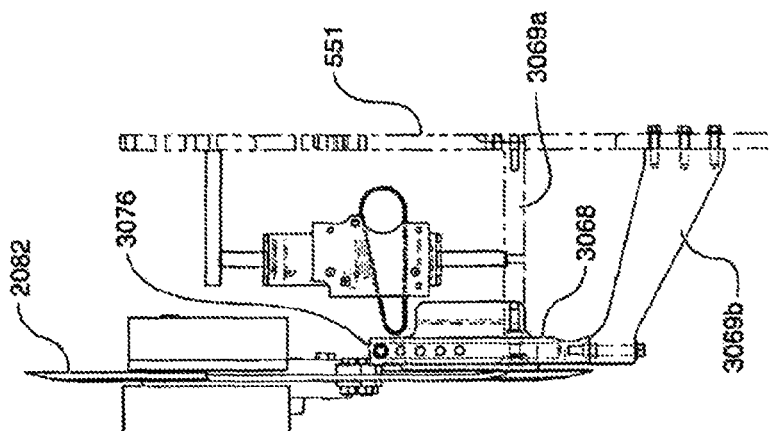
FIG. 44B is a sectional view taken generally along line 44B-44B of FIG. 44A.
Figure 44A:
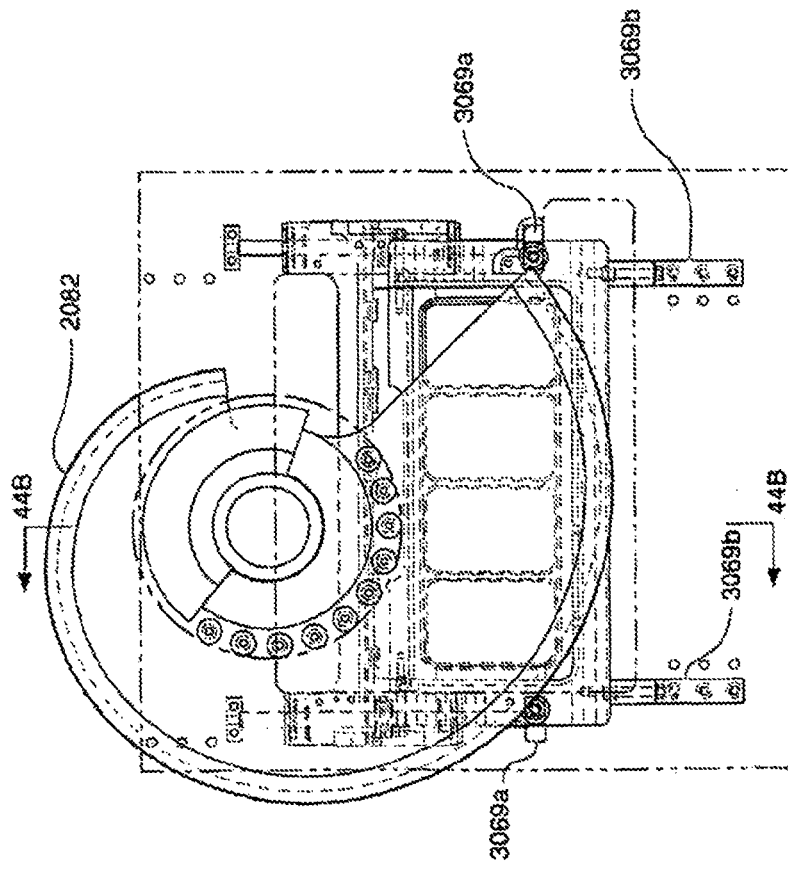
FIG. 44A is a front elevational view of a slicing blade with respect to the shear support.
Figure 45:
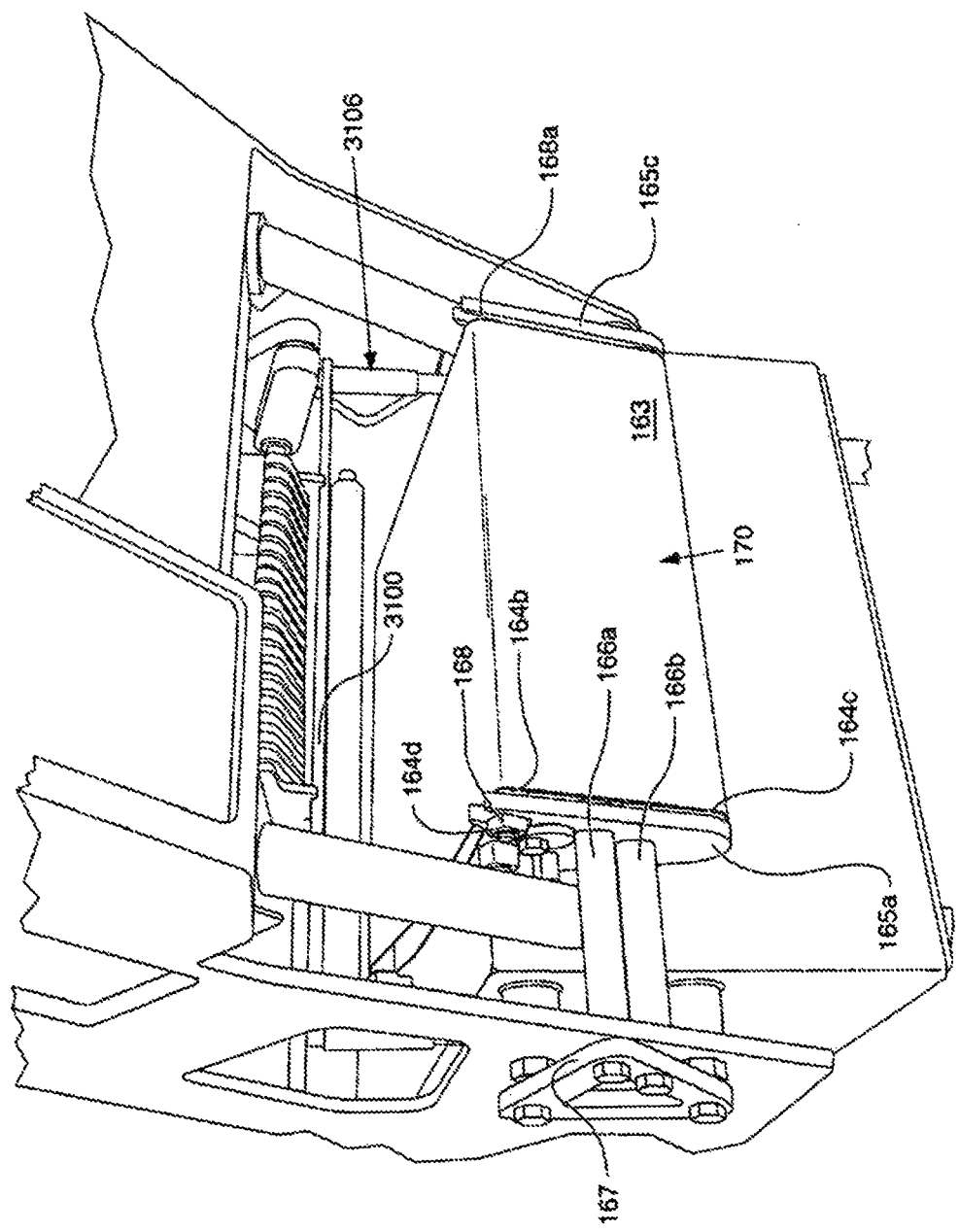
FIG. 45 is a front perspective view of the slicing apparatus with the weighing and classifying conveyor removed.

A shear support 3060 is shown in FIGS. 43 and 44. The shear support guides the food articles being sliced into the slicing plane wherein the rotating slicing blade is arranged to come within a close tolerance of the shear support. The shear support illustrated has four rectangular openings, although any number of openings or size and shape of openings is encompassed by the invention. The present embodiment of the invention could accommodate four or less openings of variable shapes and sizes. The shear support 3060 fits down into a U-shaped frame 3068 that is fastened by upper bracket 3069a and lower bracket 3069b at each side of the frame 3068 to the front plate 551 of the food article feed frame 190 as shown in FIGS. 44A and 44B.

The upright members 3070a, 3070b of the frame 3068 have a plurality of plain holes 3072 therethrough. Once the shear support 3060 is set down into the frame 3068 a top cross bar 3076 (shown in FIG. 44, not installed in FIG. 43) is placed over the shear support between the upright members and bolted to the upright members using a pair of plain holes 3072 aligned across the frame 3068, depending on the height of the shear support 3060, that allow the top cross bar 3076 to fit down snugly on the shear support 3060, and threaded holes 3078 provided into the cross bar, to complete a rectangular frame that surrounds the shear support on all four sides.

The shear support 3060 is preferably composed of non-metallic material.

Slice Receiving Apparatus

The slice receiving apparatus 130 comprises a slice accumulation conveyor or jump conveyor 3064.

Figure 39:
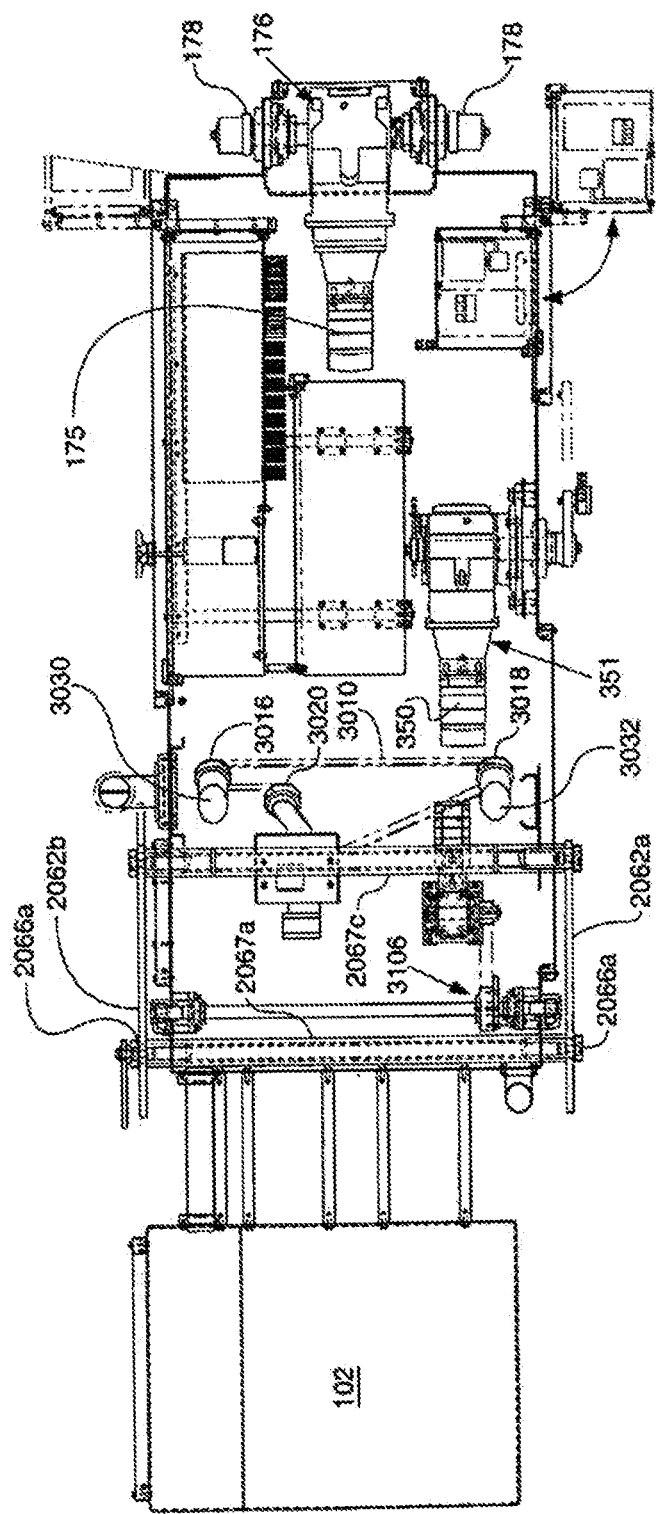
FIG. 39 is a plan view of mechanical components within the base section of the combination shown in FIG. 1.
Figure 46:
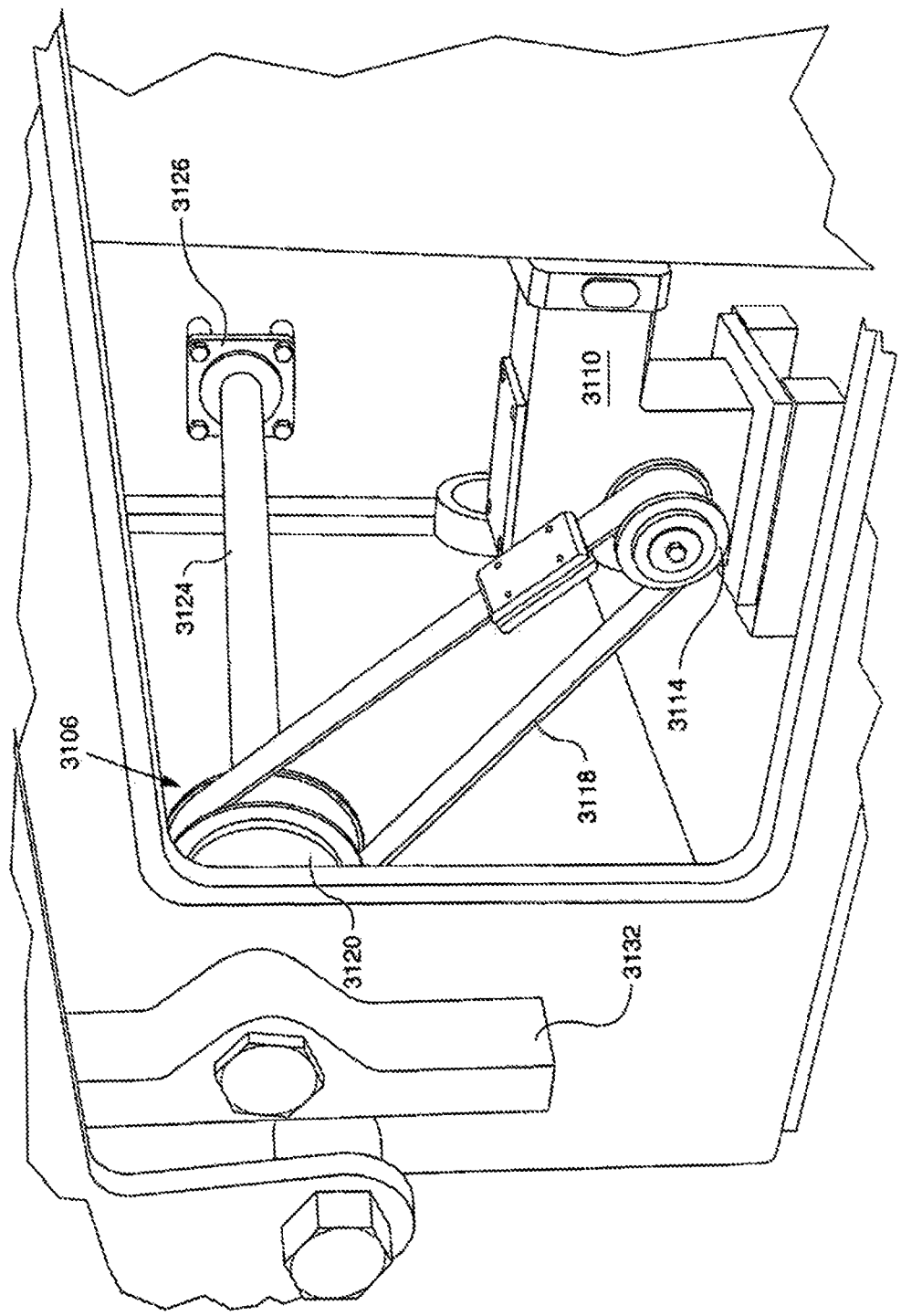
FIG. 46 is a near side perspective view of a front portion of the slicing apparatus with a cover removed to view inside components.
Figure 47:
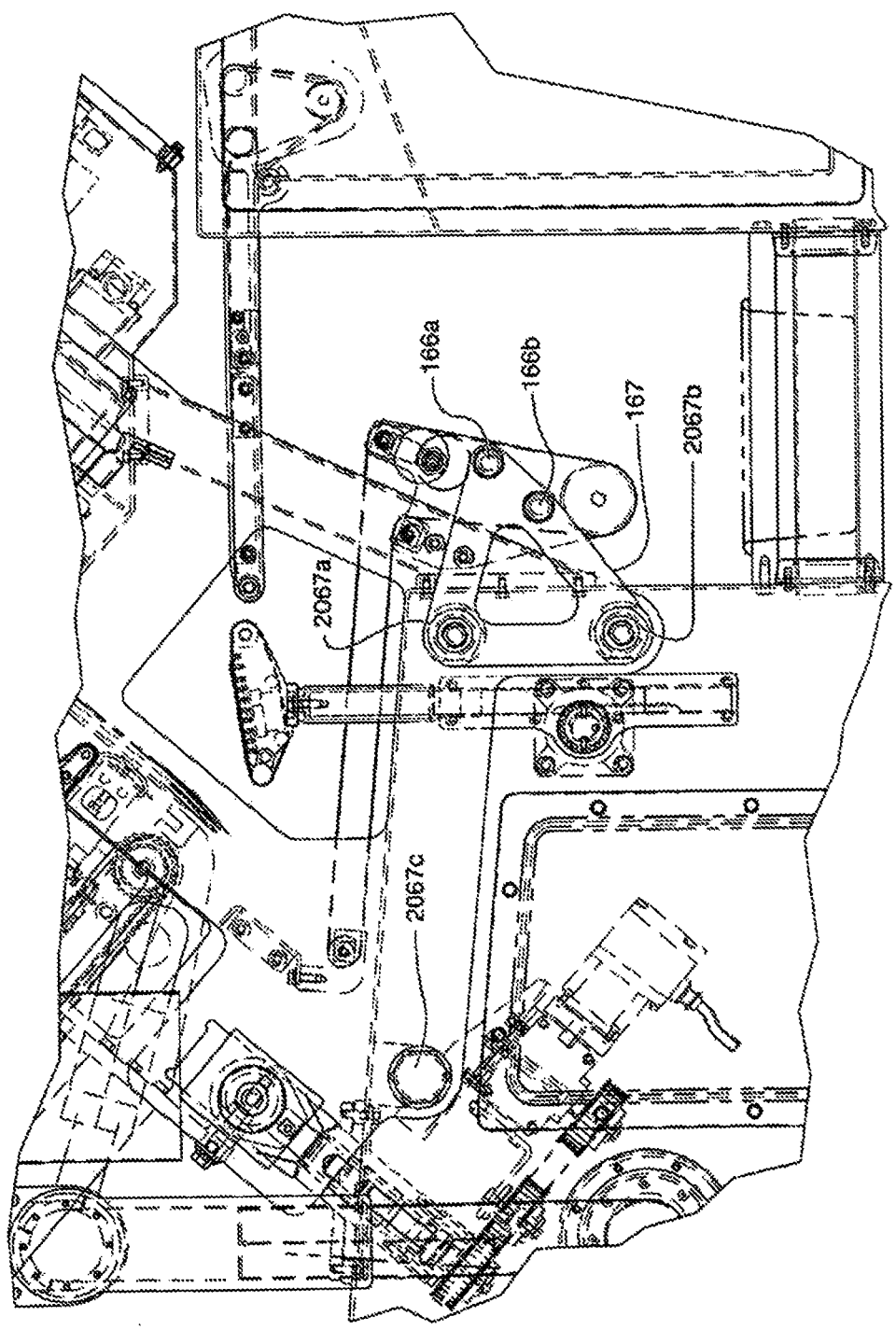
FIG. 47 is a far side of elevational view of the slicing apparatus showing underlying components.
Figure 48:
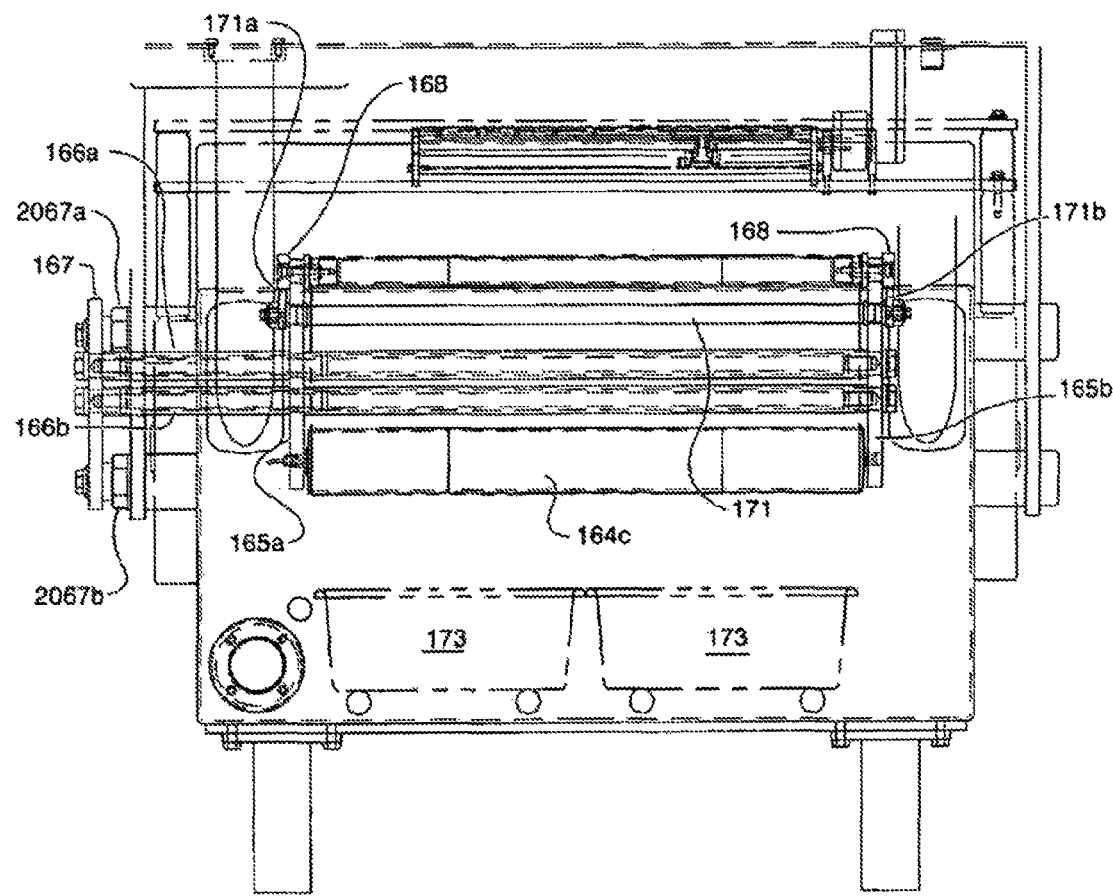
FIG. 48 is a front elevational view of the slicing apparatus with the weighing and classifying conveyor removed.
Figure 49:
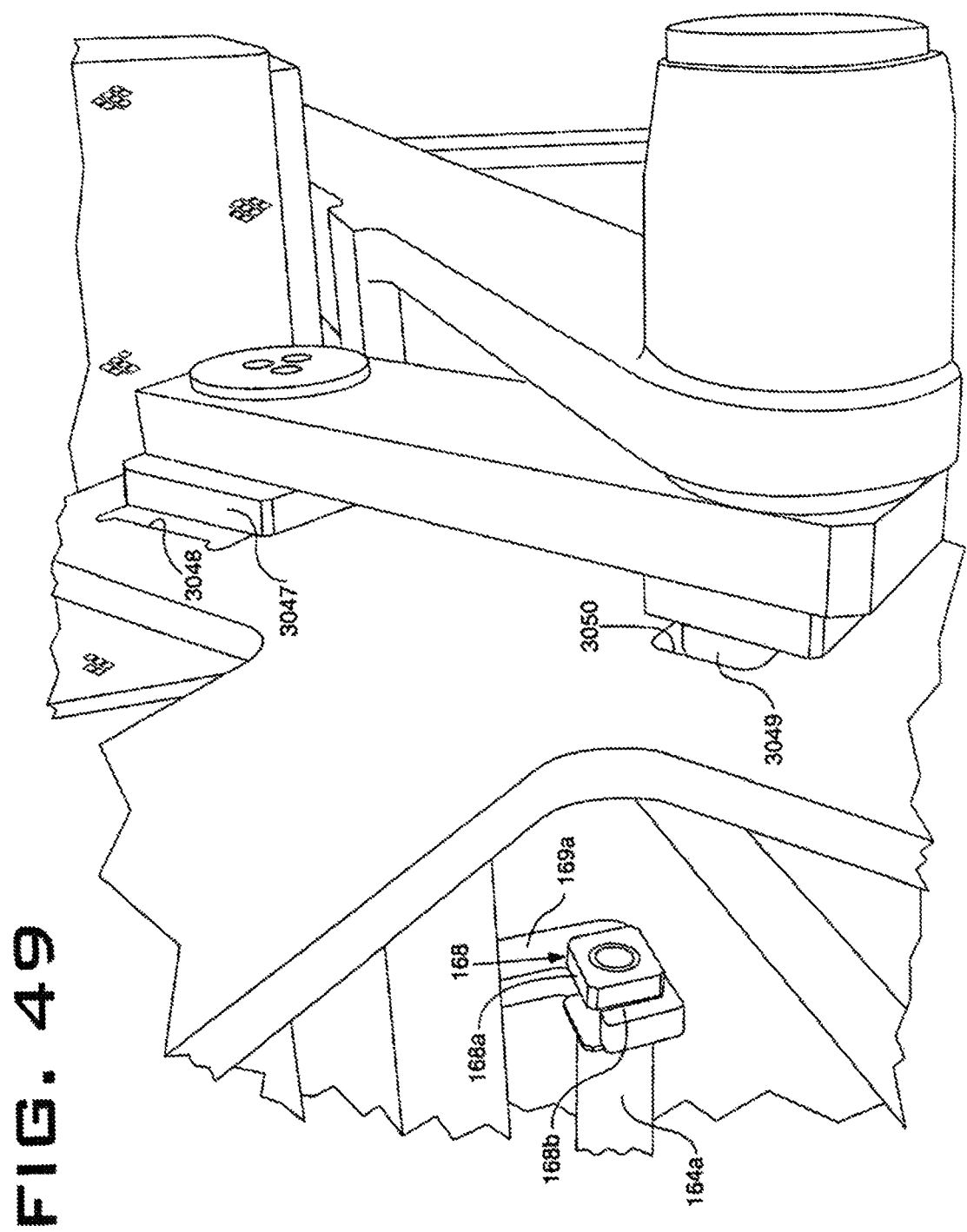
FIG. 49 is a enlarged near side perspective view of the slicing apparatus.
Figure 50:
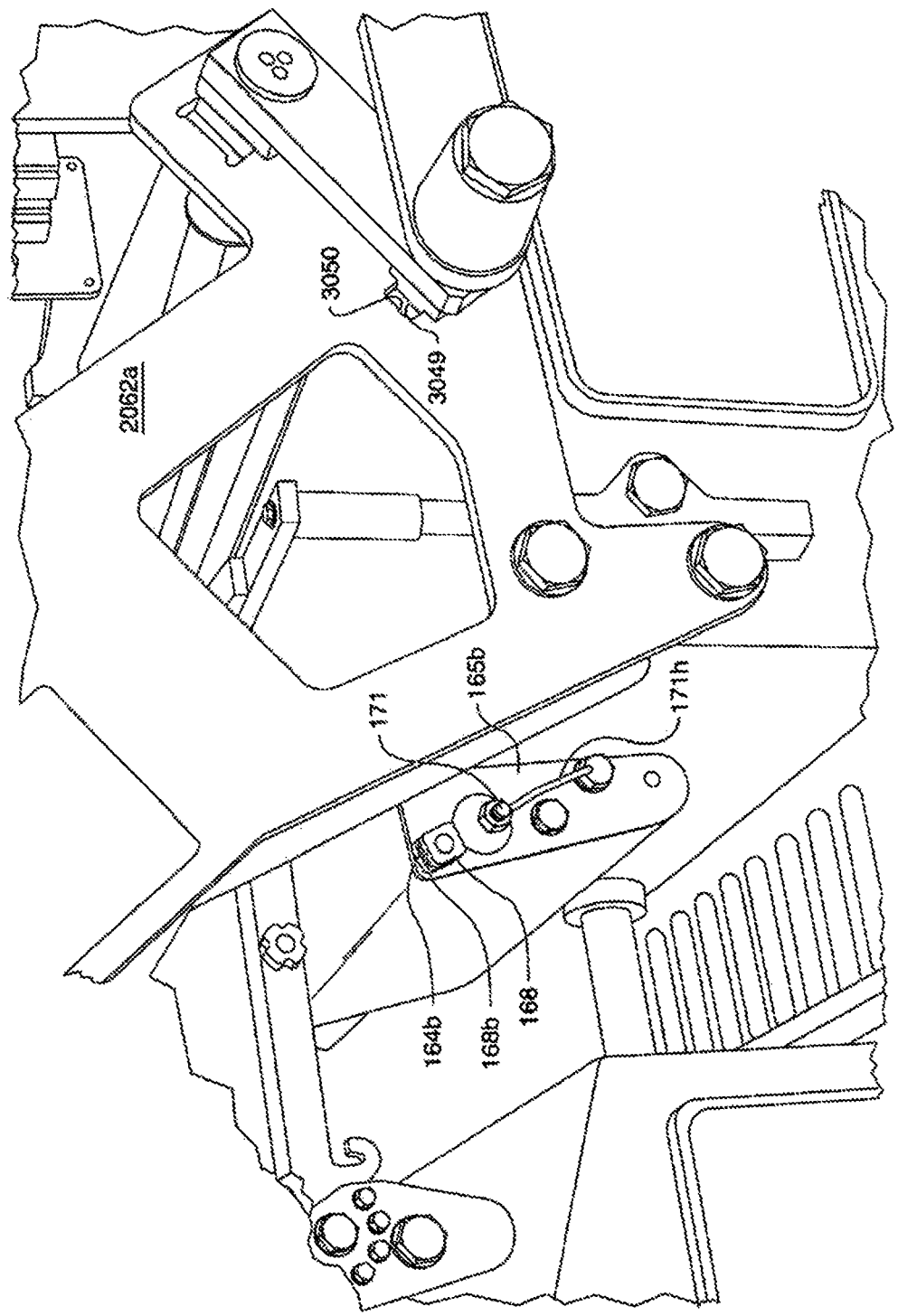
FIG. 50 is an enlarged near side perspective view of the slicing apparatus and weighing and classifying conveyor.
Figure 55:
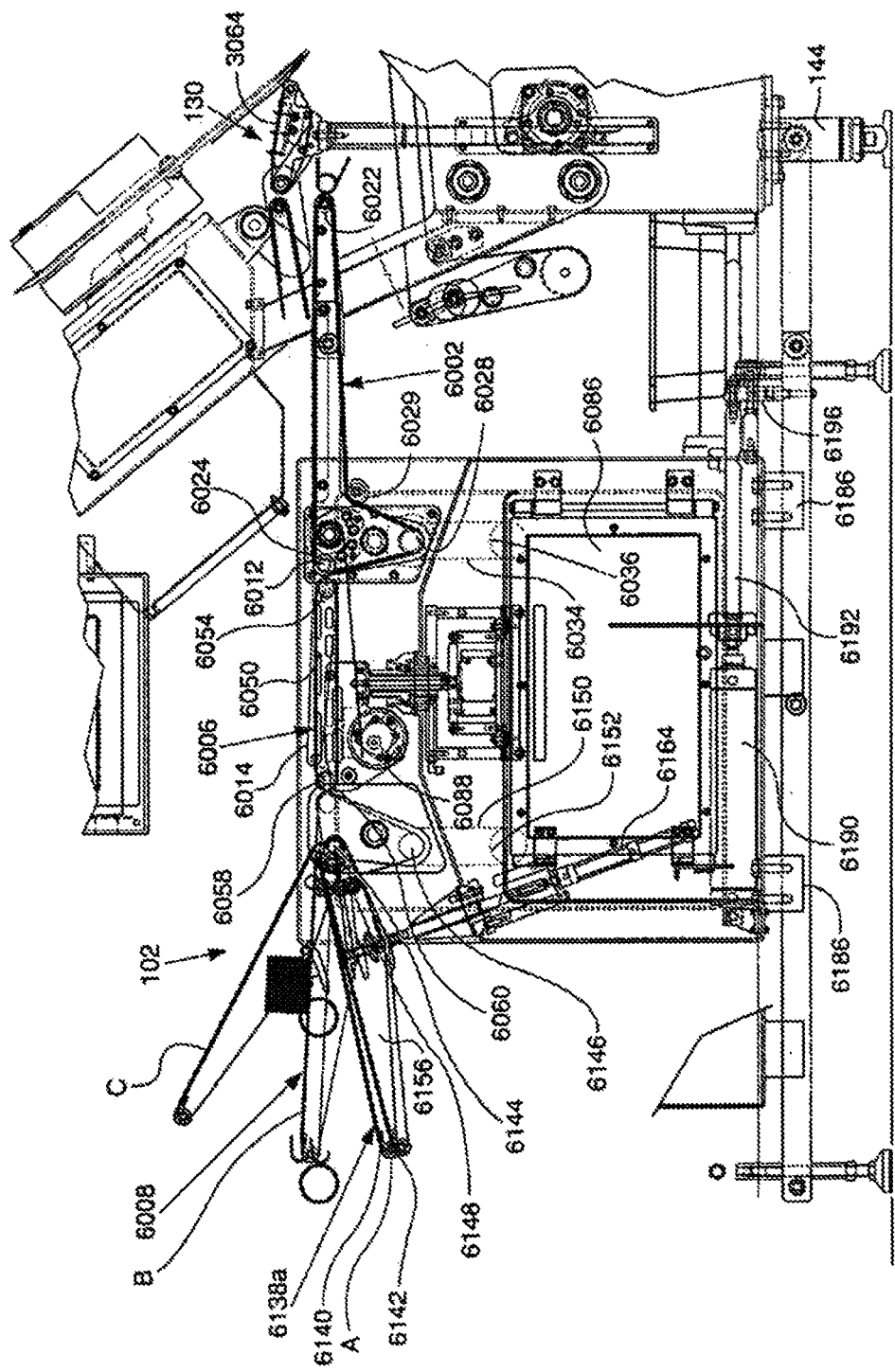
FIG. 55 is a near side elevation view of the weighing and classifying conveyor of FIG. 1 showing underlying components.

The conveyor 3064 is shown in FIGS. 37 and 55. The conveyor 3064 is carried on a transverse bar 3100 that is supported at opposite ends by a raising apparatus 3106. The raising apparatus 3106 is shown in FIGS. 37, 39 and 46. The raising apparatus 3106 comprises a servomotor 3110 that drives a gearbox 3111 that drives a sprocket 3114 that drives a belt (or multiple belt elements) 3118. The belt is wrapped around a driven sprocket 3120 that is fixed on a shaft 3124. The shaft 3124 is journaled by bearings 3126, 3128 and penetrates through the side walls 138a, 138h of the compartment 136 and into vertically arranged rack and pinion assemblies 3130, 3132 located outside the side skins across the compartment 136. The shaft 3124 is fixed to a pinion 3136 within each rack and pinion assembly, wherein the pinion is enmesh with teeth on a vertical rack 3138. When the pinions 3136 are rotated by the shaft 3124 the racks 3138 are raised or lowered an equal amount. The transverse bar 3100 is supported at its opposite ends by one of the racks 3138.

In operation, as the blade cuts slices from the food articles 110, the slices accumulate on the conveyor 3064 in a straight stack or a shingled drafts or other style presentation as is known. As the stack accumulates the raising mechanism 3106 lowers the conveyor so that each slice falls an equal distance onto the stack. This helps form a neat stack.

A jump conveyor drive 3141 is shown in FIGS. 32, 33, 35, 36 and 44C. A servomotor 3142 drives a gearbox 3144 that has an output shaft 3146 that drives a pulley 3148. The pulley 3148 drives a belt 3150 that rotates a driven pulley 3152. The driven pulley 3152 drives an axially aligned gear 3156 that drives a series of counter-rotating, enmeshed gears 3158, 3160, 3162. The last gear 3162 drives an axially arranged gear 3166 that is enmeshed with a counter-rotating gear 3168. The counter-rotating gear 3168 is enmeshing with a final gear 3170 that drives a drive roller 3172 of the conveyor 3064. This arrangement allows relative axial pivoting between the pulley/gear 3152, 3156 and gear pairs 3162, 3166 to adjust the length of the drive 3141 by "folding" the drive to adapt to changing elevations of the jump conveyor 3064.

Sometime during slicing, food articles are exhausted (completely sliced) when the current accumulated stacks or drafts are only partially completed on the jump conveyor 3064. According to one advantage of the combination of the present invention, the partially completed stacks or drafts are moved from the jump conveyor onto the weighing and classifying conveyor 102 to be held in a standby position on the weighing and classifying conveyor 102. New food articles are loaded onto the machine 100 and initial slicing begins. However, initial slicing produces scrap pieces which must be removed from the salable product. The jump conveyor 3064 collects the scrap pieces and conveys the scrap pieces in a reverse direction to dump the scrap pieces off the back end of the jump conveyor down onto the scrap accumulating conveyor 170 where the pieces are removed with any other scrap on the conveyor. Alternatively, the jump conveyor 3064 can be lowered a small amount using the raising mechanism 3106, and the jump conveyor 3064 conveys the scrap pieces in a forward direction to dump the scrap pieces off the front end of the jump conveyor down onto the scrap accumulating conveyor 170 where the pieces are removed with any other scrap on the conveyor.

The jump conveyor can also be configured as described in U.S. Ser. No. 11/449,574 filed Jun. 8, 2006 herein incorporated by reference.

Onboard Information Carrier System

As another feature of the invention, the onboard information carrier system 135 can be incorporated into removable parts such as the slicing blade 2082 and the shear support 3060.

The onboard information carrier system preferably incorporates radio frequency identification technology (REID). The system can be incorporated into the exemplary embodiment of the present invention or other slicers as well, such as the FX180® slicer available from Formax, Inc. of Mokena, Ill., USA and slicers described in U.S. Pat. No. 5,628,237 and European patent EP 0 713 753, herein incorporated by reference.

Figure 51:
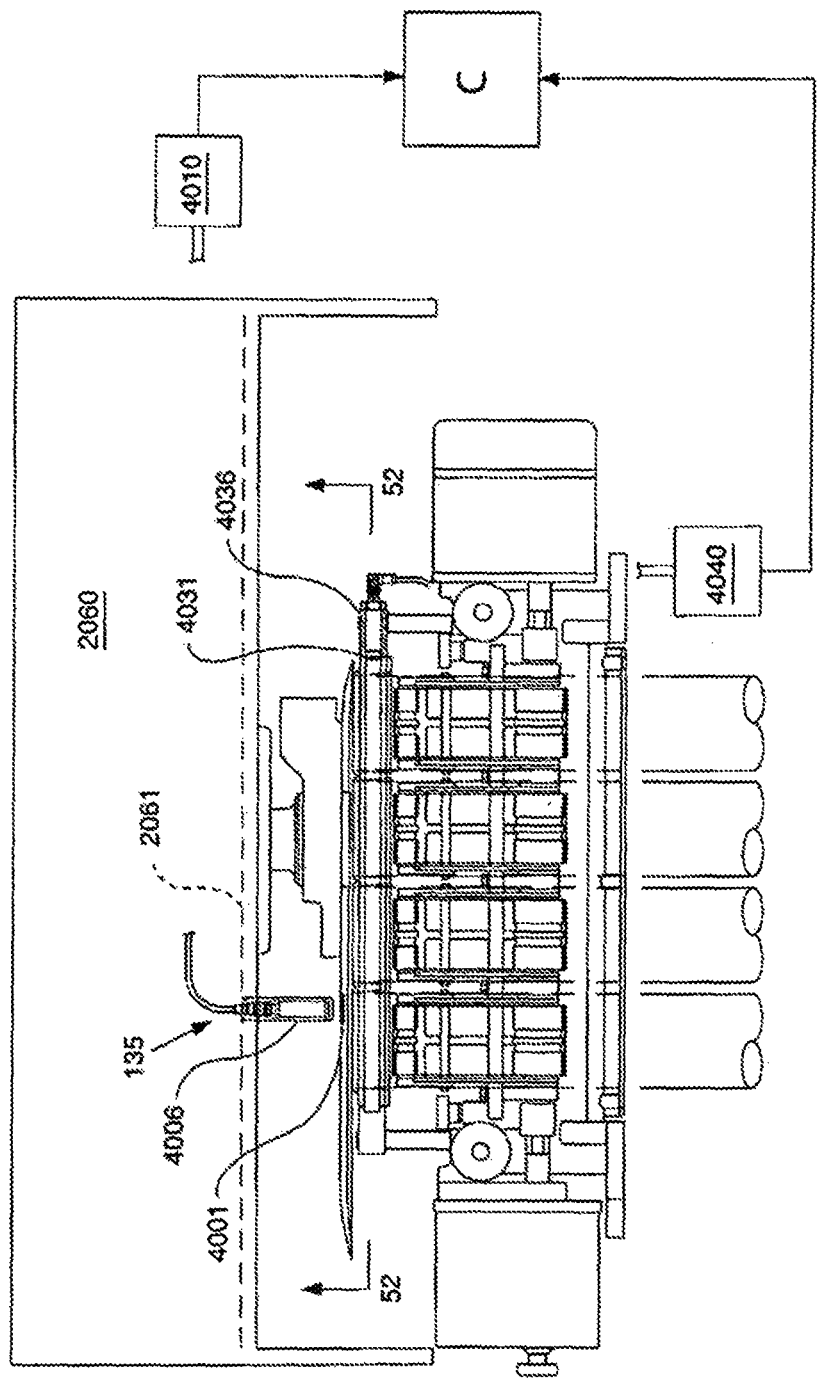
FIG. 51a is a diagrammatic plan view of a onboard information system according to one aspect of the invention.
Figure 52:
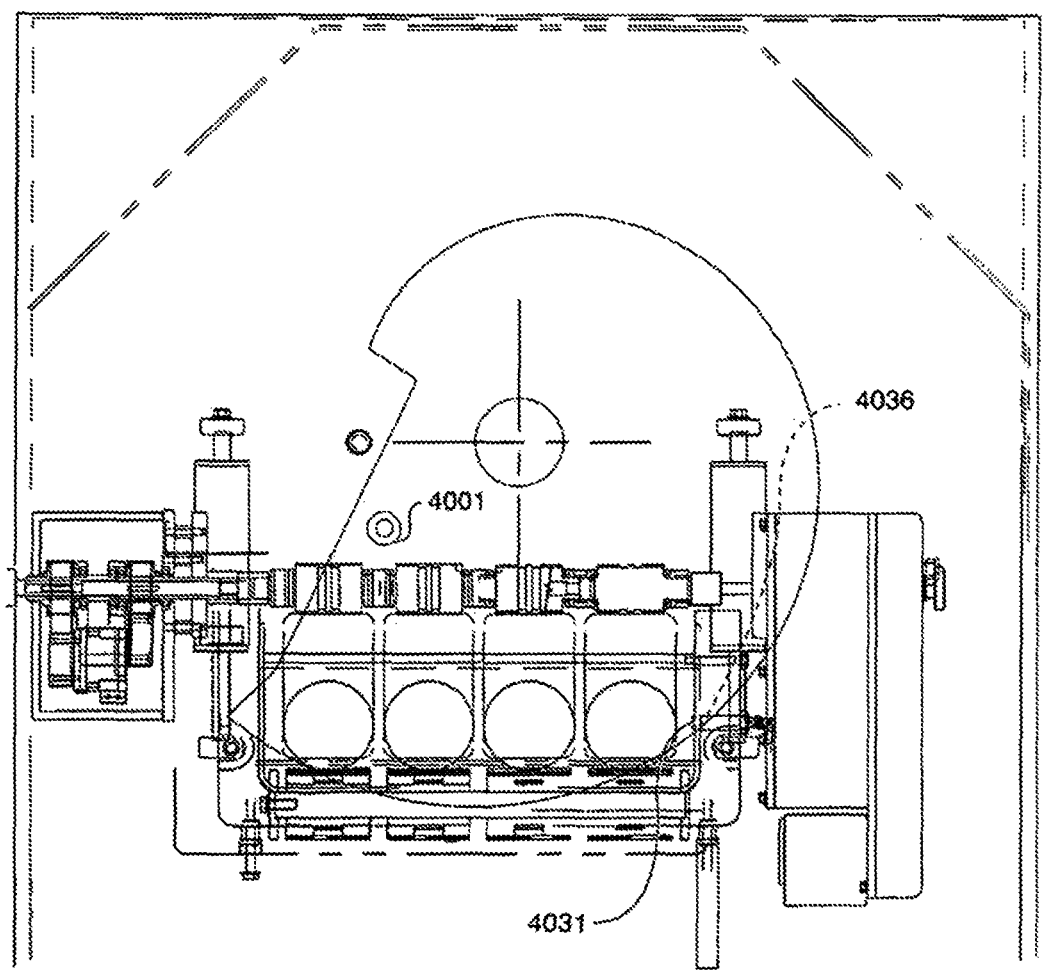
FIG. 52 is a diagrammatic sectional view of the onboard information system taken generally along line 52-52 of FIG. 51.

FIGS. 51 and 52 illustrate the system 135 comprises a data carrier 4001 embedded into the blade 2082 for storing data from which data can be read and to which data can be written, a read/write head 4006 mounted to the top wall 2061 of the housing 2060 that reads/writes data from/to the data carrier 4001, a controller or interface 4010 located within the housing 2060 or the base compartment 136 (shown schematically) communicating between the read/write head 4006 and machine control C. The data carriers are passive in that they do not have a battery. When the data carrier is within the range of the read/write head, power is transferred inductively and the data transfer initiated.

The data carrier 4001 can have stored thereon the type and size of blade, the time between re-sharpening, and the maximum speed allowable. This information will be communicated to machine control via the read/write head 4006 and the interface 4010. The machine control C can write onto the data carrier 4001, via the data interface 4010 and the read/write head 4006, how often this blade is used, how long the blade is in use, the number of revolutions, the average speed, etc.

The system 135 can also comprise a data carrier 4031 embedded into the shear support for storing data from which data can be read and to which data can be written, a read/write head 4036 mounted to the far side upstanding wall of the shear support frame that reads/writes data from/to the data carrier 4031, a controller or interface 4040 located within the base compartment 136 (shown schematically) and communicating between the read/write head 4036 and machine control C. The data carrier 4031 can have stored thereon the number of food articles to be sliced simultaneously, size of each food article, gripper quantity and size to be used, food article tray height required, and food article lift tray tooling required. This data will be used for informing the operator which gripper and food article tray tooling should be used. The data carrier 4031 can also have stored thereon the amount of degrees the blade will need to slice the product (useful for timing the start/stop feed of the product), and information needed to automatically adjust the food article tray height position.

This information will be communicated to machine control via the read/write head 4036 and the interface 4040.

The machine control C can write onto the data carrier 4031, via the data interface 4040 and the read/write head 4036, how often this shear bar is used, how long in use, number of pounds produced, etc.

Preferably, the data carrier 4001 is a BL IDENT model TW-R30-B128 and the data carrier 4031 is a BL IDENT model TW-R20-B128 from Turck Inc. of Minneapolis, Minn., US. The read write heads 4006, 4036 can be a model TB-M18-H1147 from Turck Inc. of Minneapolis, Minn., US. The interface 4010, 4040 can also be obtained from Turck Inc. of Minneapolis, Minn., US to be compatible with the read/write head and the particular machine control.

The system 135 can also be incorporated into the grippers and any other part where operation or maintenance information or instructions could be advantageously located.

Laser Safety Guard System

Figure 53:
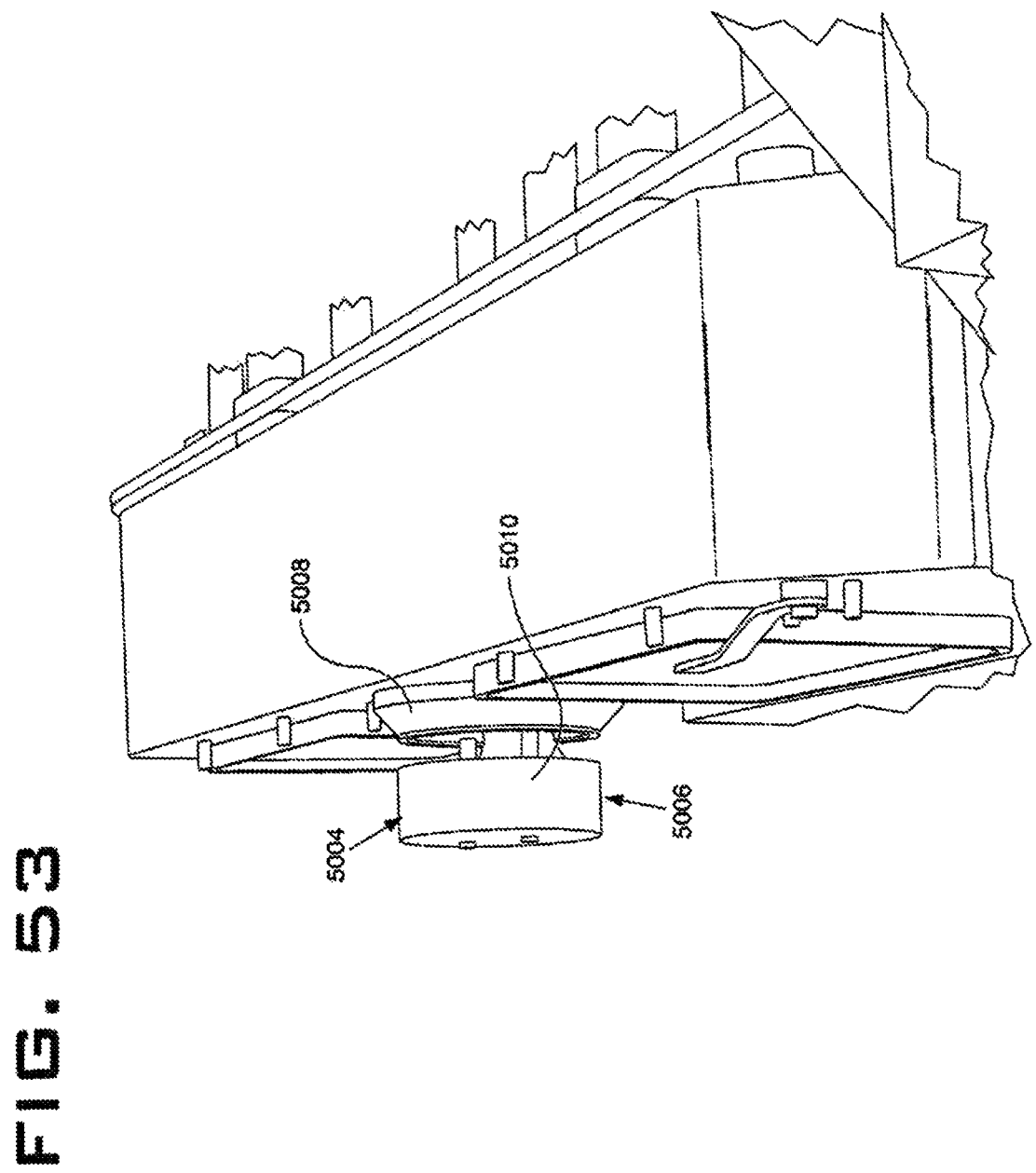
FIG. 53 is a far side perspective view of a laser guard system according to another aspect of the invention.
Figure 54:
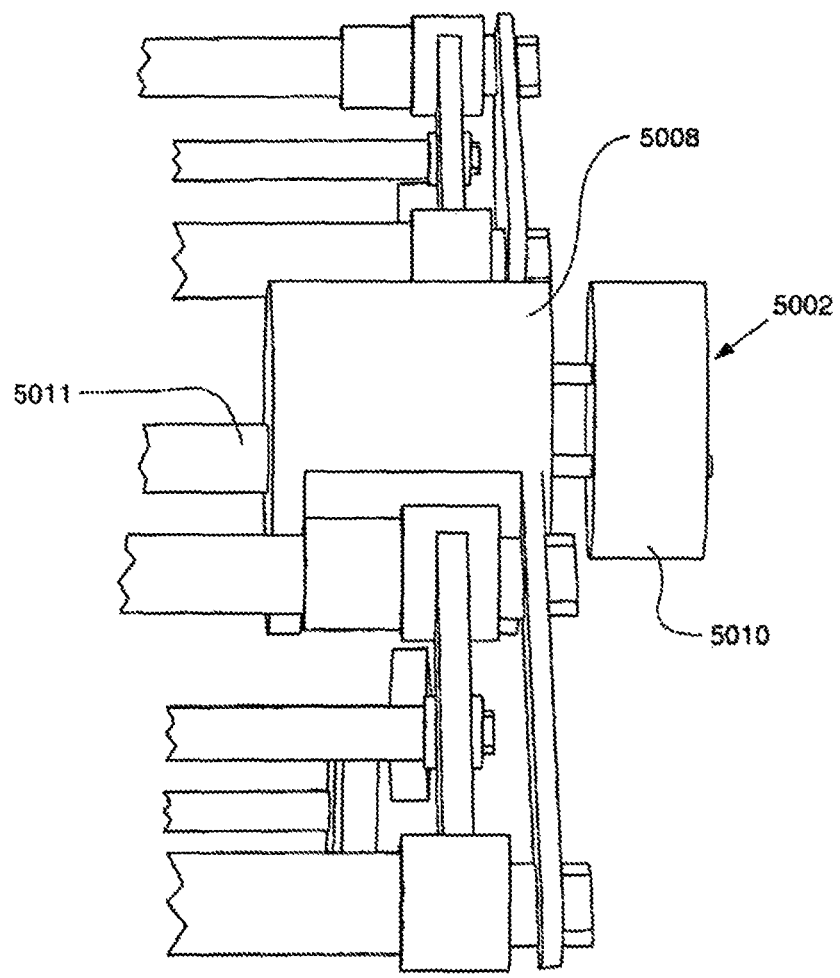
FIG. 54 is a near side perspective view of the laser guard system.
Figure 78:
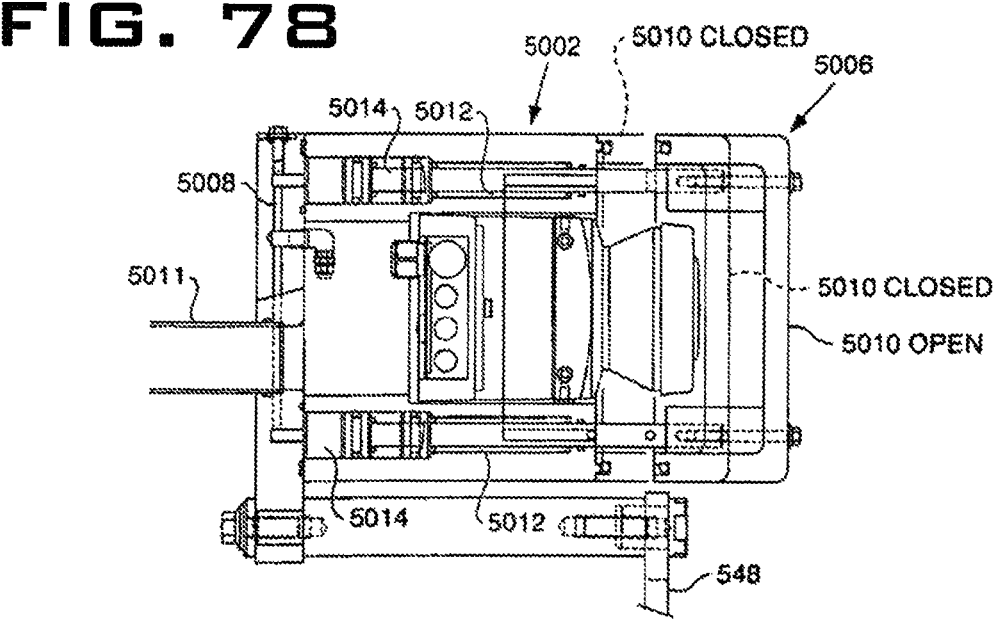
FIG. 78 is a sectional view taken generally along line 79-79 of FIG. 77.
Figure 79:
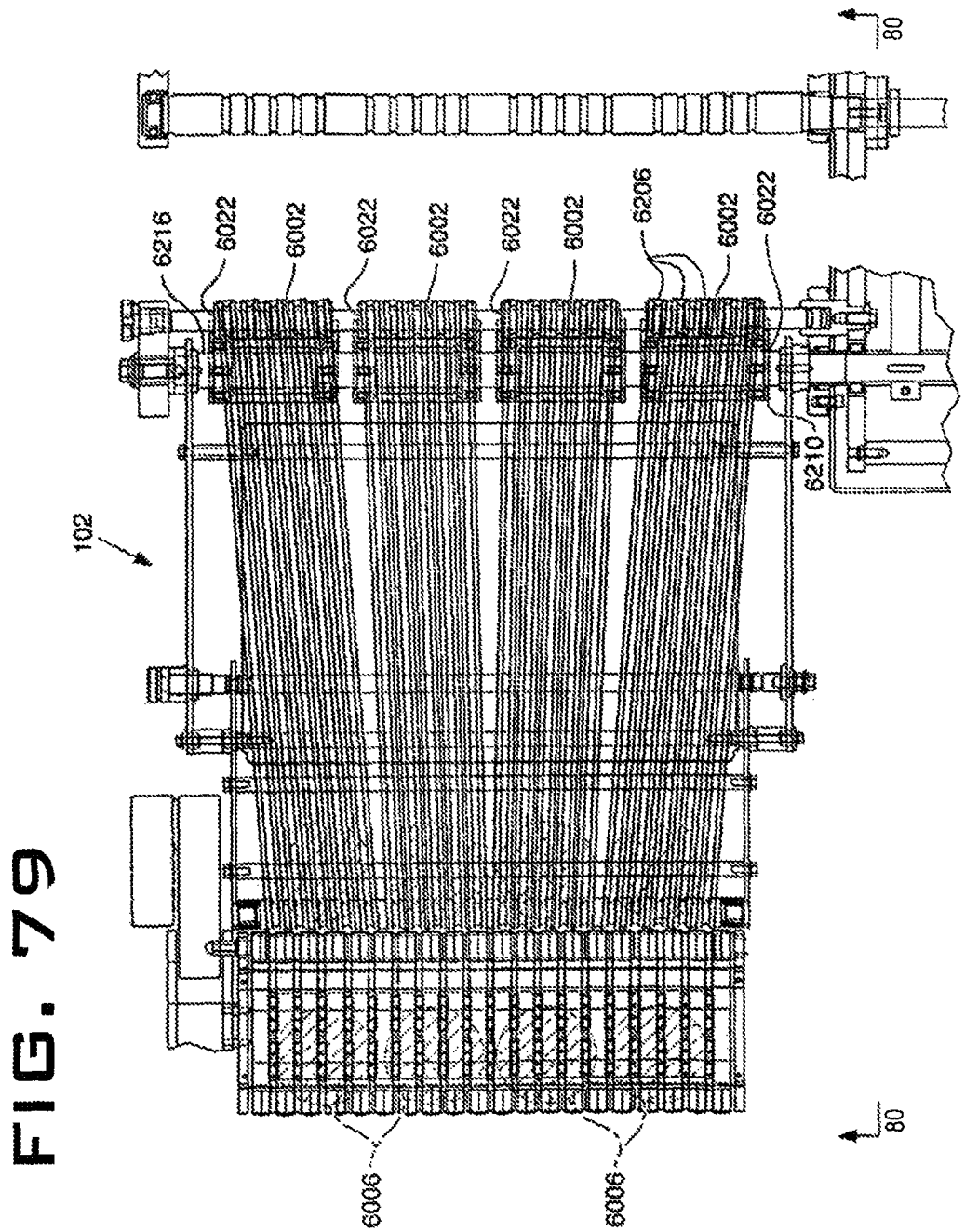
FIG. 79 is a plan view of a rear portion of the weighing classifying conveyor.
Figure 80:
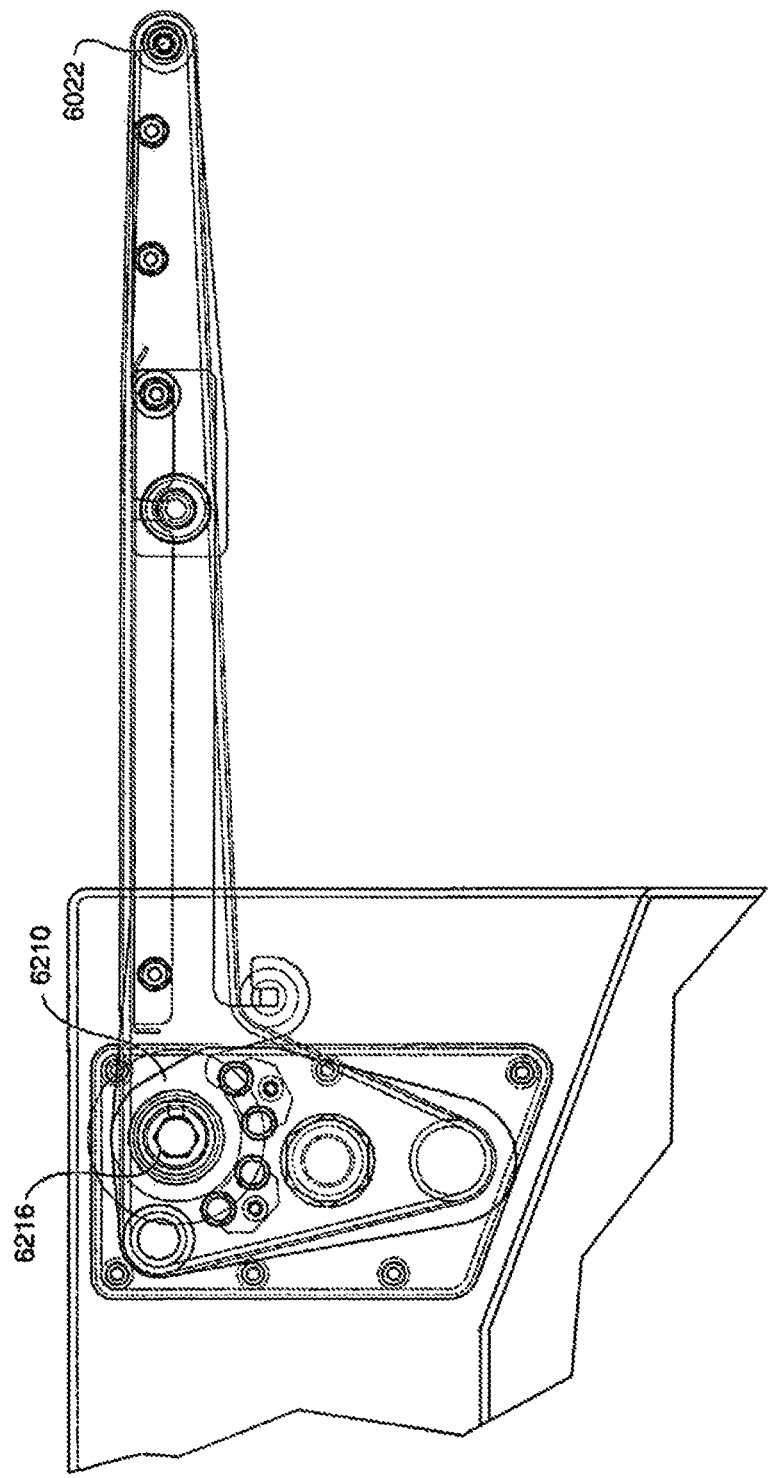
FIG. 80 is in elevation view taken generally along line 80-80 of FIG. 79.
Figures 81, 82:
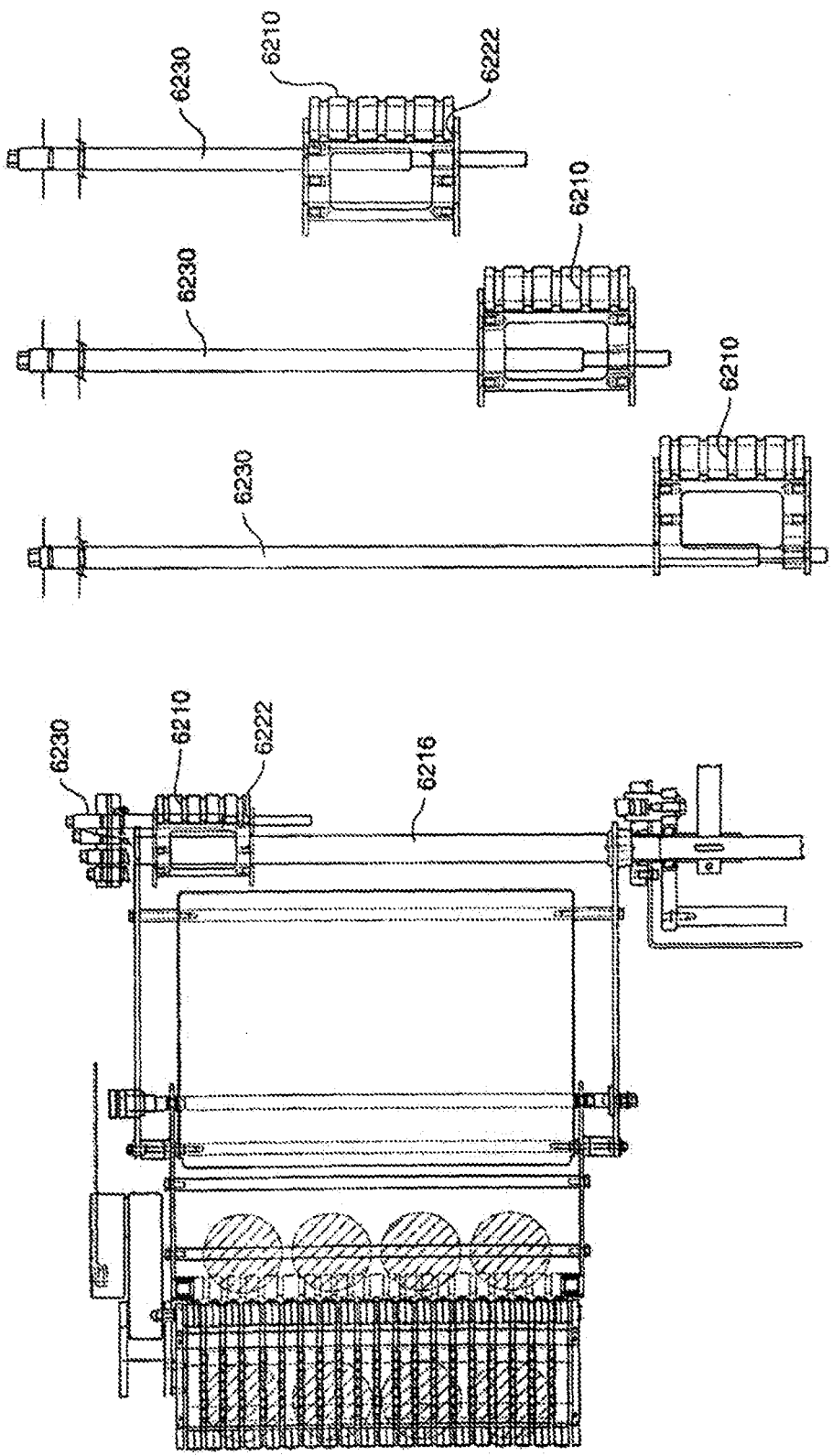
FIG. 81 is a plan view of the rear portion of the weighing and classifying conveyor of FIG. 79 with deceleration conveyor belts removed for clarity.
FIG. 82 is an exploded view of a portion of the deceleration conveyor taken from FIG. 81.

The laser safety guard system 123 is illustrated in FIGS. 53 and 54. The system comprises a near side laser sensor 5002 and a far side laser sensor 5004. Each sensor containing a laser emitter 5022 and a laser receiver 5026. Each sensor is protected in a housing 5006 that includes a base 5008 and an openable lid 5010. As shown in FIG. 78, springs 5012 are provided within the housing to urge the lid closed to the base 5008. Air cylinders 5014 are provided within the housing that, when supplied with pressurized air, opens the lid. Upon loss of electrical power, such as occurs during routine spray washing of the equipment, the lids are closed by force of the springs to seal the sensors within the housing to protect the sensors from spray wash and dirt.

The housing 5006 for far side sensor 5004 is mounted to the sweep mechanism housing 194 and the housing 5006 for the near side sensor 5002 is mounted to frame extension 548. As shown in FIG. 78, a conduit 5011 extends from the housing base 5008 of the near side sensor 5002 to the sweep mechanism housing 194. The conduit 5011 carries electrical cables and pressurized air to the sensor 5002.

Figure 77:
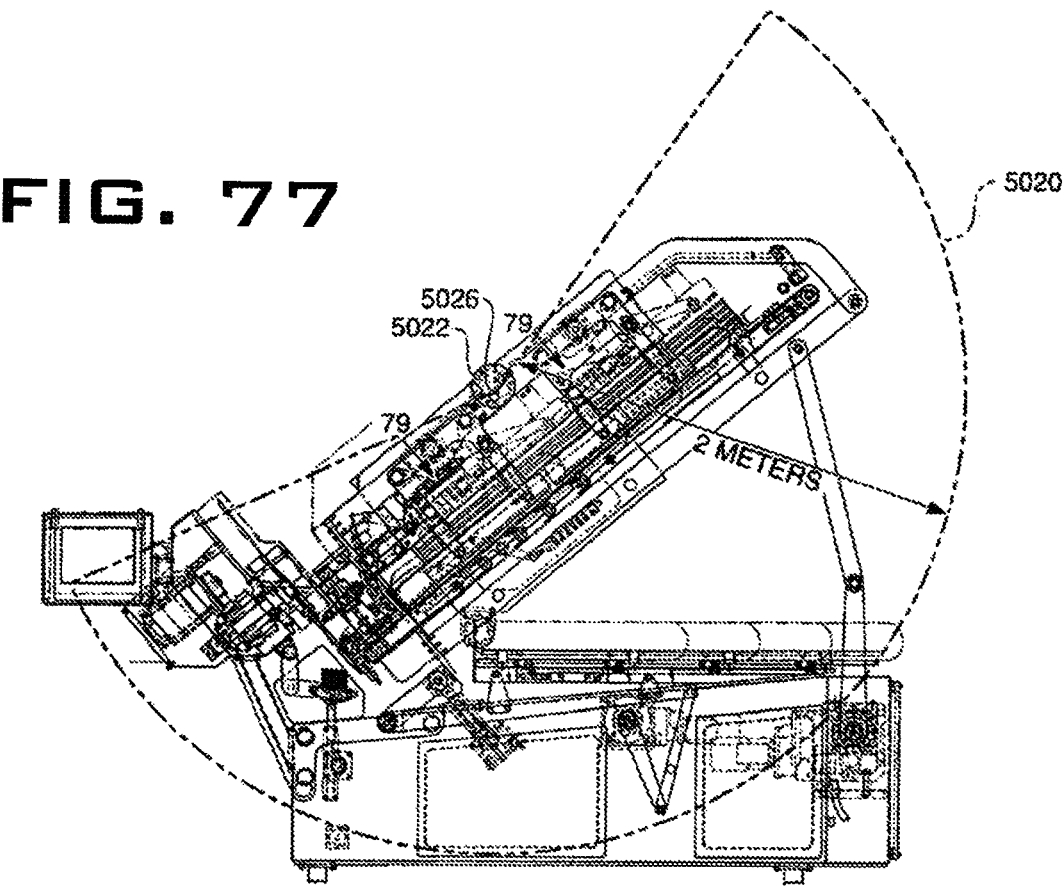
FIG. 77 is a near side elevational view of a laser guard system of the present invention.

With the lid open, a laser curtain 5020, as shown in FIG. 77, of infrared laser beams is projected down from a laser emitter 5022 about 2 meters in depth and with a sweep of about 270°. A laser receiver 5026 senses any interference in the curtain caused by an intrusion. The laser beam emitter/receiver works on the principle of time of flight measurement. The emitter sends out very short pulses of light. When the light is incident on an object, it is reflected back and received by the receiver. The sensor calculates the time between sending the pulse and receiving the reflection to calculate the distance of the object.

The interference is communicated from the sensor to machine control C. Upon sensing the intrusion, a corresponding operating mechanism of the apparatus is halted. For example, if the lift tray is being lifted and an operator puts his hand through the laser curtain, the machine control halts movement of the lift tray mechanism. The laser curtains protect personnel on both the far side and near side of the apparatus 100.

The sensors 5002, 5004 are preferably model S300 SAFETY LASER SCANNER available from Sick AG of Germany.

Weighing and Classifying Conveyor

The weighing and classifying conveyor or output conveyor 102 is illustrated if FIGS. 55-60B and 79-81. The conveyor 102 includes four lanes for receiving up to four product groups in a row from the jump conveyor 3064. Each lane includes an input or deceleration conveyor 6002, a weighing scale conveyor 6006, and a classifying conveyor 6008.

The deceleration conveyor 6002 is pivotal about an axis 6012 under force from a lever 6014 that is moved by a linear actuator, such as a servomotor screw drive 6016. The deceleration conveyor 6002 is controllably pivotal to match the changing elevation of the jump conveyor 3064. Each conveyor 6002 comprises a belt 6020 that circulates around idle rollers 6022, 6024 and a drive roller 6028, and against roller 6029. The drive roller 6028 is driven by a drive belt 6034 driven by a servomotor 6036. All four lanes are driven together by a single motor.

Each weighing conveyor 6006 includes a removable carrying unit 6006a and a drive unit 6006b. The carrying unit 6006a includes a belt 6050 that circulates around two rollers 6054, 6058. The roller 6058 includes a driven gear 6060 that is enmesh with a drive gear 6064. The drive gear 6064 is part of a drive unit 6006b. The drive gear is mounted on axle 6066 that is mounted for rotation to side frame members 6070, 6072 of the drive unit 6006b. The axle 6066 is driven by a belt 6078 that is circulated by a servomotor 6080. The side frame members 6070, 6072 are connected to a transverse member 6082 that is fastened to a load cell 6086.

The load cell can be as described in U.S. patent application Ser. No. 11/454,143 filed on Jun. 15, 2006, herein incorporated by reference. The four load cells 6086 are preferably viscous damped load cells for vibration resistance.

Figure 56:
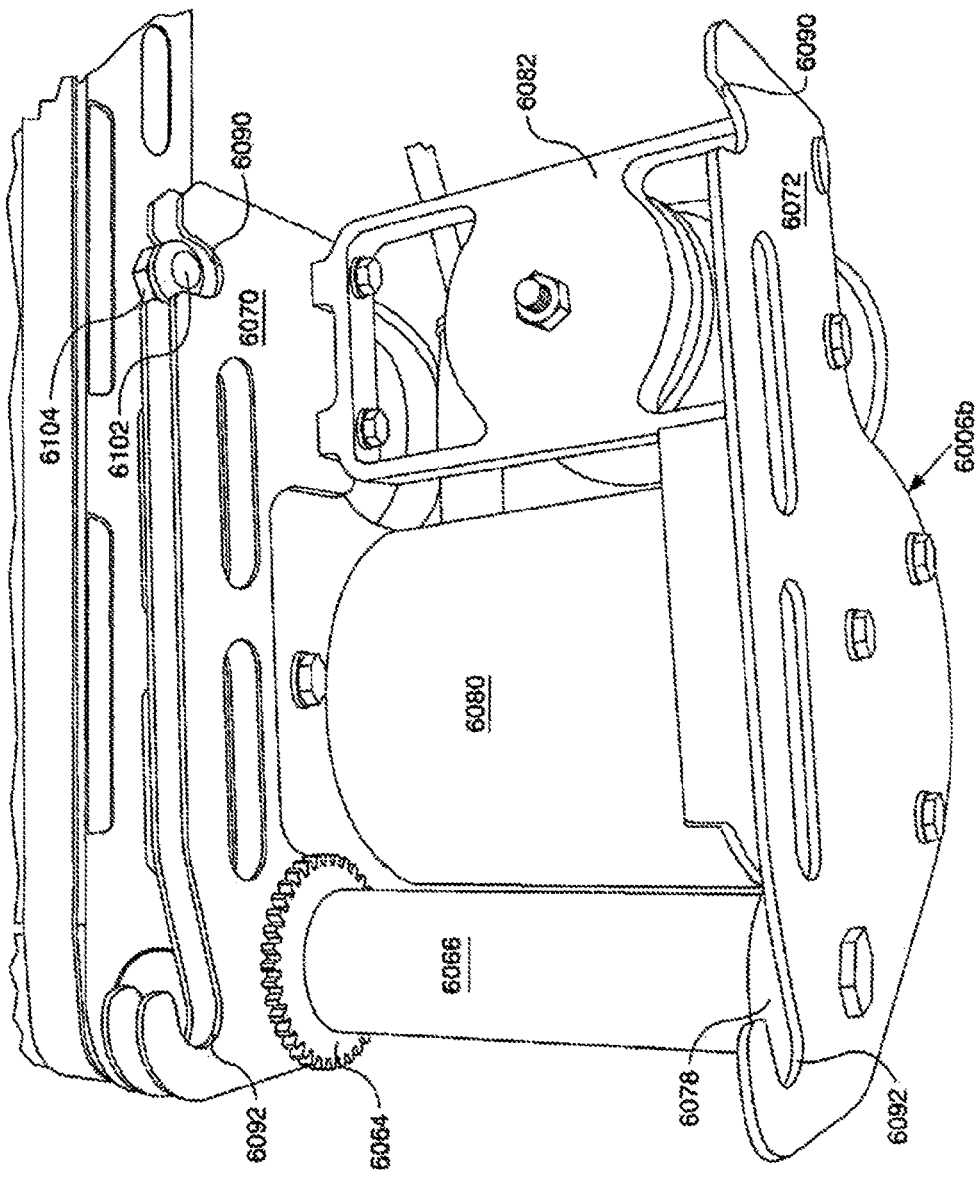
FIG. 56 is a perspective view of a portion of a weighing conveyor with the conveyor belt and rollers removed.
Figure 57:
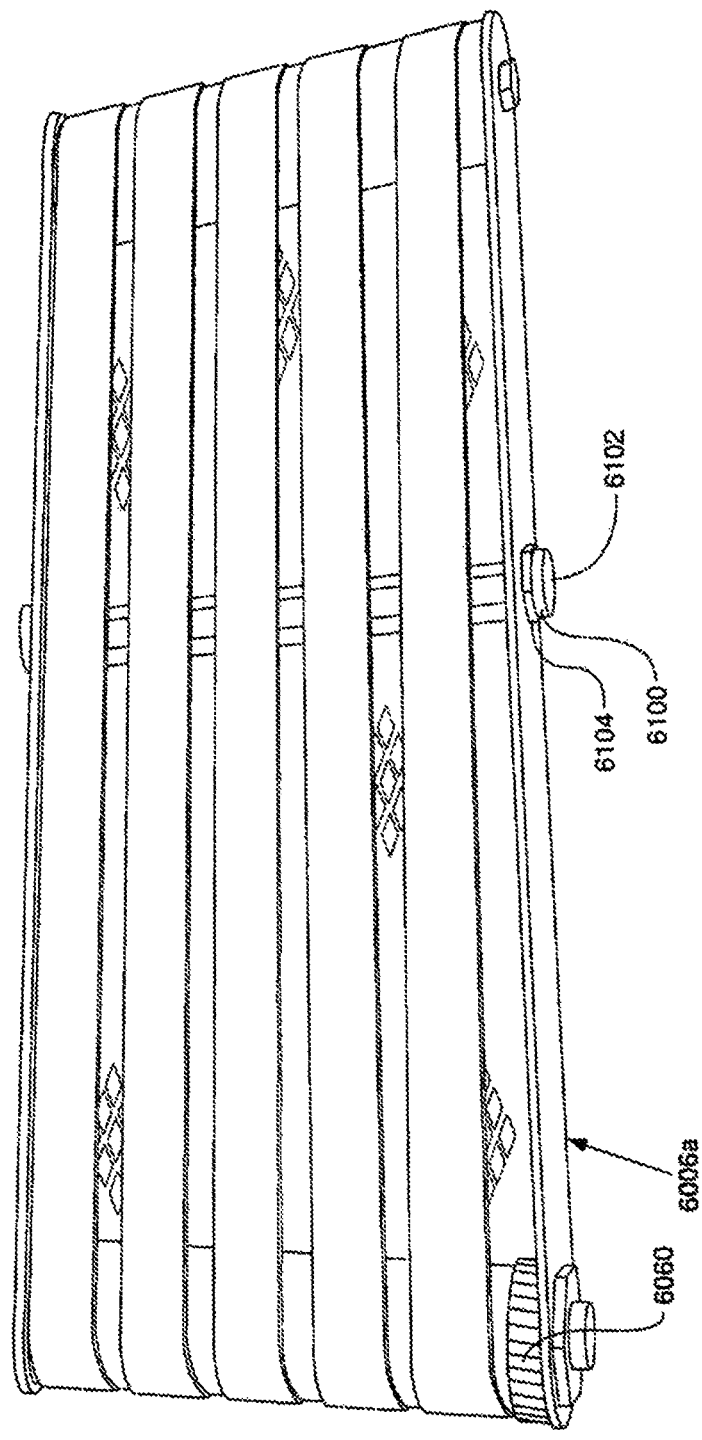
FIG. 57 is a bottom view of a weighing conveyor belt with frame and rollers removed from the weighing conveyor shown in FIG. 56.
Figure 58:
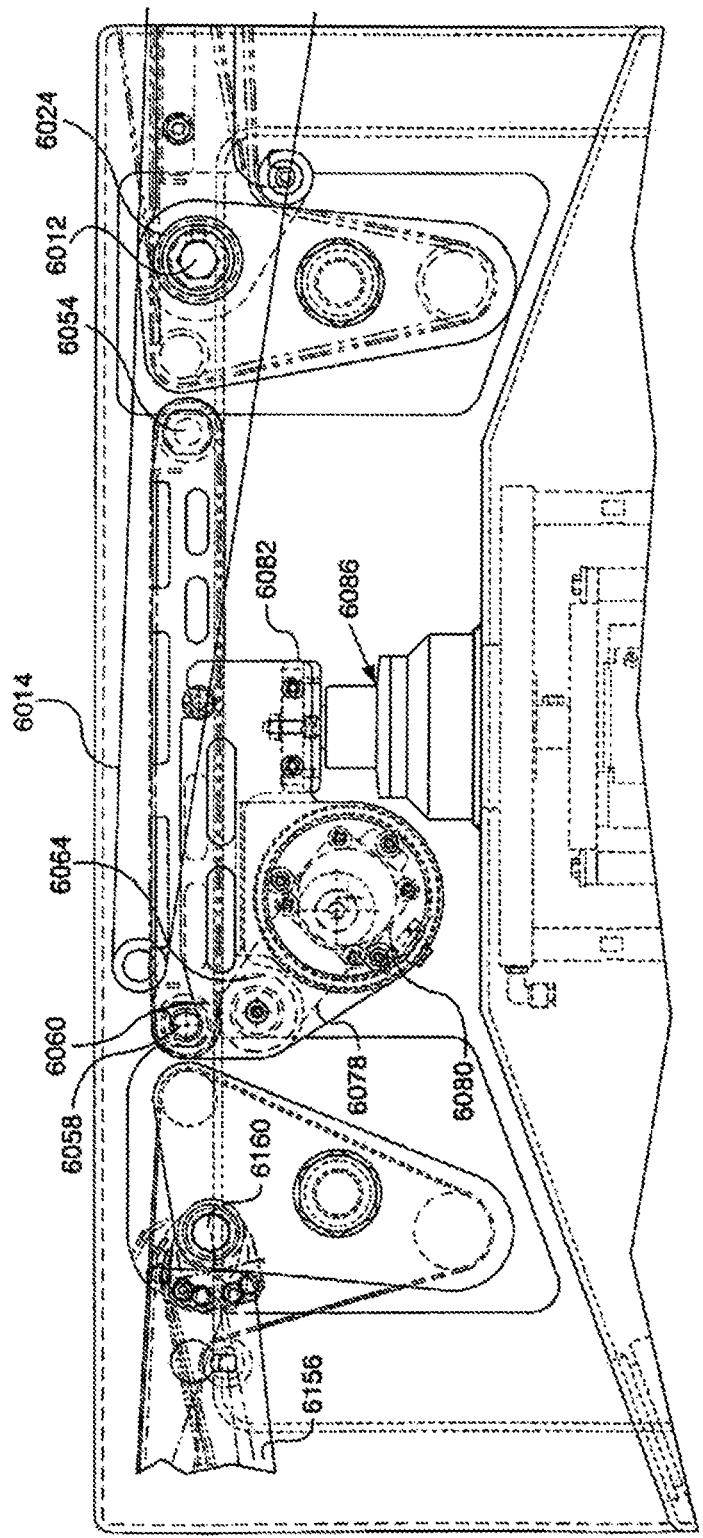
FIG. 58 is an enlarged elevational view of a portion of the weighing and classifying conveyor.

The removable carrying unit 6006a is easily separated from the side frame members 6070, 6072 of the drive unit 6006b for cleaning as demonstrated in FIGS. 56 and 57. Each side frame member 6070, 6072 includes two slots 6090, 6092 that each receive a stub axle 6100 of the conveyor and the side frame members are captured between a cap 6102 of the stub axle and a base 6104 of the stub axle.

The four scale conveyors, one in each lane, are driven independently by four motors 6080 as described.

The classifier conveyor 6008 includes four conveyors 6138a, 6138b, 6138c, 6138d. Each conveyor, such as 6138a, includes a conveyor belt 6140 that is circulated around idle rollers 6142, 6144 and drive roller 6146 and against roller 6148. The drive roller 6146 is driven in rotation by a belt 6150 driven by a servomotor 6152. All four conveyor belts 6140 are driven by the common servomotor 6152. Each conveyor, such as 6138a, includes pivotal frame member 6156 that is pivotal about an axis 6160. A linear actuator, such as a pneumatic cylinder 6164 is actuatable to pivot up or down the pivotal frame member 6156. The pivotal frame member carries the roller 6142 so pivoting of the frame member 6156 pivots the conveyor belt 6140 as well. Each conveyor 6138a, 6138b, 6138c, 6138d is individually pivotable by corresponding pneumatic cylinders 6164.

The conveyors 6138a, 6138b, 6138c, 6138c are pivotal from a down tilted angle position "A" corresponding to delivering off weight product to an off-weight conveyor (not shown), to a horizontal position "B" which is for on weight, acceptable product, and to a cleanup position "C". The cleanup position "C" is important in order to avoid interference with a downstream conveyor (not shown) when the weighing and classifying conveyor 102 is translated out to the cleanup position of FIG. 59.

Figure 59:
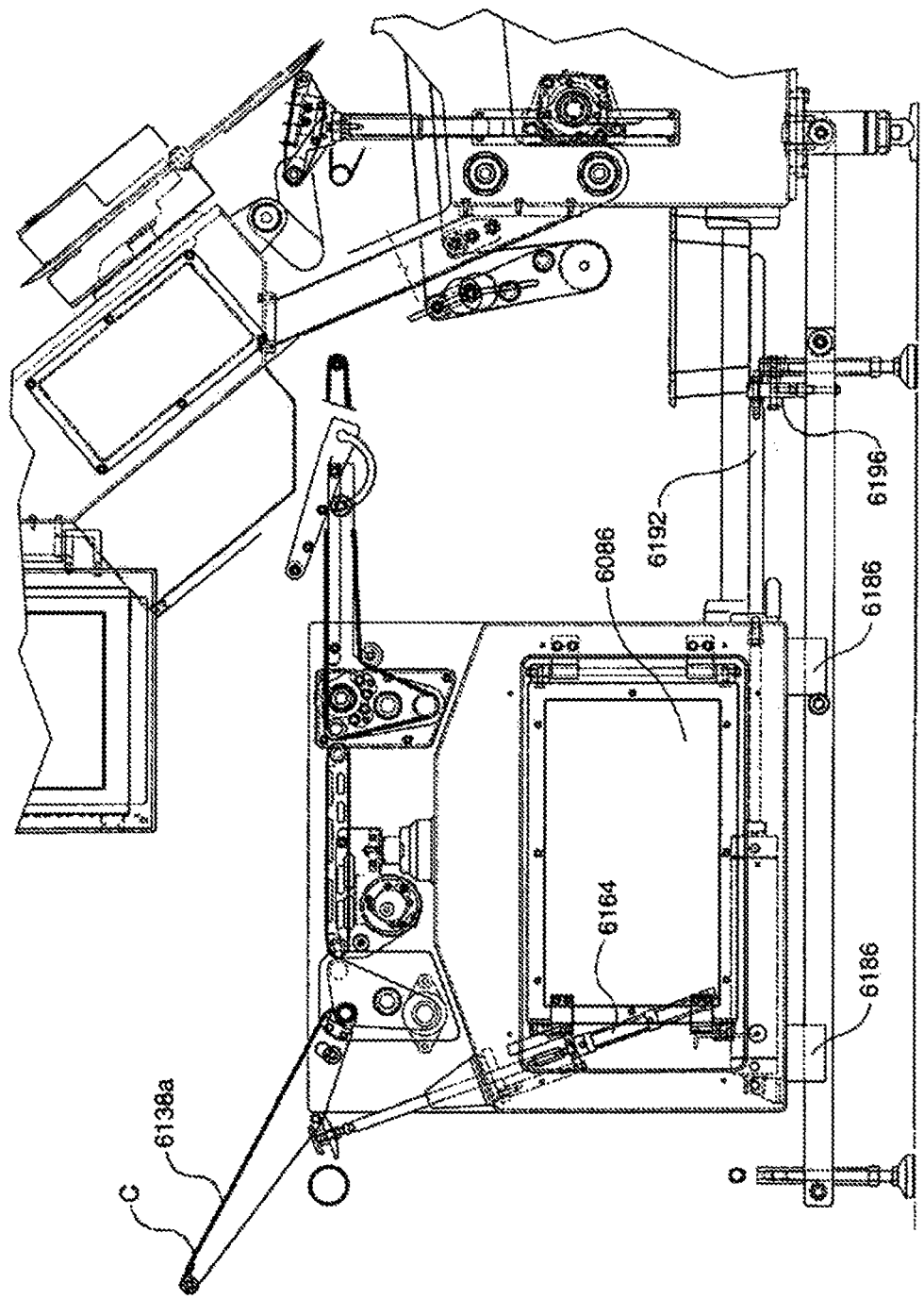
FIG. 59 is a near side elevation view of the weighing and classifying conveyor shown in a clean-up position.
Figure 60:
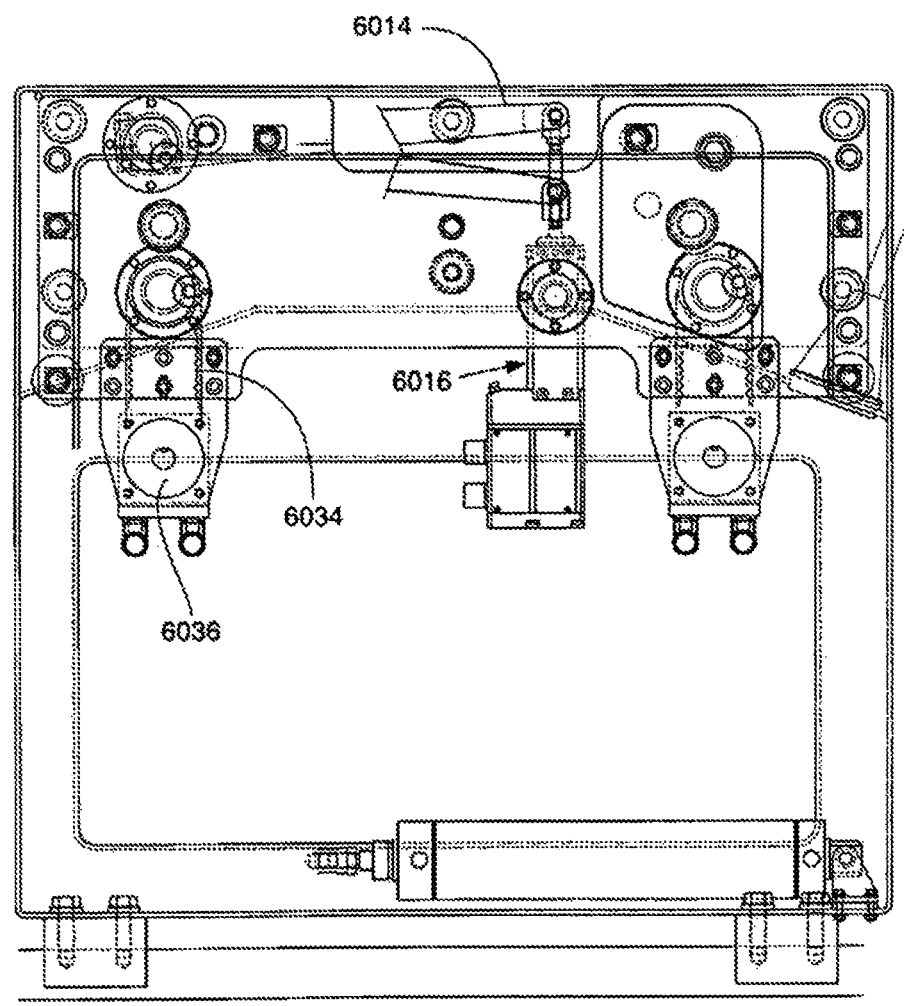
FIG. 60 is a far side elevational view of the weighing and classifying conveyor.
Figure 60A:
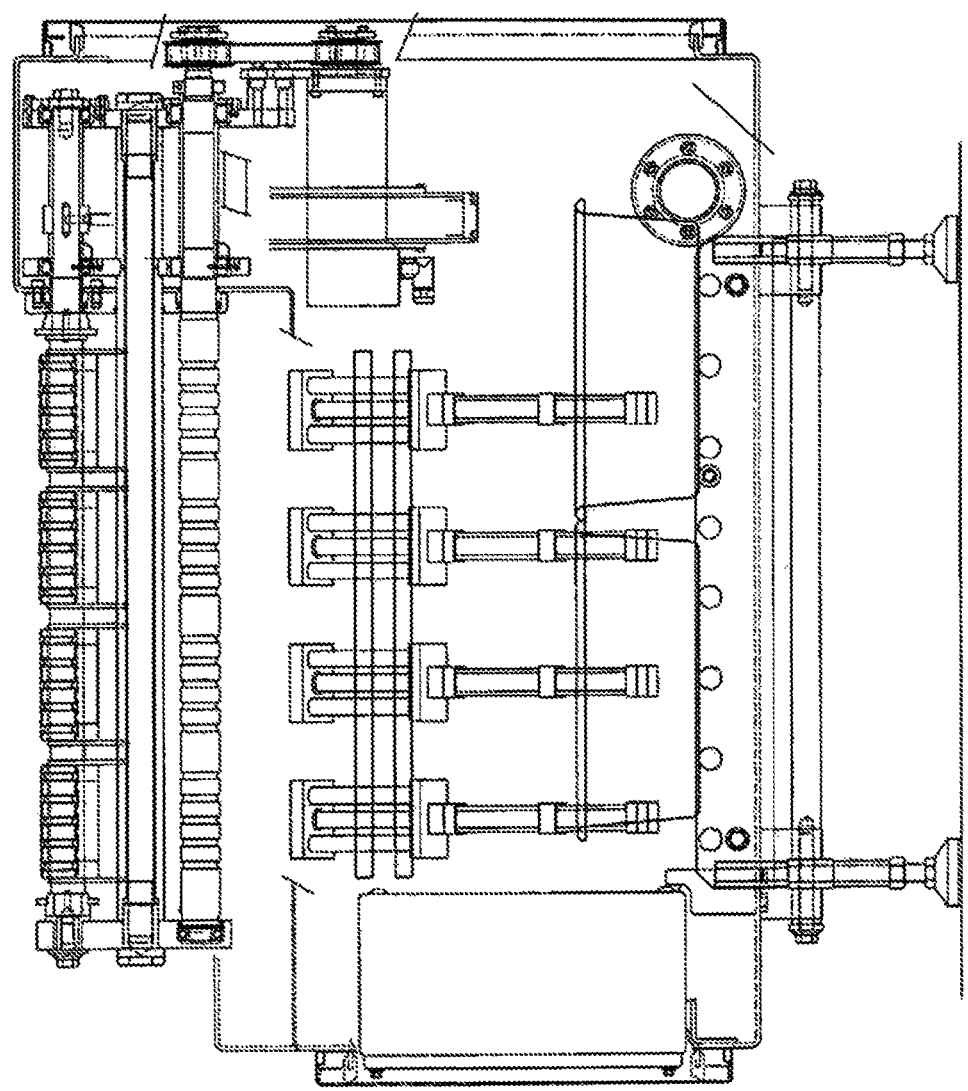
FIG. 60A is an end view of the weighing and classifying conveyor showing underlying components.
Figure 60B:
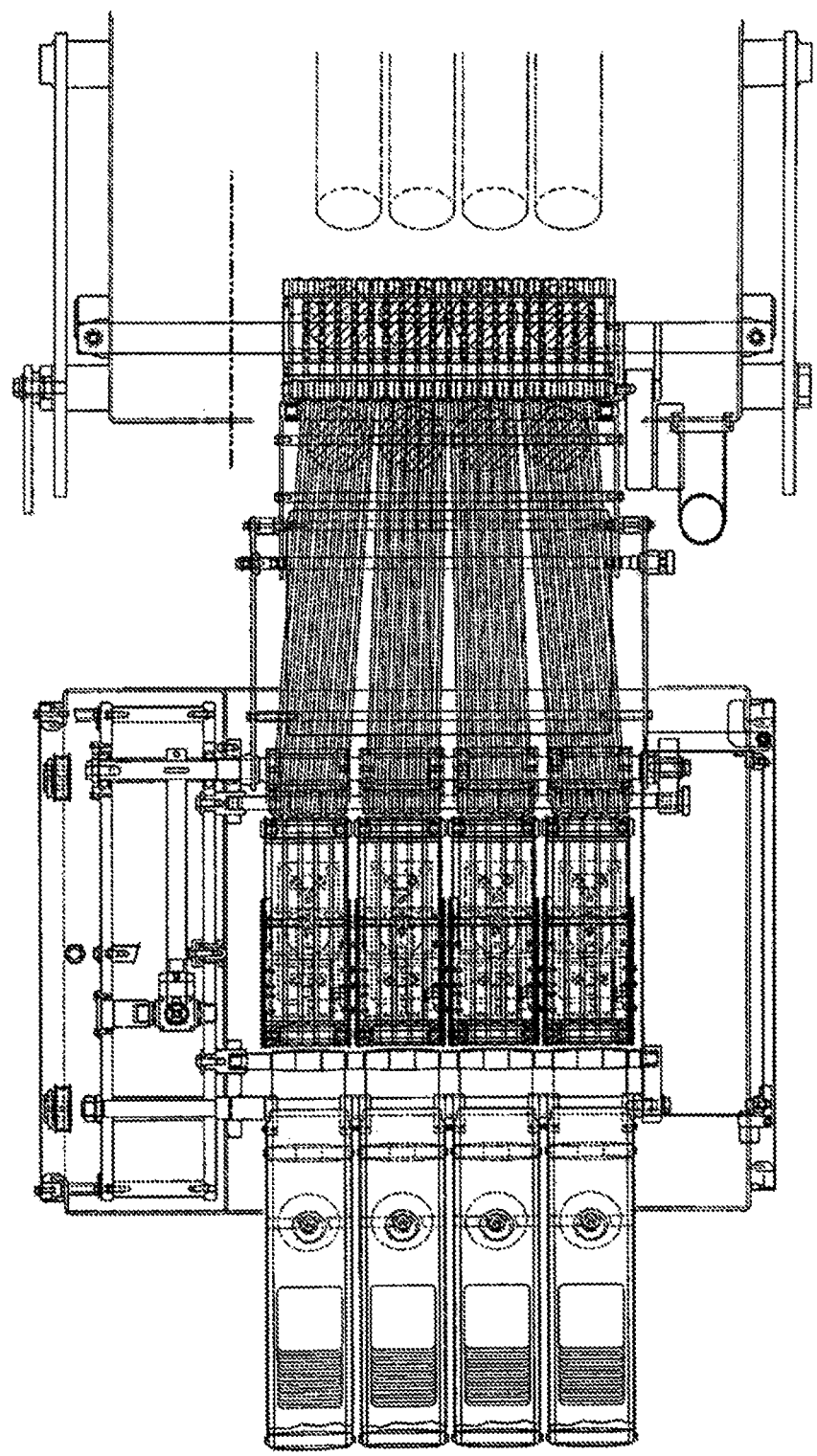
FIG. 60B is a plan view of the weighing and classifying conveyor.
Figure 61:
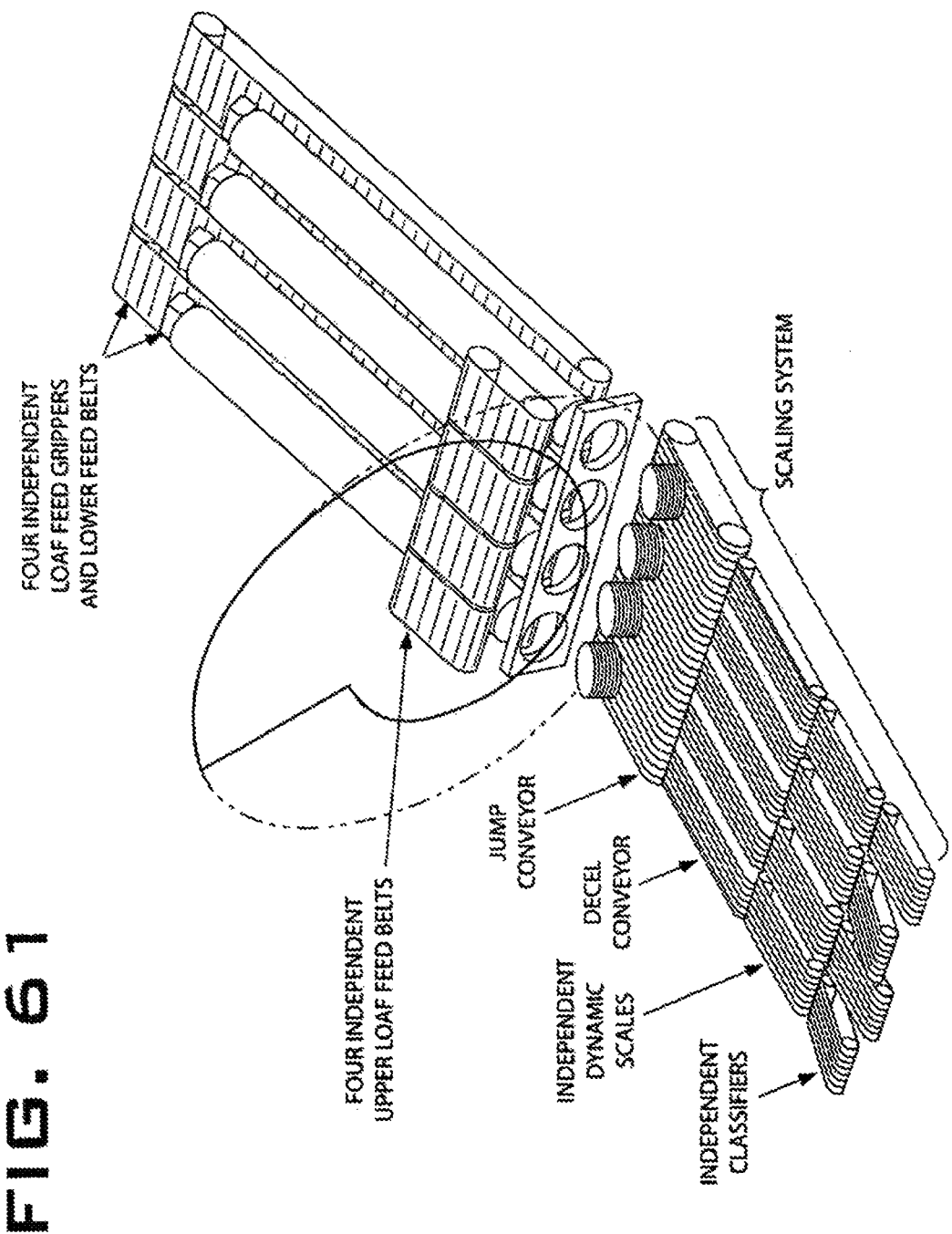
FIG. 61 is a schematic representation of the combination of FIG. 1 showing a four food article set up.
Figure 62:
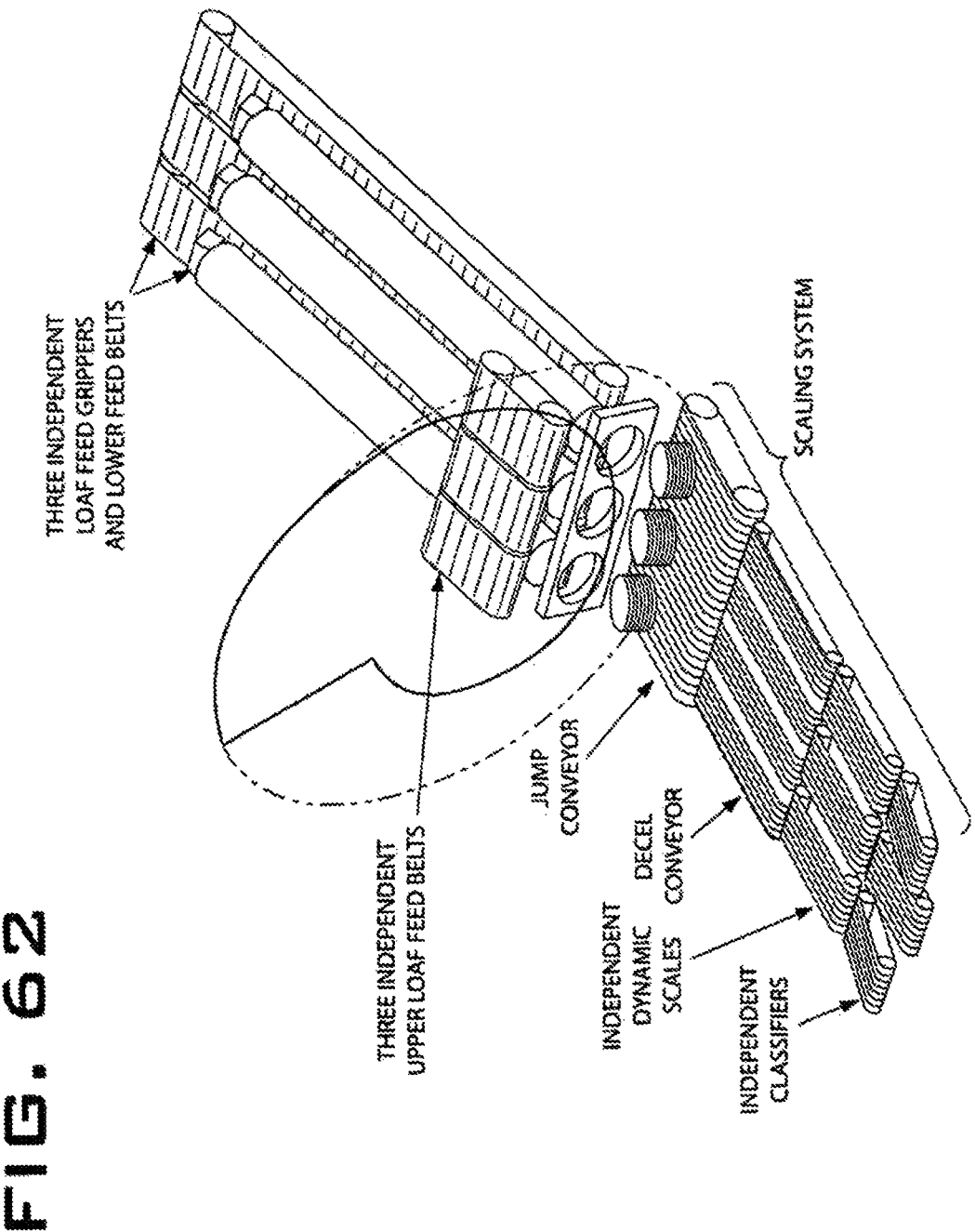
FIG. 62 is a schematic representation of the combination of FIG. 1 showing a three food article set up.
Figure 63:
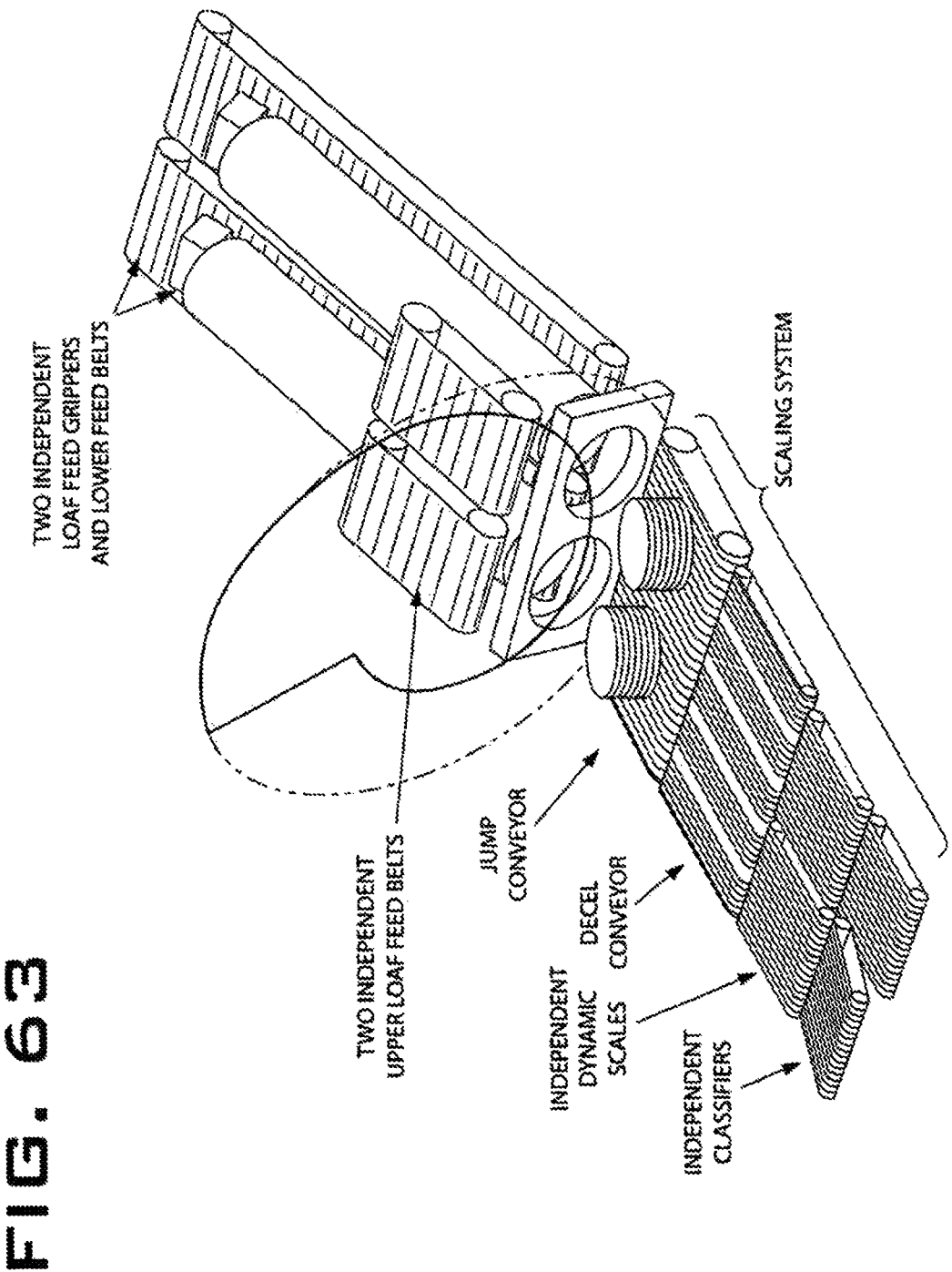
FIG. 63 is a schematic representation of the combination of FIG. 1 showing a two food article set up.

The weighing and classifying conveyor 102 is supported on a pair of rails 6180, 6182 that are connected to be bottom wall 140 of the base section 104 of the apparatus 100. The conveyor 102 is fastened to four slide bearings 6186 that slide on the rails 6180, 6182. A linear actuator or pneumatic cylinder 6190 is fastened to the conveyor housing and includes a rod 6192 that extends rearward through the housing and is fastened to a stop 6196 provided on the rails between the conveyor 102 and the apparatus 100. When the rod 6192 is forced by air pressure delivered into the cylinder to extend, the conveyor 102 slides away from the apparatus 100 to a clean up position as shown in FIG. 59. While a pneumatic cylinder is shown, any other means to move the conveyor away from the apparatus, including a motor, a screw drive, or human force, could be used in place of the pneumatic cylinder.

FIGS. 79-82 illustrate a position adjustment feature of the weighing and classifying conveyor 102. Each of the belts 6020 of the four deceleration conveyors 6002 comprises a plurality of belts elements 6206 that encircled the rollers 6022, 6024, and drive roller 6028. The rollers 6022 are each carried on a slidable carriage 6210. The slidable carriages 6210 are slidable along a support tube 6216. Each carriage 6210 has a threaded hole 6222 that receives a single threaded adjustment rod 6230 that is fixed to a frame of the conveyor but allowed to rotate. Each carriage 6210 has a dedicated single adjustment rod 6230 for moment all that dedicated carriage 6210. The rod 6230 allows fine positioning of the ends of the four deceleration conveyors 6002. This is particularly advantageous to ensure that slices delivered from the deceleration conveyors 6002 are perfectly centered when passing across the weighing conveyors 6006 for accurate weighing. Depending on conditions, the product slice from the food articles may not land precisely on the jump conveyor 3064 so that this adjustment is advantageous. Although a manual adjustment is described, it is readily understood that an automatic adjustment such as with a linear actuator, servomotor or servo screw drive could be used as well.

The conveyor 6002 comprises a belt 6020 that circulates around idle rollers 6022, 6024 and a drive roller 6028, and against roller 6029. The drive roller 6028 is driven by a drive belt 6034 driven by a servomotor 6036. All four lanes are driven together by a single motor.

Adjustable Conduit Connections

Because various compartments within the combination 100/102 must be compatible with the moving with respect to other compartments, accommodations must be made for differential movement and rotation with regard to conduits for signal and power cables and pneumatic tubing. A conduit 8000 shown in FIG. 5 is provided with a telescopic slide joint 8002 and upper rotary joint 8004 and a lower rotary joint 8006 to accommodate the relative pivoting motion between the food article feed drive compartment 196 and the base compartment 136. A conduit 8010 between the weighing and classifying conveyor 102 and the base compartment 136 requires a sliding joint 8012 wherein some excess conduit length is provided within the weighing and classifying conveyor 102.

Servomotors

The servomotors used within the combination apparatus 100/102 are air cooled except for the servomotor 2098 which is preferably water cooled. All the servomotors and other actuators are precisely controlled for movement and position by the machine control, so that conveyor movements, lift tray movements, sweep movements, elevation adjusting movements, food article end removal apparatus movements, food article feed movements, blade movements, clean up position movements, etc. are all coordinated for optimal machine performance.

The invention claimed is:

1. A food article slicing machine, comprising:
a slicing station comprising a knife blade and a knife blade drive driving the blade in a cutting plane;
a machine base that includes panels that encloses electronic equipment and includes a base top panel;
a food article feed apparatus supporting one or more food articles for longitudinal movement along one or more corresponding food article paths intersecting the cutting plane, wherein the food article feed apparatus is moveable between a raised position, in which the one or more food article paths have an inclined orientation with an elevated end raised above the machine base and a lower end adjacent to the cutting plane, and a lowered position, in which the elevated end is lower than when in the raised position;
a light beam emitting device connected to and moveable with the food article feed apparatus, wherein the light beam emitting device generates a safety curtain by a sweep of light beams across an arc, the safety curtain of light beams oriented to substantially cover a vertical space between the food article paths and the machine base with the food article feed apparatus in both the raised position and the lowered position on at least one lateral side of the machine;
a sensor connected to and moveable with the food article feed apparatus, wherein the sensor is responsive to intrusions by an object into the safety curtain,
wherein when a light beam is incident on the object, the light beam is reflected back and received by the sensor, and the sensor calculates the time between sending the light beam and receiving the reflection to calculate the distance of the object to determine the presence of an intrusion; and
a housing for protecting said emitting device and said sensor, and wherein said emitting device and said sensor are positioned inside the housing;
said housing having an open position, in which said emitting device and said sensor are exposed to environment external of the housing, a closed position, in which said emitting device and said sensor are enclosed within the housing and lack exposure to the environment external of the housing, and a device for urging said housing to said closed position, and an opening mechanism for overcoming said device for urging said housing.

2. The food article slicing machine of claim 1, wherein said sensor communicates an intrusion condition to a slicing machine control when said sensor detects an intrusion into said safety curtain.

3. The food article slicing machine of claim 1, comprising a machine control, and wherein the sensor communicates an intrusion condition to the machine control when said sensor detects an intrusion into the safety curtain, the machine control configured to stop the operation of the machine based on the intrusion condition.

4. The food article slicing machine of claim 1, wherein the sensor is configured to detect an intrusion into the food article feed apparatus area of the machine.

5. A food article slicing machine, comprising:
a slicing station comprising a knife blade and a knife blade drive driving the blade in a cutting plane;
a machine base that includes panels that encloses electronic equipment and includes a base top panel;
a food article feed apparatus supporting one or more food articles for longitudinal movement along one or more corresponding food article paths intersecting the cutting plane, the one or more food article paths having an inclined orientation with an elevated end raised above the machine base and a lower end adjacent to the cutting plane;
a light beam emitting device that generates a safety curtain by a sweep of light beams across an arc, the safety curtain of light beams oriented to substantially cover the vertical space between the food article paths and the machine base on at least one lateral side of the machine;
a sensor responsive to intrusions by an object into the curtain,
wherein when a light beam is incident on the object, the light beam is reflected back and received by the sensor, and the sensor calculates the time between sending the light beam and receiving the reflection to calculate the distance of the object to determine the presence of an intrusion; and a housing for protecting said emitting device and said sensor, and wherein said emitting device and said sensor are positioned inside the housing;

said housing having an open position, in which said emitting device and said sensor are exposed to environment external of the housing, a closed position, in which said emitting device and said sensor are enclosed within the housing and lack exposure to the environment external of the housing, and a device for urging said housing to said closed position, and an opening mechanism for overcoming said device for urging said housing.

6. The food article slicing machine of claim 5, wherein the device for urging said housing is a spring.

7. The food article slicing machine of claim 6, wherein the opening mechanism is an air cylinder for overcoming said spring.

8. The food article slicing machine of claim 5, wherein the opening mechanism positions the housing in the open position with electrical power provided to the food article slicing machine, and wherein upon loss of electrical power to the food article slicing machine the device for urging urges said housing to the closed position.

9. A food article slicing machine, comprising:
a slicing station comprising a knife blade and a knife blade drive driving the blade in a cutting plane;
a food article feed apparatus supported from a machine base and supporting one or more food articles for longitudinal movement along corresponding food article paths intersecting the cutting plane, an end of the food article feed apparatus remote from the cutting plane being elevated above the machine base,
a first side safety sensor that emits a first sweep of light beams across an arc to detect an external, laterally directed intrusion on a first longitudinal lateral side of the machine and a second side safety sensor that emits a second sweep of light beams across an arc to detect an external, laterally directed intrusion on an opposite second longitudinal lateral side of the machine, wherein the first and second side safety sensors are elevated and direct the first and second sweeps of light beams downwardly between the food article feed apparatus and the machine base;
wherein each of said first and second safety sensors comprises a light beam emitter and a light beam receiver mounted in a common housing that operate together to calculate distances of objects that are impinged by light beams emitted by the emitter on a time-of-flight basis to detect said respective external, laterally directed intrusions;
wherein the first sweep of light beams of the first side safety sensor is substantially parallel to the food article paths; and
a housing for protecting the first side safety sensor, and wherein the first side safety sensor is positioned inside the housing, wherein said housing has an open position, in which said first side safety sensor is exposed to environment external of the housing, a closed position, in which, said first side sensor is enclosed within the housing and lacks exposure to the environment external of the housing, and a device for urging said housing to said closed position, and an opening mechanism for overcoming said device for urging said housing.

10. The food article slicing machine of claim 9, wherein each said sweep of light beams forms a safety curtain that has a longitudinal length, each emitter broadcasts the safety curtain along the respective longitudinal sides of the machine.

11. The food article slicing machine of claim 9, wherein the first beam of the first side safety sensor extends along the first longitudinal side of the machine, which is transverse to the cutting plane.

12. The food article slicing machine of claim 9, wherein each of the sensors are configured to communicate an intrusion condition to a slicing machine control when the sensor detects an intrusion into said safety curtain.

13. The food article slicing machine of claim 9, comprising a machine control, and wherein each of the sensors is configured to communicate an intrusion condition to the slicing machine control when the sensor detects an intrusion into the safety curtain, the machine control is configured to stop the operation of the machine based on the intrusion condition.

14. The food article slicing machine of claim 9, wherein the second sweep of light beams of the second side safety sensor is substantially parallel to the food article paths.

15. A food article slicing machine, comprising:
a frame having a front, a back, a first longitudinal side, an opposite second longitudinal side and a machine base top wall,
a slicing station connected to the frame comprising a knife blade and a knife blade drive driving the blade along a cutting path in a cutting plane;
a food article feed apparatus connected to the frame supporting one or more food articles for longitudinal movement along corresponding food article paths intersecting the cutting plane, an end of the food article feed apparatus remote from the cutting plane being elevated above the top wall; a safety guard system for detecting an external intrusion into the operating area of the machine, the safety guard system comprising an emitter projecting beams through an angle of sweep from the emitter to form a sensing curtain and a receiver for detecting an intrusion into the sensing curtain, said emitter and said receiver both located adjacent an apex of said sensing curtain, wherein the emitter is elevated and directs the projecting beams downwardly between the food article feed apparatus and the machine base top wall, and wherein the beams are emitted through an angle of sweep of about 270 degrees; and
a housing for protecting said emitter and said receiver, and wherein said emitter and said receiver are positioned inside the housing;
said housing having an open position, in which said emitter and said receiver are exposed to environment external of the housing, a closed position, in which said emitter and said receiver are enclosed within the housing and lack exposure to the environment external of the housing, and a device for urging said housing to said closed position, and an opening mechanism for overcoming said device for urging said housing.

16. The food article slicing machine of claim 15, wherein the beams are emitted at a depth of about 2 meters.

* * * * *